(12) United States Patent
Varma

(10) Patent No.: US 11,271,405 B2
(45) Date of Patent: Mar. 8, 2022

(54) MULTIVARIABLE MODULATOR CONTROLLER FOR POWER GENERATION FACILITY

(71) Applicant: Rajiv Kumar Varma, London (CA)

(72) Inventor: Rajiv Kumar Varma, London (CA)

(*) Notice: Subject to any disclaimer, the term of this patent is extended or adjusted under 35 U.S.C. 154(b) by 264 days.

(21) Appl. No.: 16/541,349

(22) Filed: Aug. 15, 2019

(65) Prior Publication Data

US 2020/0036192 A1    Jan. 30, 2020

Related U.S. Application Data

(63) Continuation of application No. 15/457,193, filed on Mar. 13, 2017, now Pat. No. 10,424,935, which is a
(Continued)

(51) Int. Cl.
*H02J 3/24* (2006.01)
*H02J 3/38* (2006.01)
(Continued)

(52) U.S. Cl.
CPC .......... *H02J 3/386* (2013.01); *H02J 3/24* (2013.01); *H02J 3/385* (2013.01); *H02J 3/48* (2013.01);
(Continued)

(58) Field of Classification Search
USPC .......................................................... 307/52
See application file for complete search history.

(56) References Cited

U.S. PATENT DOCUMENTS 6,979,989 B2    12/2005    Schripsema
7,514,907 B2    4/2009    Rajda et al.
(Continued)

FOREIGN PATENT DOCUMENTS

CA    2848807 A1    3/2013
CN    102640378    8/2012
(Continued)

OTHER PUBLICATIONS

Kakimoto, Naoto et al., "Power Modulation of Photovoltaic Generator for Frequency Control of Power Systems", IEEE Transactions on Energy Conversion, vol. 24, No. 4, Dec. 2009, 7 pages.
(Continued)

*Primary Examiner* — Toan T Vu
*Assistant Examiner* — Xuan Ly
(74) *Attorney, Agent, or Firm* — Brion Raffoul; Natalie Raffoul

(57) ABSTRACT

Systems, methods, and devices relating to operating a power generation facility to contribute to the stability of the power transmission system. A controller operates on the power generation facility to modulate real power or reactive power or both in a decoupled manner to contribute to the stability of the power transmission system. Real power produced by the power generation facility can be increased or decreased between zero and the maximum real power available from the PV solar panels, as required by the power system. Reactive power from the power generation facility can be exchanged (injected or absorbed) and both increased or decreased as required by the power transmission system. For solar farms, the solar panels can be connected or disconnected, or operated at non-optimal power production to add or subtract real or reactive power to the power transmission system.

25 Claims, 39 Drawing Sheets

Related U.S. Application Data continuation-in-part of application No. 15/072,014, filed on Mar. 16, 2016, now Pat. No. 10,256,635, and a continuation-in-part of application No. 14/562,008, filed on Dec. 5, 2014, now abandoned, said application No. 15/072,014 is a continuation of application No. 13/391,699, filed as application No. PCT/CA2010/001419 on Sep. 15, 2010, now Pat. No. 9,325,173.

(60) Provisional application No. 61/912,969, filed on Dec. 6, 2013, provisional application No. 61/309,612, filed on Mar. 2, 2010, provisional application No. 61/242,501, filed on Sep. 15, 2009.

(51) Int. Cl.
| | | |
|---|---|---|
| *H02J 3/48* | (2006.01) | |
| *H02J 3/50* | (2006.01) | |
| *H02M 7/44* | (2006.01) | |
| *H02J 3/18* | (2006.01) | |
| *H02J 3/32* | (2006.01) | |
| *H02J 7/35* | (2006.01) | |

(52) U.S. Cl.
CPC ............... *H02J 3/50* (2013.01); *H02M 7/44* (2013.01); *H02J 3/1821* (2013.01); *H02J 3/1864* (2013.01); *H02J 3/32* (2013.01); *H02J 7/35* (2013.01); *Y02E 10/30* (2013.01); *Y02E 10/56* (2013.01); *Y02E 40/30* (2013.01)

(56) References Cited

U.S. PATENT DOCUMENTS

| | | | |
|---|---|---|---|
| 7,768,751 | B2 | 8/2010 | Gilmore et al. |
| 7,952,897 | B2 | 5/2011 | Nocentini et al. |
| 7,964,837 | B2 | 6/2011 | Seymour et al. |
| 8,106,537 | B2 | 1/2012 | Casey et al. |
| 8,134,812 | B2 | 3/2012 | Gilmore et al. |
| 8,154,896 | B2 | 4/2012 | Angquist |
| 8,344,547 | B2 | 1/2013 | Fife et al. |
| 8,391,032 | B2 | 3/2013 | Garrity et al. |
| 8,390,977 | B2 | 5/2013 | Fife |
| 8,531,803 | B2 | 9/2013 | Falk et al. |
| 8,645,937 | B2 | 2/2014 | Angerer et al. |
| 8,687,328 | B2 | 4/2014 | Yin et al. |
| 8,717,719 | B2 | 5/2014 | Victor et al. |
| 8,760,826 | B2 | 6/2014 | West |
| 9,166,500 | B2 | 10/2015 | Wu et al. |
| 2002/0190525 | A1 | 12/2002 | Worden et al. |
| 2008/0122518 | A1 | 5/2008 | Besser et al. |
| 2009/0200994 | A1* | 8/2009 | Fornage ............ H02J 3/18 323/207 |
| 2011/0218687 | A1 | 9/2011 | Hadar et al. |
| 2012/0205981 | A1* | 8/2012 | Varma ............ H02J 9/00 307/64 |
| 2012/0319494 | A1 | 12/2012 | Ecrabey et al. |
| 2013/0131884 | A1 | 5/2013 | Jain et al. |
| 2013/0162049 | A1 | 6/2013 | Morati et al. |
| 2013/0170271 | A1 | 7/2013 | Stockinger et al. |
| 2013/0176757 | A1 | 7/2013 | Morati et al. |
| 2013/0200617 | A1 | 8/2013 | Smith et al. |
| 2014/0021804 | A1 | 1/2014 | Jalili |
| 2014/0077607 | A1 | 3/2014 | Clarke et al. |
| 2014/0092650 | A1 | 4/2014 | Alston et al. |
| 2014/0139031 | A1 | 5/2014 | Seymour et al. |
| 2014/0204613 | A1 | 7/2014 | Blanz et al. |

FOREIGN PATENT DOCUMENTS

| | | |
|---|---|---|
| EP | 1309063 | 5/2003 |
| EP | 2 182 207 | 8/2010 |
| EP | 2562903 A2 | 2/2013 |
| EP | 2579442 A1 | 4/2013 |
| WO | 2008147776 A1 | 12/2008 |
| WO | 2009102842 A2 | 8/2009 |
| WO | 2010/086031 | 8/2010 |
| WO | 2010/119136 | 10/2010 |
| WO | 2011/032265 | 3/2011 |
| WO | 2011140559 A1 | 11/2011 |
| WO | 2012009367 A1 | 1/2012 |
| WO | 2012040760 A2 | 4/2012 |
| WO | 2012150933 A1 | 11/2012 |
| WO | 2013131115 A2 | 9/2013 |
| WO | 2013185155 A1 | 12/2013 |
| WO | 2013185159 A2 | 12/2013 |
| WO | 2013185160 A1 | 12/2013 |

OTHER PUBLICATIONS

Yazdani, Amirnaser et al., "Modeling Guidelines and a Benchmark for Power System Simulation Studies of Three-Phase Single-Stage Photovoltaic Systems", IEEE Transactions on Power Delivery, vol. 26, No. 2, Apr. 2011, 18 pages.
Hingorani, N. G. et al., "Understanding Facts", IEEE Press, New York, USA, 1999, 448 pages.
Kundur, Prabha, "Power Systems Stability and Control", McGraw Hill, 1994, pp. 589, 1 page.
Kundur, Prabha, "Power Systems Stability and Control", McGraw Hill, 1994, pp. 617, 1 page.
ISA/CA "International Search Report and Written Opinion", for International Application No. PCT/CA2014/051174, 9 pages.
Office Action for Canadian Patent Application No. 2,886,409 dated Jul. 27, 2015, 4 pages.
Office Action for U.S. Appl. No. 14/562,008 dated Jul. 5, 2016, 22 pages.
Office Action for U.S. Appl. No. 14/562,008 dated Dec. 13, 2016, 15 pages.
European Search Report and Opinion for corresponding EP Patent Application No. 14868572.0 dated Apr. 21, 2017, 8 pages.
European Communication for corresponding EP Patent Application No. 14868572.0 dated May 10, 2017, 1 page.
Chinese Office Action for corresponding Chinese Patent Application No. 201480066658.0 dated Mar. 14, 2018, 8 pages.
Chinese Office Action for corresponding Chinese Patent Application No. 201480066658.0 dated Dec. 20, 2018, 3 pages.
European Office Action for corresponding EP Patent Application No. 14868572.0 dated May 22, 2018, 3 pages.
European Office Action for corresponding EP Patent Application No. 14868572.0 dated Nov. 6, 2018, 4 pages.
Indian Office Action for corresponding corresponding Indian Application No. 2562/DELNP/2015 dated Aug. 23, 2018, 5 pages.
"Richtlinie für Anschh.mss und Parallelbetrieb von Erzeugungsanlagen am Mittelspannungsnetz" BDEW. Jun. 2008. 138 Pages.
"Erzeugungsanlagen am Mittelspannungsnetz—Richtlinie für Anschluss und Parallelbetrieb von Erzeugungsanlagen am Mittelspannungsnetz" BDEW. 2008. 16 Pages.
"Gesetz zur Neuregelung des Rechtsrahmens für die Förderung der Stromerzeugung aus erneuerbaren Energien" Bundesanzeiger Verlag. 2011. 45 Pages.
"Gesetz zur Änderung des Rechtsrahmens für Strom aus solarer Strahlungsenergie und zu weiteren Änderungen im Recht der erneuerbaren Energien" Bundesanzeiger Verlag. 2012. 11 Pages.
"Gesetz für den Vorrang Erneuerbarer Energien (Erneuerbare-Energie.n-Gesetz—EEG)" Oct. 25, 2008. 57 Pages.
"Netz- und Systemregeln der deutschen Übertragungsnetzbetreiber" 2007. VDN Verband der Netzbetreiber e.V. beim VDEW. 79 Pages.
Communication of a notice of opposition issued on corresponding European Patent Application No. 14868572.0 dated Mar. 30, 2021. 37 Pages.
Communication of a notice of opposition issued on corresponding European Patent Application No. 14868572.0 dated Apr. 7, 2021. 1 Page.

\* cited by examiner

VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation VR: Voltage Regulation, Aux. Ctrl.: Auxiliary Control (i.e Damping control), LRPC: Load Reactive Power Compensation, HC: Harmonic Compensation API: Active Power Injection, VR: Voltage Regulation, Aux. Ctrl.: Auxiliary Control, LRPC: Load Reactive Power Compensation, HC: Harmonic Compensation API: Active Power Injection, VR: Voltage Regulation, Aux. Ctrl.: Auxiliary Control, LRPC: Load Reactive Power Compensation, HC: Harmonic Compensation

API, HC

API: Active Power Injection, VR: Voltage Regulation, Aux. Ctrl.: Auxiliary Control, LRPC: Load Reactive Power Compensation, HC: Harmonic Compensation API: Active Power Injection, VR: Voltage Regulation, Aux. Ctrl.: Auxiliary Control, LRPC: Load Reactive Power Compensation, HC: Harmonic Compensation

MULTIVARIABLE MODULATOR CONTROLLER FOR POWER GENERATION FACILITY

RELATED APPLICATIONS

This application is a Continuation of U.S. application Ser. No. 15/457,193 filed on Mar. 13, 2017, which is a Continuation-In-Part of U.S. patent application Ser. No. 14/562,008 filed Dec. 5, 2014 claiming the benefit of U.S. Provisional Application No. 61/912,969 filed on Dec. 6, 2013; and a Continuation-In-Part of U.S. patent application Ser. No. 15/072,014 filed Mar. 16, 2016, now granted as U.S. Pat. No. 10,256,635, which is a Continuation of U.S. application Ser. No. 13/391,699 filed May 7, 2012, now granted as U.S. Pat. No. 9,325,173, which is a US National Stage (371) of PCT/CA2010/001419 filed Sep. 15, 2010, which claims the benefit of U.S. Provisional Application Nos. 61/242,501 and 61/309,612 filed on Sep. 15, 2009 and Mar. 2, 2010, respectively.

TECHNICAL FIELD

The present invention relates to power generation facilities. More specifically, the present invention provides methods and systems for operating a power generation facility such as a photovoltaic (PV) solar farm.

BACKGROUND

Power systems worldwide need to ensure voltage regulation, stability, allow high levels of power transmission capacity in the lines to transfer power from existing or new generating sources, and regulate system frequency, despite various system disturbances. These disturbances could be slow and gradual variations in loads and generation, or large and sudden variations, such as faults, line switching, equipment outages, etc.

There are primarily two types of stability:

Angle Stability: This relates to maintaining synchronism of generators. It has two main components:
  a) Small Signal Stability—caused by small disturbances and insufficient damping in power systems with respect to different oscillatory modes
  b) Transient Stability—This is affected by large disturbances in power systems Voltage Stability: This relates to the system's ability to maintain acceptable voltages, and is typically caused by lack of adequate reactive power support both during steady state and during disturbances such as faults.

Another major problem being increasingly encountered is the lack of power transfer capacity in transmission and distribution lines. Increasing stability significantly increases the power transmission capacity of transmission lines. On the other hand, the power transfer capacity in distribution lines is typically limited by thermal limits of the line.

A third problem being faced by power systems is the regulation of system frequency despite the ongoing system disturbances. Frequency deviations occur due to imbalances between the generation and the loads during disturbances. Maintaining frequency is an important issue in isolated power systems, such as microgrids.

Another issue with current technology is the lack of power carrying capacity in power transmission lines. With the ever-growing number of renewable generating sources in power transmission and distribution grids, there is an imminent need for providing capacity on existing lines to carry the real power generated by them.

The existing technology for compensating for reactive power flows in the lines is through passive devices such as capacitors and inductors, which are fixed in rating, and hence not controllable. Therefore, this method is not widely employed due to these limitations.

The other option is to install very expensive dynamic reactive power compensators such as Static Var Compensator (SVC) or Static Synchronous Compensator (STATCOM). These may not be cost-effective for the objective to be achieved.

Based on the above, there is therefore a need for systems, methods, and devices which mitigate if not overcome the issues noted above. More specifically, since photovoltaic (PV) solar farms conventionally only produce real power, and do not contribute to increasing system stability, enhancing power transfer capacity, or providing frequency control, methods and systems which would allow PV energy farms to perform these functions would be desirable.

SUMMARY

The present invention provides systems, methods, and devices relating to operating a power generation facility to contribute to the overall stability of the power transmission system. A controller operates on the power generation facility to modulate real power or reactive power, or both real and reactive power in a decoupled (independent) control mode to contribute to the overall stability of the power transmission system. Real or reactive power, or both, can be injected into the power transmission system as necessary. As well, the real power produced or the reactive power produced by the power generation facility can be increased or decreased as required by the power transmission system. For solar farms, the solar panels can be connected or disconnected to add or subtract real power. Also, the real power output from the solar panels can be modulated by varying its output direct current (DC) voltage. The inverter can further be controlled to inject or absorb reactive power with the power transmission system.

In a first aspect, this document discloses a method for enhancing stability in a power grid system to which is coupled a power generation facility, the method comprising:
  a) detecting a need for enhancing system stability in said power grid system;
  b) modulating at least one of reactive power, real power, and a combination of real and reactive power from said power generation facility; and
  c) providing at least one of modulated reactive power, modulated real power, and a combination of said modulated reactive power and said modulated real power from said power generation facility to said power grid system; wherein a modulation of a combination of real and reactive power is performed simultaneously in a decoupled manner, wherein step b) further comprises adjusting at least one inverter of said power generation facility to thereby use at least a portion of said at least one inverter's capacity to provide at least one of said modulated reactive power, said modulated real power, and said combination of modulated real and modulated reactive power; and wherein at least one of said modulated reactive power, said modulated real power, and said combination of modulated real and modulated reactive power increases said stability of said power grid system by performing at least one of:
  damping system oscillations;
  increasing transient stability;
  regulating power system frequency;
  improving voltage stability and voltage regulation;
  increasing power transmission capacity in transmission lines; and
  increasing power transmission capacity in distribution lines.

In a second aspect, this document discloses a method for enhancing stability in a power grid system to which is coupled a power generation facility, the method comprising:
  a) detecting a need for enhancing system stability in said power grid system;
  b) modulating at least one of reactive power, real power, and a combination of real and reactive power from said power generation facility; and
  c) providing at least one of modulated reactive power, modulated real power and a combination of said modulated reactive power and said modulated real power from said power generation facility to said power grid system;
wherein said combination of real and reactive power is modulated simultaneously in a decoupled manner,
wherein step b) further comprises adjusting at least one inverter of the power generation facility to thereby use at least a portion of said at least one inverter's capacity to provide at least one of said modulated reactive power, said modulated real power, and said combination of said modulated reactive power and said modulated real power,
wherein at least one of said modulated reactive power, said modulated real power, and said combination of said modulated real power and said modulated reactive power increases said stability of said power grid system by performing at least one of:
  damping system oscillations;
  increasing transient stability;
  regulating power system frequency;
  improving voltage stability and voltage regulation;
  increasing power transmission capacity in transmission lines; and
  increasing power transmission capacity in distribution lines, and
wherein said power generation facility is operated such that any remaining inverter capacity in said power generation facility after real power production is used for reactive power exchange.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
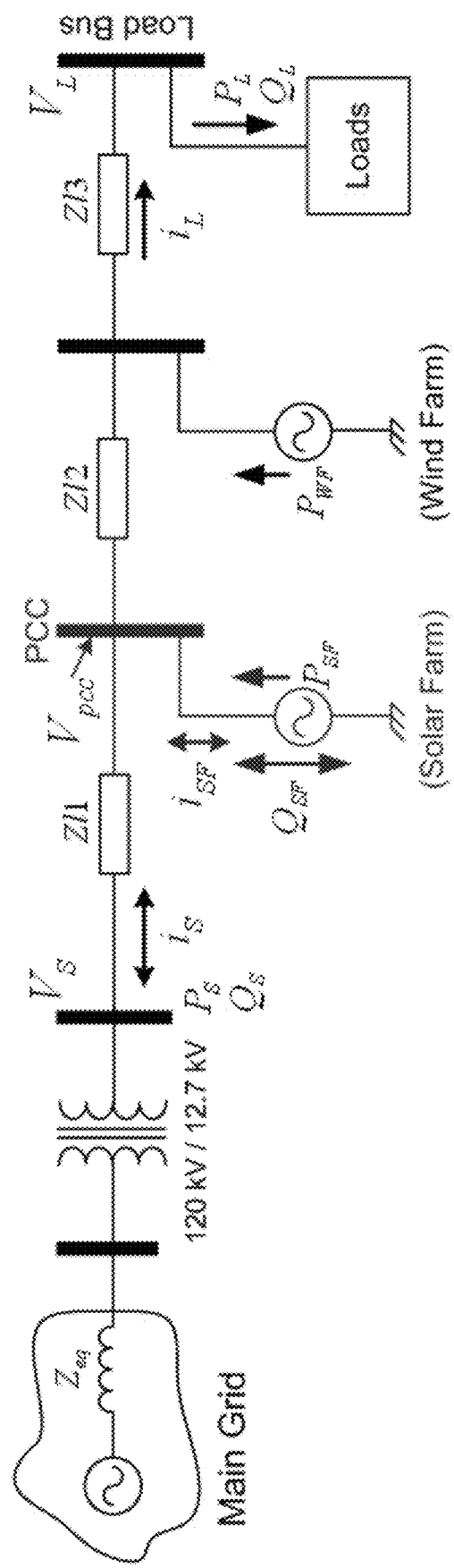
FIG. 1 shows a system block diagram representation of a Distributed Generator system.

The systems and methods described below provide solutions to reverse power flow and to adapting existing DG systems to support the addition of wind and solar farms and other DG sources. Here PV solar farms are not only utilized as a source of real power but as a source of dynamically controllable reactive power.

In one embodiment, a method of operating a solar farm inverter primarily as a STATCOM during the night to mitigate the high voltages caused by the addition of wind farms to a DG system is disclosed. A solar farm inverter can be effectively utilized to regulate the voltage at point of common coupling (PCC)—the location where the wind farm is integrated. Furthermore, at night time, the solar farm can be utilized to achieve all the possible functions of a STATCOM for improving the power system performance by increasing system stability, damping power system oscillations, alleviating voltage instability, suppressing subsynchronous resonance, etc. It can also be utilized to provide load reactive power support/compensation, perform load balancing, and/or neutralize load current harmonics.

The entire rating of the solar farm inverter is available for accomplishing the above functions, since the solar farm is absolutely idle and not producing real power at night times as the sun is absent. During the day-time when power generation from the solar farm is not at a peak (such as during early morning and late afternoon hours), the remaining solar farm inverter capacity can be utilized to perform any or all of the above mentioned tasks/functions.

Also described is an auxiliary controller having a plurality of modes of operation. The controller is capable of performing voltage regulation, during the night-time and day-time operation of the DG systems.

In addition, described is a voltage controller and an auxiliary damping controller for use with the system. The voltage controller and the damping controller operate with the inverter based solar DG connected to the grid or the inverter based wind DG connected to the grid. These components improve the transient stability of the DG system both in the night and the day time whenever there is an availability of reactive power capacity in the DG system.

In one aspect, the systems described herein are directed to a method of regulating the voltage in a DG (distributed generation) system using a solar farm inverter as a STATCOM, especially during night time. The description is directed to a method of regulating the voltage in a DG system using a solar farm inverter as a STATCOM.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

The description provides for a system that allows solar farm inverters to be controlled as a STATCOM in the night when there is no sunlight. When used as a STATCOM at night, the entire rating/capacity of solar farm inverter is employed to provide several benefits to the power system as normally provided by the FACTS technology. During daytime (especially during partial sun, i.e., in early mornings and late afternoons) all the capacity of the solar farm inverter remaining after that required for real power generation is utilized to be controlled as STATCOM. Such an approach allows for a new set of applications and potential revenue earning methods for solar farms other than simply producing real power during the day.

Part of the system described also allows wind turbine generator inverters (especially for wind turbine generators based on inverter technology) to be controlled as STATCOM during hours when there is no wind. When wind is absent, the entire rating/capacity of the wind turbine inverters are employed to provide several benefits to the power system as normally provided by the FACTS technology.

During other times (especially during less wind regime), all the capacity of the wind turbine inverters remaining after that required for real power generation, is utilized to be controlled as STATCOM. This opens up a new set of applications and potential revenue earning to the wind farms than simply from producing real power.

While the potential applications of PV (photo voltaic) solar farm as STATCOM (FACTS device) are several, the following description illustrates two major benefits of solar farm utilization as STATCOM: 1) integrating more wind power systems in the transmission/distribution networks by providing voltage control on the network, and ii) increasing the stable power transfer limit on transmission systems through both voltage control and auxiliary damping control.

While the potential applications of wind farm as STATCOM (FACTS device) utilizing auxiliary controls are several, the following description shows one major benefit of wind farm utilization as STATCOM: increasing the stable power transfer limit on transmission systems through both voltage control and auxiliary damping control.

The utilization of solar farm inverters and wind farm inverters as STATCOM is applicable regardless of the following: 1) type and configuration of inverter e.g., 6 pulse, 12 pulse, multilevel, etc, 2) type of semiconductor switches used is inverters, e.g. GTO, IGBT, etc, 3) type of firing methodology used, PWM, SPWM, hysteresis control, PLL based, etc., 4) methodology of controller design, e.g., pole placement, lead lag control, genetic algorithm based control, etc., 5) choice of auxiliary control signals, e.g., local signals such as line current magnitude, active power flow, local bus frequency, remote signals such as phasor measurement unit (PMU) acquired signals, etc.

The list below provides an explanation for the various terms and notation used in different figures and in the description below.

| Symbol | Description |
| --- | --- |
| $v_{PCC,a} = v_{PCC,a}(wt)$ | Instantaneous phase-a voltage at PCC |
| $v_{PCC,b} = v_{PCC,b}(wt)$ | Instantaneous phase-b voltage at PCC |
| $v_{PCC,c} = v_{PCC,c}(wt)$ | Instantaneous phase-c voltage at PCC |
| $V_m$ | Peak magnitude of rated voltage at PCC |
| $V_{PCC}$ | Peak value of actual voltage at PCC |
| $V^*_{PCC}$ | Peak value of reference (desired) voltage at PCC |
| $V_{dc}$ | Actual DC bus voltage |
| $V^*_{dc}$ | Reference (desired) DC bus voltage |
| $I_v$ | Required magnitude of current to achieve PCC voltage control |
| $I_{DC}$ | Required magnitude of current to achieve DC bus voltage control |
| $i_{va} = i_{va}(wt)$ | Instantaneous phase-a reference current for PCC voltage control |

-continued

| Symbol | Description |
|---|---|
| $i_{vb} = i_{vb}(wt)$ | Instantaneous phase-b reference current for PCC voltage control |
| $i_{vc} = i_{vc}(wt)$ | Instantaneous phase-c reference current for PCC voltage control |
| $i_{dc,a} = i_{dc,a}(wt)$ | Instantaneous phase-a reference current for DC bus voltage control |
| $i_{dc,b} = i_{dc,b}(wt)$ | Instantaneous phase-b reference current for DC bus voltage control |
| $i_{dc,a} = i_{dc,c}(wt)$ | Instantaneous phase-c reference current for DC bus voltage control |
| $i^*_{SF,a} = i^*_{SF,a}(wt)$ | Net instantaneous phase-a reference current for SF-inverter control |
| $i^*_{SF,b} = i^*_{SF,b}(wt)$ | Net instantaneous phase-b reference current for SF-inverter control |
| $i^*_{SF,c} = i^*_{SF,c}(wt)$ | Net instantaneous phase-c reference current for SF-inverter control |
| $U_a$ | Phase-a PCC voltage in per unit (pu) form |
| $U_b$ | Phase-b PCC voltage in pu form |
| $U_c$ | Phase-c PCC voltage in pu form |
| k | Voltage gain to convert actual PCC voltages to pu value |
| $k_v$ | Voltage gain to convert pu value to actual value |
| $k_{DC}$ | Voltage gain to convert pu value to actual value |
| Cdc | DC link capacitor |
| Lsh | Interfacing series inductor |
| S1 to S6 | Insulated Gate Bipolar Transistors (IGBTs) |
| G1 to G6 | Gate switching pulses to turn ON/OFF the IGBTs |
| Capital Letters | Peak/Average/DC or Root mean-square (rms) values (Ex. $V_{PCC}$; $V_{dc}$) |
| Small Letters | Instantaneous values which vary with time (Ex. $v_{PCC,a}$; $i^*_{SF,a}$) |

This document describes a method for utilizing a solar farm inverter as a source of both real and reactive power to support the growth of DG systems. The method makes use of the fact that the solar farm inverter is unutilized during night-time. Additionally, when the solar farm is not producing power up to its rated generation capacity, the method can also be applied during the day-time. For approximately 60% of the day-time (8 hours out of 13 hours of daylight), the solar farm inverter capacity is remains underutilized (i.e. inverter capacity is utilized below 75% of its rated capacity). This underutilized inverter capacity can, therefore, be gainfully employed to achieve the similar functionality as of night-time at, however, a limited scale. For ease of understanding hereafter, the operating modes are addressed as night-time mode of operation (or simply "night-time") and day-time mode of operation (or simply "day-time").

The present document refers to a photovoltaic (PV) solar farm. However, the skilled artisan will understand that the method described is not limited to this type of solar system, but can be used with any distributed power generation source having a voltage inverter may be utilized.

The spare available solar PV inverter capacity thus can be utilized to solve several known problems in DG systems. The system and method provide several embodiments in which maximum benefits from the solar farm inverter can be realized. The table below highlights the applications of the solar farm during both modes of operation. Furthermore, some of these applications can be integrated to achieve multiple tasks simultaneously.

TABLE

Some Modes of Operation of a Solar Farm
Modes Of Operation

| I. Night-Time Operation | II. Day-Time Operation |
|---|---|
| Battery Charging | Active Power Injection |
| PCC Voltage Regulation | PCC Voltage Regulation |
| Auxiliary/Damping control | Auxiliary/Damping control |

TABLE-continued

Some Modes of Operation of a Solar Farm
Modes Of Operation

| I. Night-Time Operation | II. Day-Time Operation |
|---|---|
| Load Reactive Power Compensation | Load Reactive Power Compensation |
| Power Quality Enhancement | Power Quality Enhancement |
| Load and/or Network Balancing | Load and/or Network Balancing |

FIG. 1 illustrates the single-line representative diagram of the exemplary system. This system is comprised of a wind farm and a PV solar farm. The distances between different points of interest are represented by equivalent line impedances, such as, Zl1, Zl2, etc. For simplicity, the loads on the system are combined together, considered at the end of the feeder and represented by equivalent MW and MVar.

Figure 2:
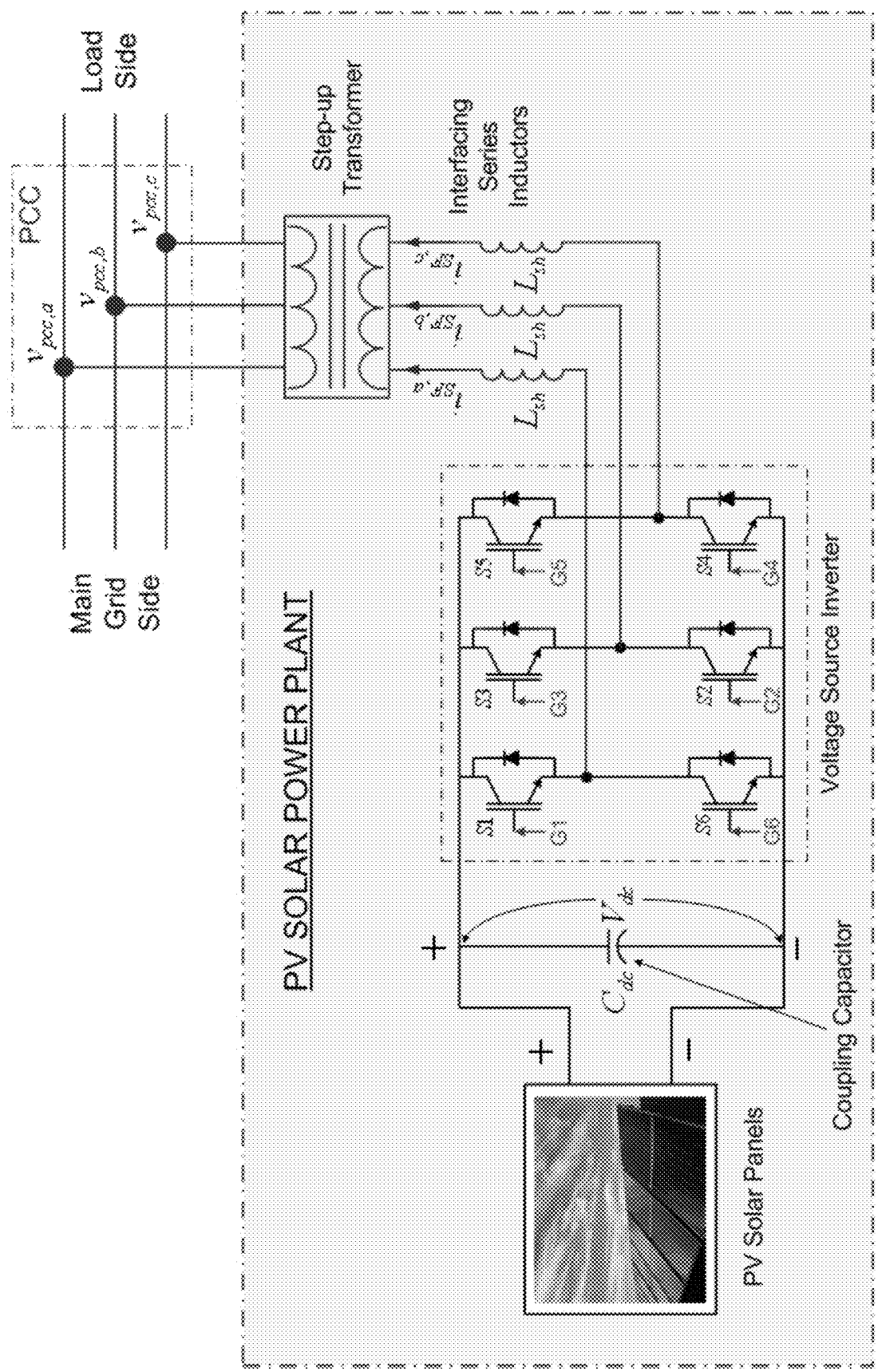
FIG. 2 shows a detailed representation of a PV (PV) solar farm.

FIG. 2 is a detailed PV solar farm schematic, modeled as a voltage source inverter with a DC bus capacitor. The voltage source inverter is realized by utilizing six semiconductor switches (here, Insulated Gate Bipolar Transistors (IGBTs)). The inverter is connected to the network through interfacing series inductors and a step-up transformer. The point at which the PV solar farm is connected to the feeder/network is termed as point of common coupling (PCC). The currents injected/delivered by the PV solar farm are denoted as $i_{SF,a}$, $i_{SF,b}$ and $i_{SF,c}$.

As mentioned earlier, the system and method described seeks to increase the real power injection capability of the wind farm, especially during the night-time when wind farms generally produce more power than in the day-time. When the power generated by the wind farm is greater than the loads connected downstream of the wind farm, the remaining excess power flows towards the main grid. This reverse power flow causes the feeder voltage to rise. If the amount of the reverse power flow is significantly high, the feeder voltage level may increase beyond the accepted limit imposed by the utility (such as ±5% of the rated feeder voltage). If such an event occurs (i.e., feeder voltage more than 1.05 per unit due to reverse power flow), the wind farm has to shut down or its output power injection needs to be reduced.

Accordingly, the system and method described uses the unutilized PV solar farm inverter (during night-time) to control the feeder voltage during such an event. The PV solar inverter controls and thus restores the increased feeder voltage back to the acceptable limit by injecting the appropriate amount of controlled reactive power.

Generally, a capacitor is connected on the DC side of the solar inverter. This capacitor plays an important role during night-time operation. For this system, the voltage across this capacitor (referred to hereafter as the DC link voltage/DC bus voltage) is maintained at a reference value by taking a small amount of active power from the grid. Inclusion of a self-supporting DC bus feature in a PV solar farm, especially during the night-time, is important. This enables the PV solar farm to perform as a STATCOM.

This section describes the operating principle of using a PV solar farm to regulate the PCC voltage.

Figure 3:
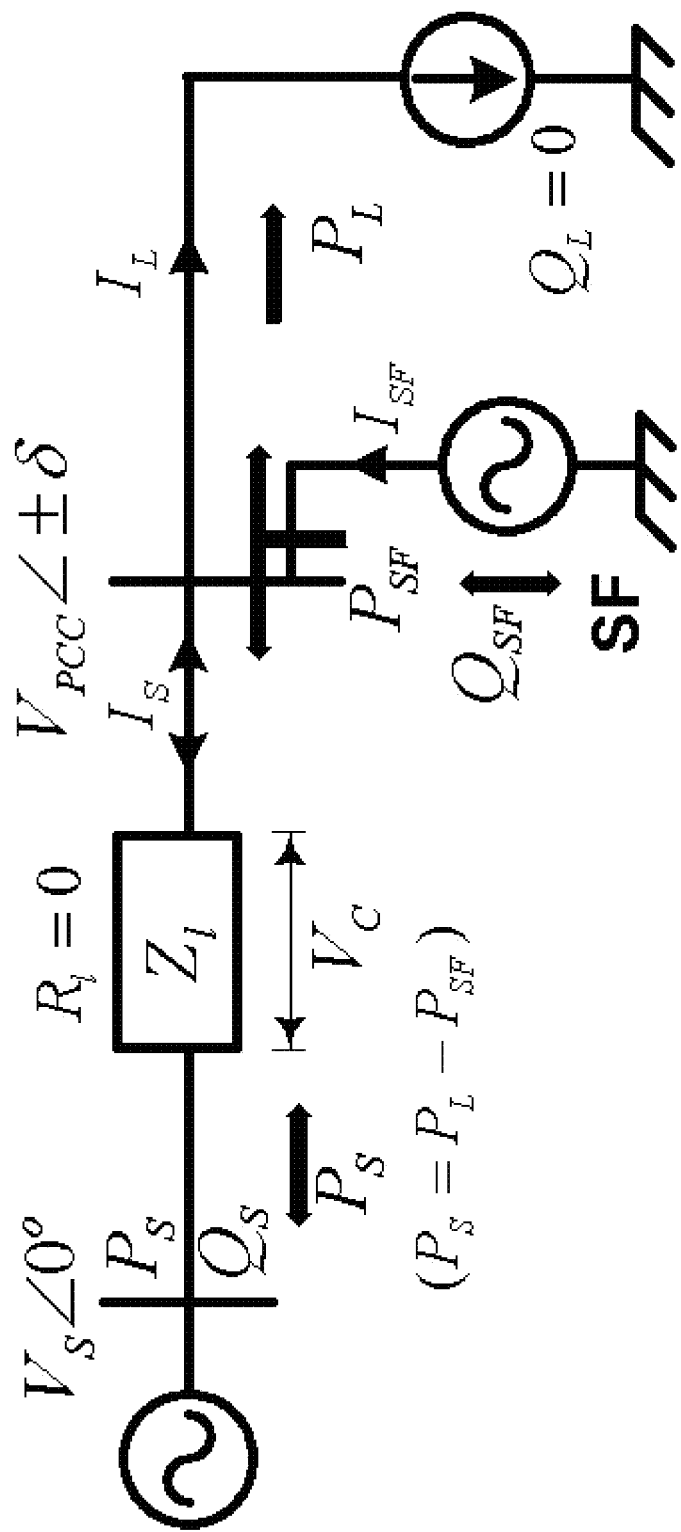
FIG. 3 shows a simplified system configuration of a system described in this document.

The system under consideration as given in FIG. 1 is represented in FIG. 3 as a simplified diagram to aid in a better understanding of the operating principle of the system and method described. Furthermore, for simplicity, the following assumptions are made:
line resistance and capacitance are neglected;
load is connected very close to the solar farm, i.e. zero impedance between the PV solar farm and the load; and
a unity power factor load.

The second assumption of connecting the load very close to the PV solar farm helps to simplify the phasor diagram as the load and the PCC voltages will be identical. However, for the more complex representation, the line impedance between the PCC and the load should be included. Under such a condition, the load voltage phasor will have lower/higher magnitude and a phase shift compared to the PCC voltage that would depend on the length of line Zl2 and the amount of current drawn by the load.

In principle, when there is a drop or rise in voltage from its rated value, an externally installed FACTS device, such as a STATCOM, should inject appropriate reactive power to counterbalance the voltage drop/rise across the line impedance and thus restore the voltage close to the rated value.

Figure 4A:
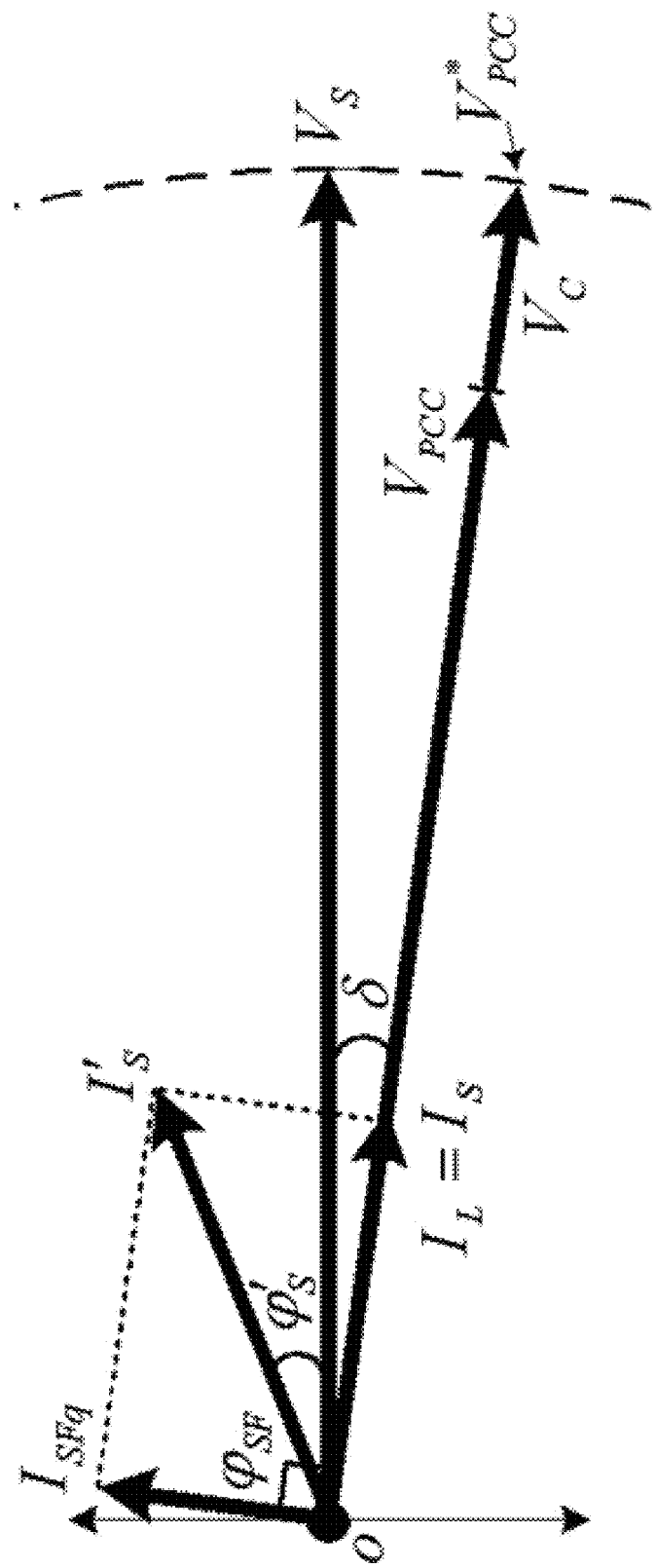
FIGS. 4A and 4B show phasor representations of voltage drop compensation utilizing the PV solar farm inverter: (a) Night-time operation and (b) Day-time operation.
Figure 4B:
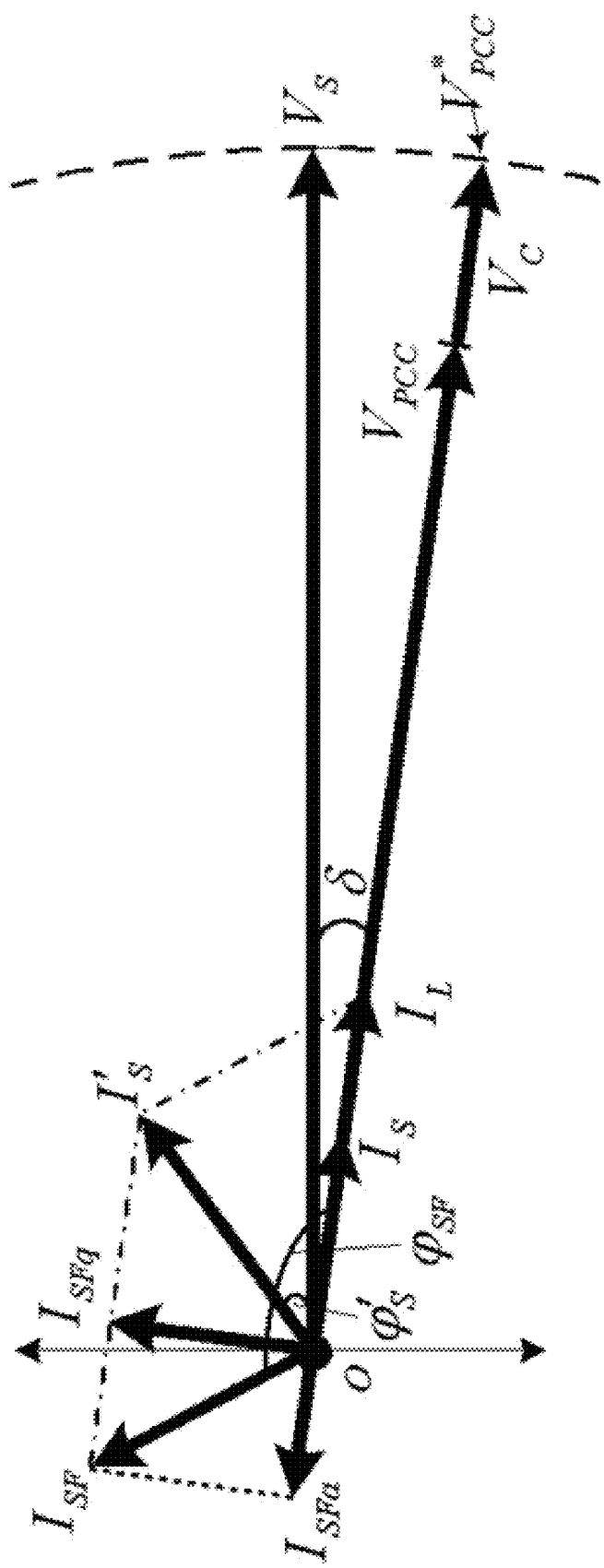

FIG. 4 shows the phasor representation when the PV solar farm inverter is operated and controlled as a STATCOM to compensate for the drop in the voltage. The voltage at the distribution level (after the step-down transformer), Vs, is considered to be a reference phasor. The effective voltage drop that is responsible for regulating the PCC voltage is termed a compensating voltage ($V_C$). The flow of load current through the feeder causes the voltage to drop across the line impedances. For an uncompensated line, as the length of the line increases, the effective voltage available at the farthest end gradually drops. The line impedance is also responsible for the phase angle lag between the distribution transformer's secondary and PCC voltages, denoted as δ.

In order to compensate for the drop in voltage at the PCC, the solar farm is controlled as a capacitor. FIG. 4 (a) shows the phasor representation for the PV solar farm inverter compensating for the voltage drop during night-time. $V_{PCC}$ and $V^*_{PCC}$ represent the reduced and reference PCC voltages, respectively. Since the line resistance is neglected, the quadrature leading current ($I_{SFq}$), when flowing through the inductive line impedance, will cause an additive voltage drop $V_C$. This action will boost the reduced PCC voltage $V_{PCC}$ to $V^*_{PCC}$. The resultant source current ($I'_S$) is the vector sum of $I_L$ and $I_{SFq}$. The effective phase angle between the transformer secondary voltage Vs and the resultant source current $I'_S$ is denoted as φ's. The phase angle between the voltage across the solar farm (PCC) and its injected current is denoted as $φ_{SF}$. During night-time, phase angle $φ_{SF}$ will be close to 90°.

The compensating voltage $V_C$ is a function of the line impedance (Zl) and the quadrature current $I_{SFq}$, which can be expressed mathematically as:

$$|V_C| = I_{SFq} \cdot Z_l \quad (1)$$

From FIG. 4 (a), $V_C$ can also be represented as:

$$|V_C| = |V^*_{PCC}| - |V_{PCC}| \quad (2)$$

In equation (2), $V^*_{PCC}$ is a known quantity and, $V_{PCC}$ (actual PCC voltage) can be measured easily using a voltage sensor. Thus, the amount of the PV solar farm inverter current needed to compensate for the desired drop in voltage can be calculated as:

$$I_{SFq} = \frac{|V^*_{PCC}| - |V_{PCC}|}{Z_l} \quad (3)$$

FIG. 4 (b) shows the phasor representation of voltage drop compensation during day-time. The compensation principle and all the equations are identical to those for night-time operation. The only difference is that the solar farm inverter provides the reactive power (quadrature current) necessary to achieve the desired voltage boost while delivering the PV generated active power to the grid. Therefore, during day-time, the net current injected by the solar farm inverter ($I_{SF}$) will be the vector sum of the active ($I_{SFa}$) and the reactive ($I_{SFq}$) current components.

In one implementation, the increase in voltage can be due to the reverse power flow from another DG source on the same feeder or from the solar farm itself (possibly during day-time).

Figure 5A:
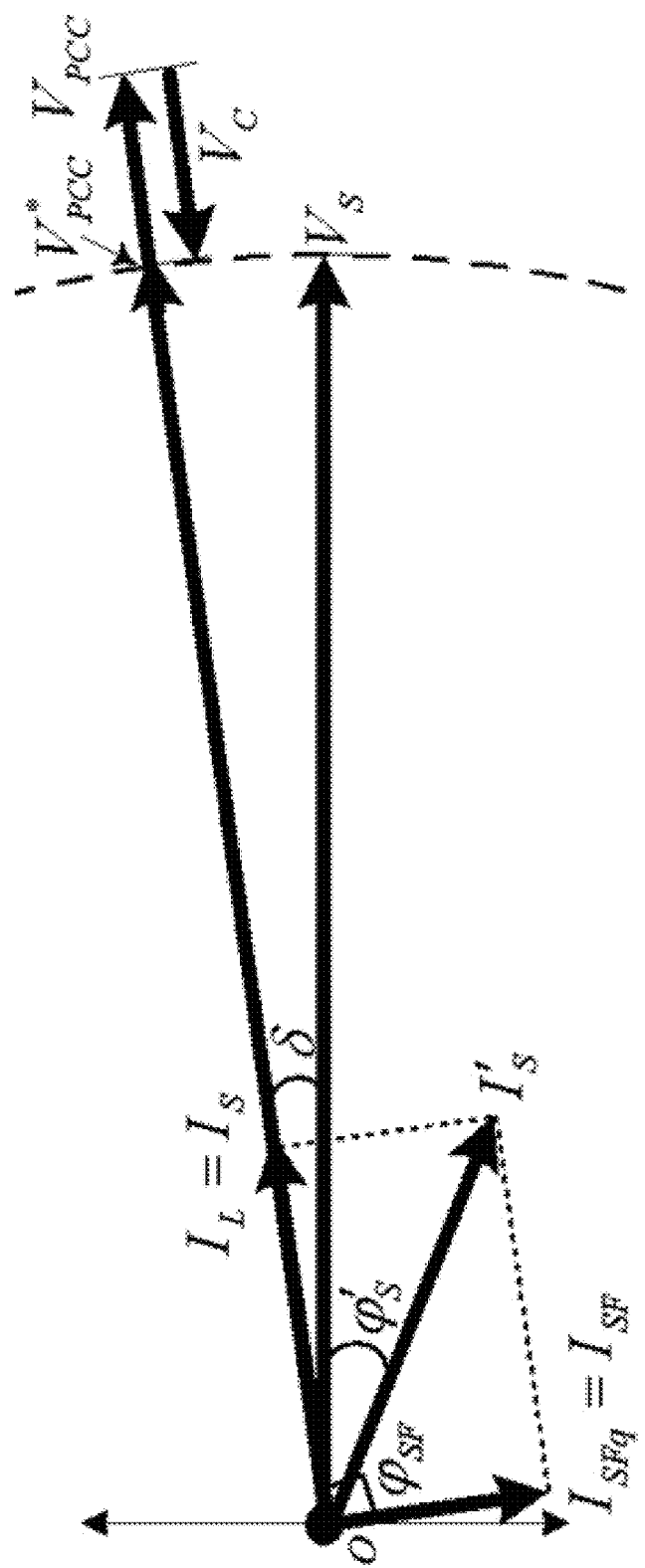
FIGS. 5A and 5B show phasor representations of voltage rise compensation utilizing the PV solar farm inverter: (a) Night-time operation and (b) Day-time operation.
Figure 5B:
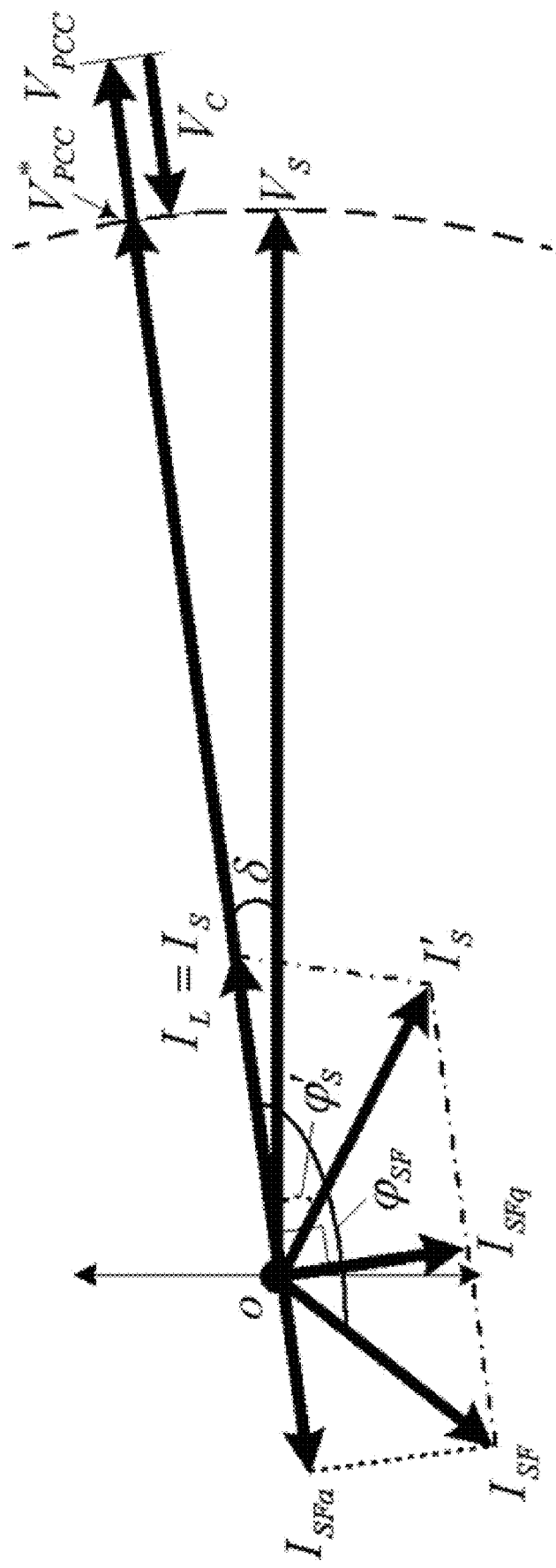
Figure 6A:
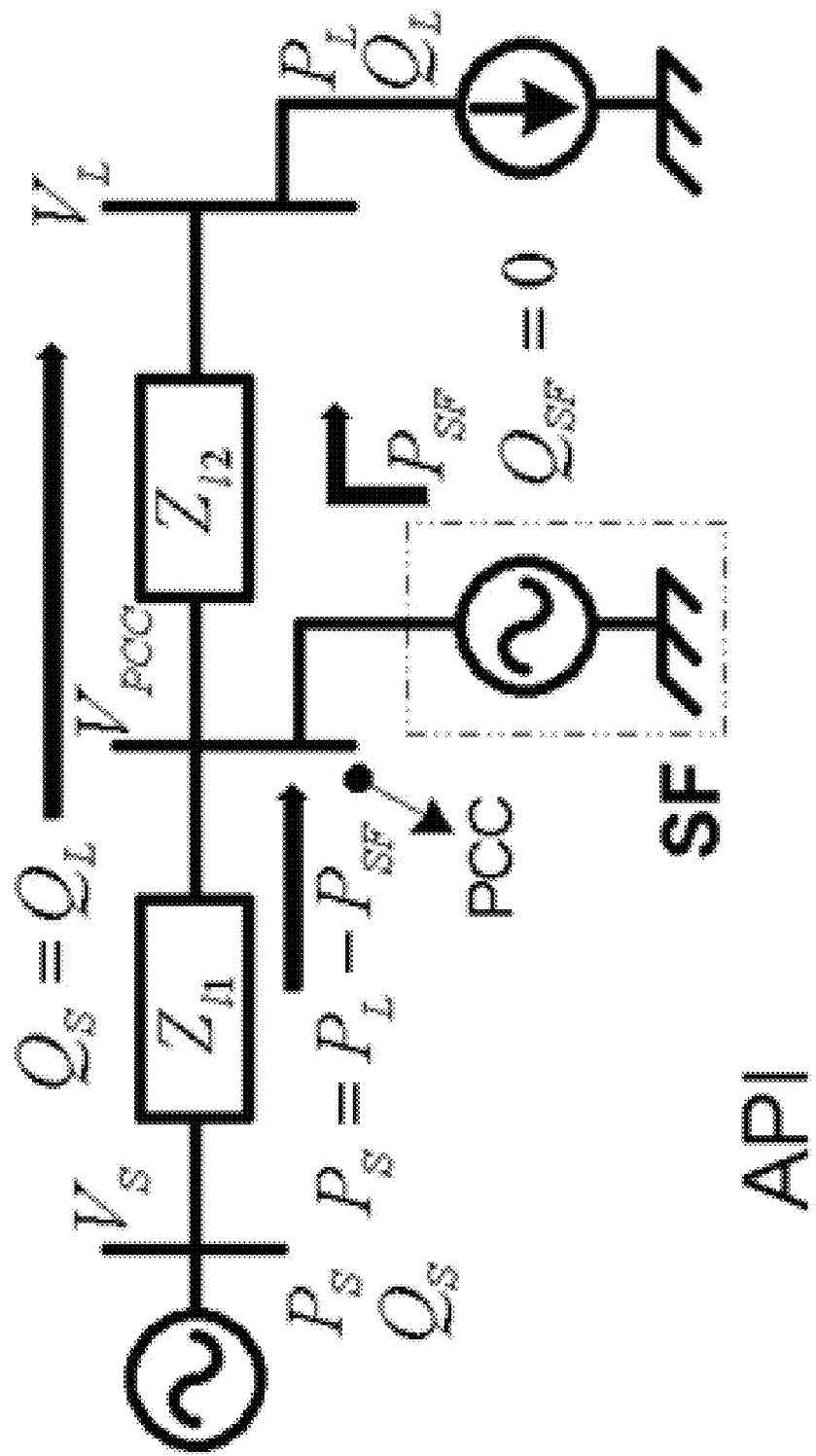
FIGS. 6A-6D show the present utilization of a PV solar farm over 24 hours—(a) Day-time operation: PSF<PL, (b) Day-time operation: PSF=PL, (c) Day-time operation: PSF>PL, and (d) Night-time operation: PSF=0.
Figure 6B:
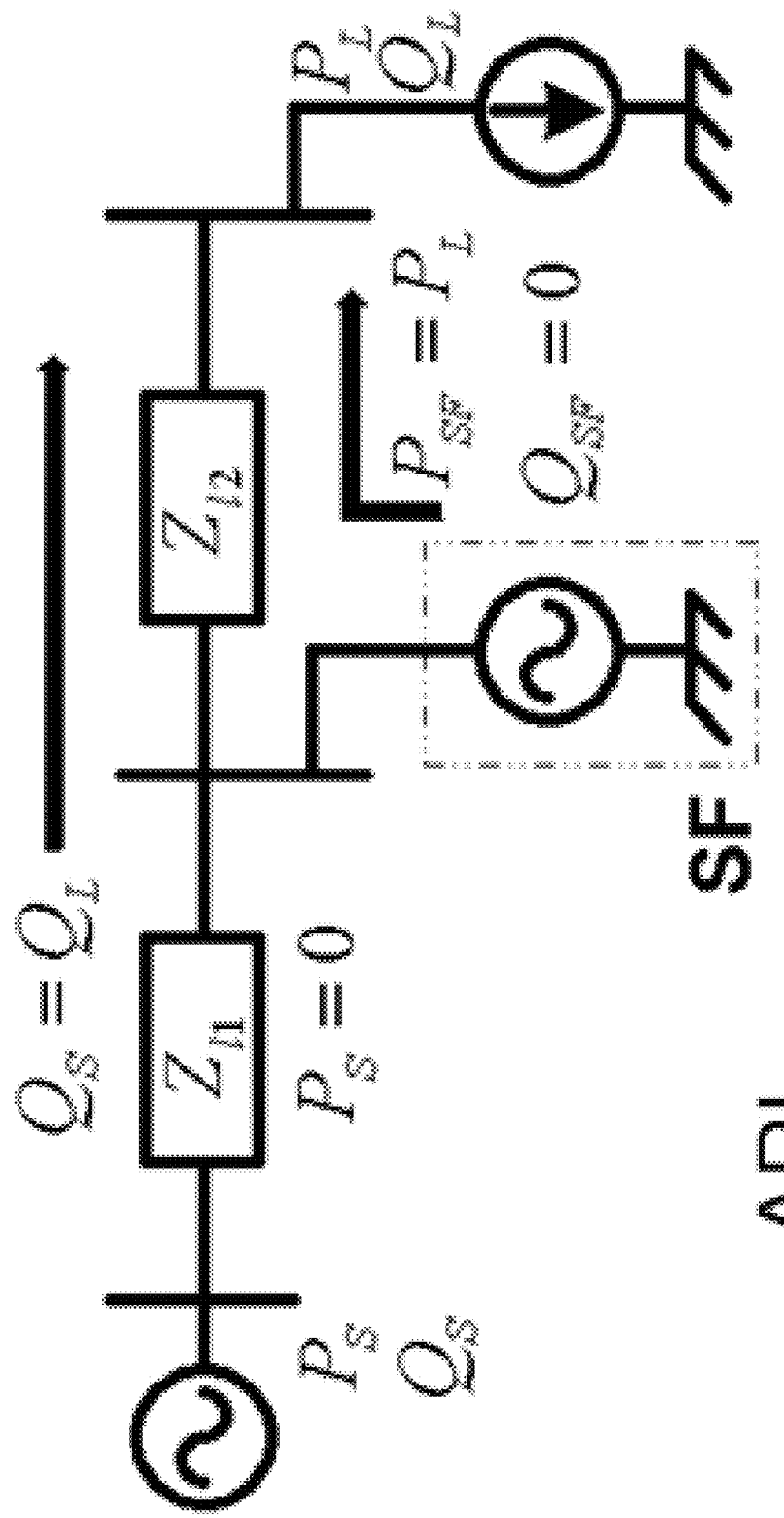
Figure 6C:
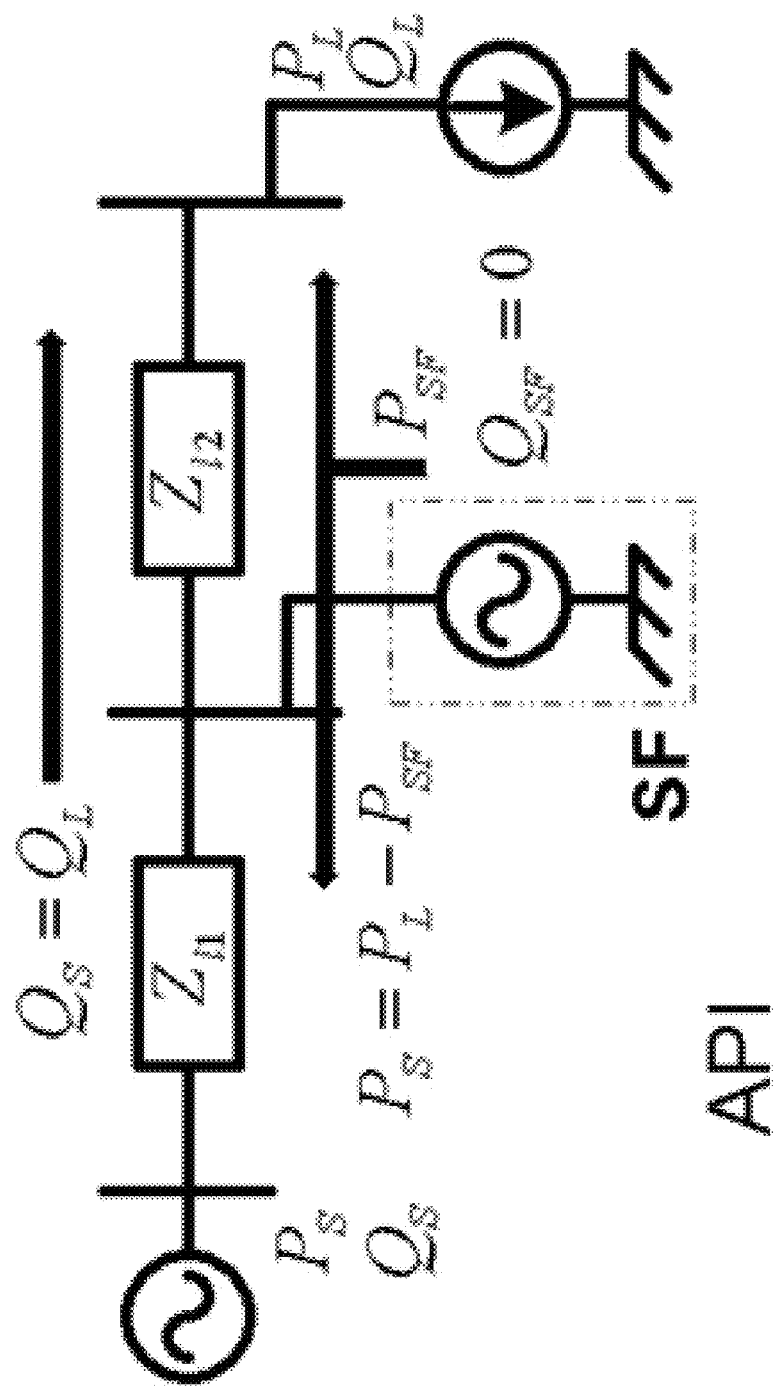
Figure 6D:
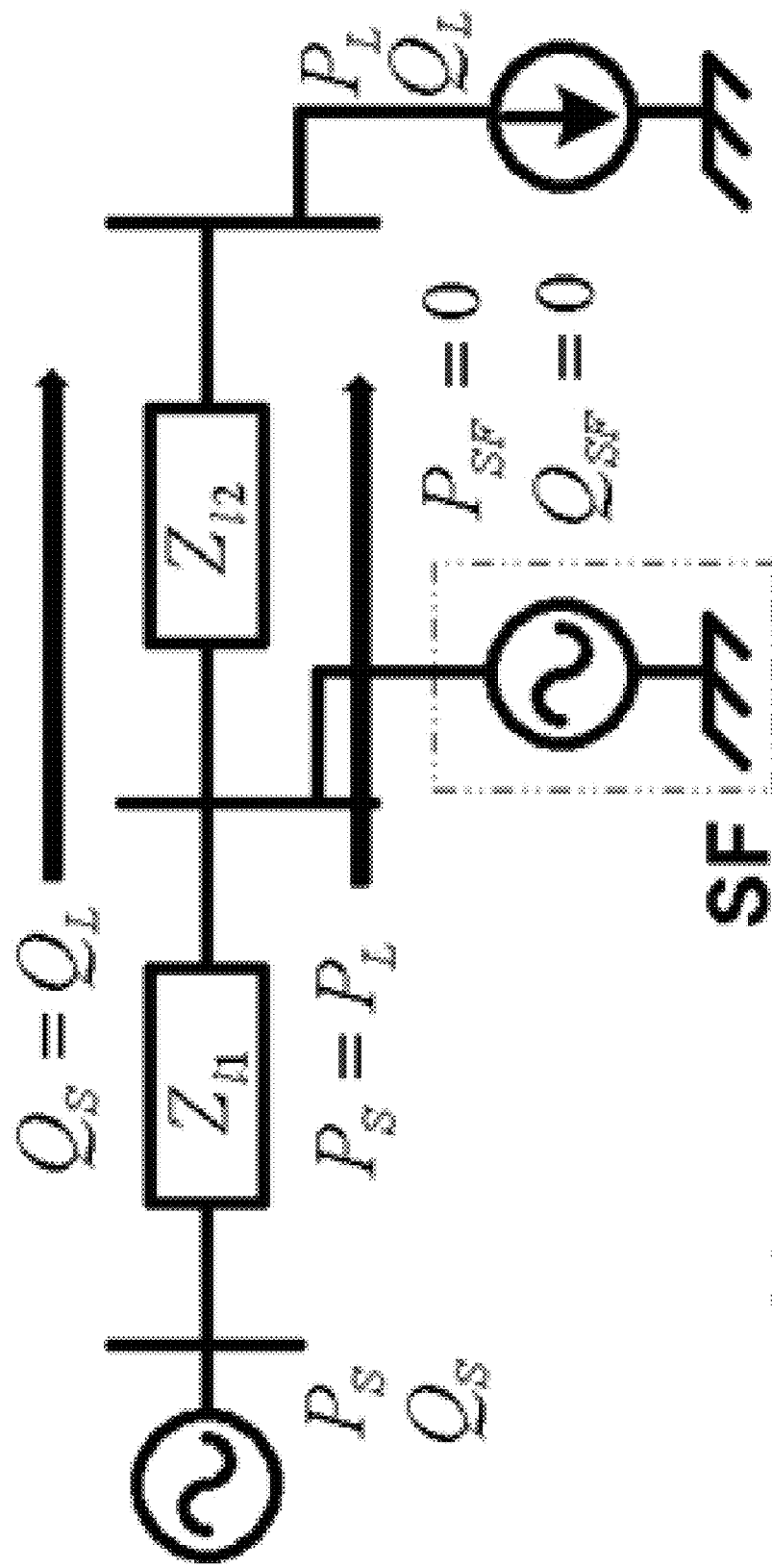

FIG. 5 (a) shows the phasor representation of a PV solar farm inverter compensating for the voltage rise during night-time. In order to compensate the increased voltage at PCC, the solar farm is controlled as an inductor. The lagging current supplied by the solar farm inverter ($I_{SFq}$) will cause a subtractive voltage drop $V_C$ across the line inductance. The result of this will bring back the excess over voltage within the acceptable voltage limit. In FIG. 5 (b) the voltage rise compensation during day-time is shown. Here, the solar farm inverter injects active and reactive current components simultaneously to achieve overvoltage compensation while injecting active power to the grid. Equations (1) to (3) are also applicable for voltage rise compensation.

It is important to note that the above formulation is based on the assumption of an inductive line (Rl=0). For a more precise representation and calculation, the line resistance should also be considered. With a combined inductive and resistive line, when the solar farm inverter is utilized for voltage regulation, the drop across the resistive element will increase or decrease the phase angle shift between the resultant PCC and distribution transformer secondary voltages.

Thus, the solar farm inverter is operated (both during night-time and day-time) as a FACTS Device—STATCOM to regulate the feeder voltage and to support the expansion of the capacity of a distribution network. The increased capacity enables the addition of distributed power sources that would otherwise cause the line voltage to exceed rated limits at night. In a preferred embodiment, the additional distributed power sources include one or more wind farms connected on the same feeder.

In one implementation, the solar farm inverter is controlled to perform several other tasks. All these features are represented by block diagrams to depict the role of PV solar farm in supporting/injecting the reactive and active powers.

FIG. 6 shows the block diagram representation of a current utilization of a PV solar farm over a period of 24 hours. The load is assumed to be a combination of active and reactive power loads and the DG system is represented only by the solar farm. For better understanding, the flow of powers (active & reactive) at different locations is also highlighted in block diagrams.

FIGS. 6 (a)-(c) represent a typical day-time operation of a PV solar farm. Under these conditions, the solar farm injects active power generated by PV cells and this is termed as the 'active power injection (API)' mode of operation. Three possibilities for power generation from the solar farm are: (i) power generated by the solar farm ($P_{SF}$) is less than the load active demand ($P_L$) [FIG. 6 (a)], (ii) $P_{SF}$ is exactly equal to $P_L$ [FIG. 6 (b)], and (iii) $P_{SF}$ is greater than $P_L$ [FIG. 6 (c)]. The condition in FIG. 6 (c) represents the reverse power flow.

FIG. 6 (d) shows the block diagram representation of the solar farm during night-time. Note that the solar farm is inactive during the entire night-time period. In all of the above mentioned operating scenarios, the reactive power demanded by the load is supplied by the grid.

The control aspects of the system are summarized in FIG. 7 and are briefly addressed hereafter. FIG. 7(a) depicts the previously discussed PV solar farm inverter as a STATCOM to regulate the PCC voltage. This mode of operation is referred to as 'voltage regulation (VR)'. The reactive power flow Qs during the voltage regulation mode of operation, seen from the distribution transformer side, will be the vector sum of $Q_L$ (if any) and $Q_{VR}$.

Furthermore, in another implementation, the PV solar farm inverter is controlled to damp any power oscillations caused by electromechanical oscillations (0.8-2 Hz) of synchronous generators in the grid as well as by any inter-area oscillations (0.1-0.8 Hz), or subsynchronous oscillations in synchronous generators or wind generators connected to series compensated lines, or HVDC converters, that may get excited after any disturbance in the power system. It should be noted that these disturbances might come from line/transformer switching or faults. The solar farm inverter can also be operated to improve the stability limit of the power system thus enabling higher power flows in the transmission lines in a secure manner. All these control aspects are accomplished through the auxiliary controller, referred to hereafter as the Aux. Ctrl.

It should be noted that the auxiliary controller can be based on either locally measured signals known as "local" signals, or remotely transmitted signals known as "remote" signals. A property of these auxiliary signals is that they contain/reflect the power system oscillations which need to be damped by the solar farm inverter acting as a STATCOM. Examples of "local signals" are the line active power flow, the magnitude of line current, the local bus frequency, etc. On the other hand, examples of remote signals include remote bus voltages, oscillations of remote generators, and remote line flows, etc. These remote signals are made available to the Solar Farm acting as a STATCOM through Phasor Measurement Units (PMU) based on GPS technology, or are transmitted through dedicated fibre optic cables.

The auxiliary controller may utilize a washout filter, a gain element, and a few stages of lead-lag controllers. The output of the auxiliary controller adds to the voltage controller. While the voltage control mode attempts to keep the PCC voltage constant with a very small time constant (15-45 msec), the auxiliary damping control allows a small modulation of the PCC voltage around the nominal values (with a slow time constant (0.1-2 sec)). This imparts a damping capability to the system when oscillations exist on the network. In absence of oscillations, only the voltage controller is active.

It should also be noted that if the load on the network demands lagging or leading reactive power, the PV solar farm inverter is controlled to support a leading (capacitive) or a lagging (inductive) reactive power. FIGS. 7 (c) and (d) show the flow of reactive power for a lagging power factor and for a leading power factor load condition, respectively. This "load reactive power compensation" (LRPC) mode of operation can thus ensure a unity power factor operation at PCC and can also help to reduce the line losses by an appreciable extent.

The difference between voltage regulation and load reactive power compensation modes of operation is explained here. When the solar farm inverter is used to support lagging or leading load reactive power demand, the voltage at PCC is indirectly raised or lowered, respectively, by a certain percentage. This percentage wholly depends on the amount of reactive power (lagging or leading) required by the load. However, there is no direct control over such voltage regulation. On the other hand, during the voltage regulation mode of operation, improvement in the power factor can also be accomplished. The two issues of voltage control and load power factor correction can be optimally controlled by integrating these aspects as depicted in FIG. 7 (e).

Figure 7A:
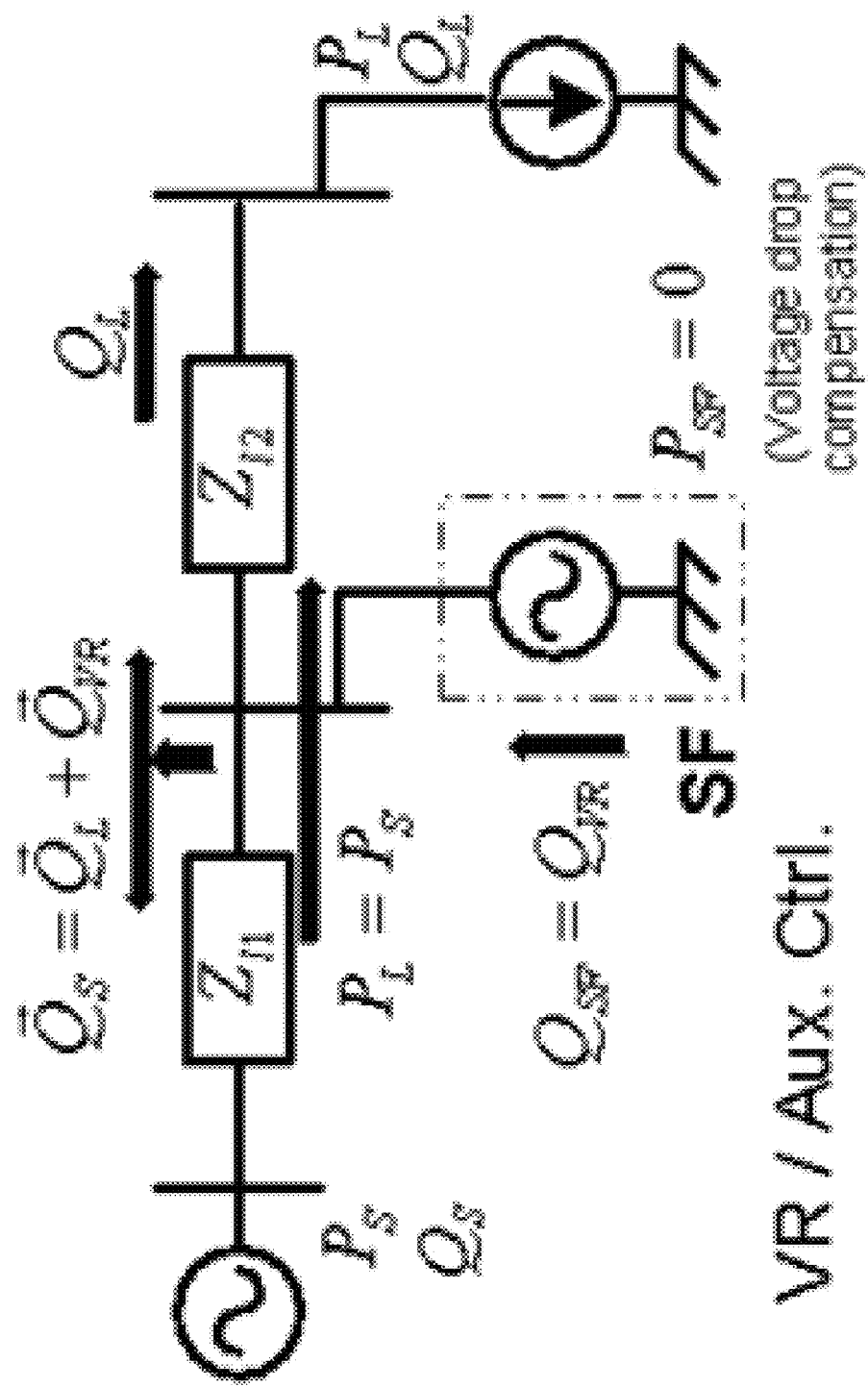
FIGS. 7A-7I show different modes of operation of a PV solar farm during night-time—(a) and (b) show a "voltage regulation (VR)" mode of operation, (c) and (d) show a "load reactive power compensation" (LRPC) mode of operation, (e) shows integration of voltage control and load power factor correction, (f) shows injection of harmonic active and reactive powers for harmonic compensation, and (g), (h), and (i) show various coordinated features in the modes of operation.
Figure 7B:
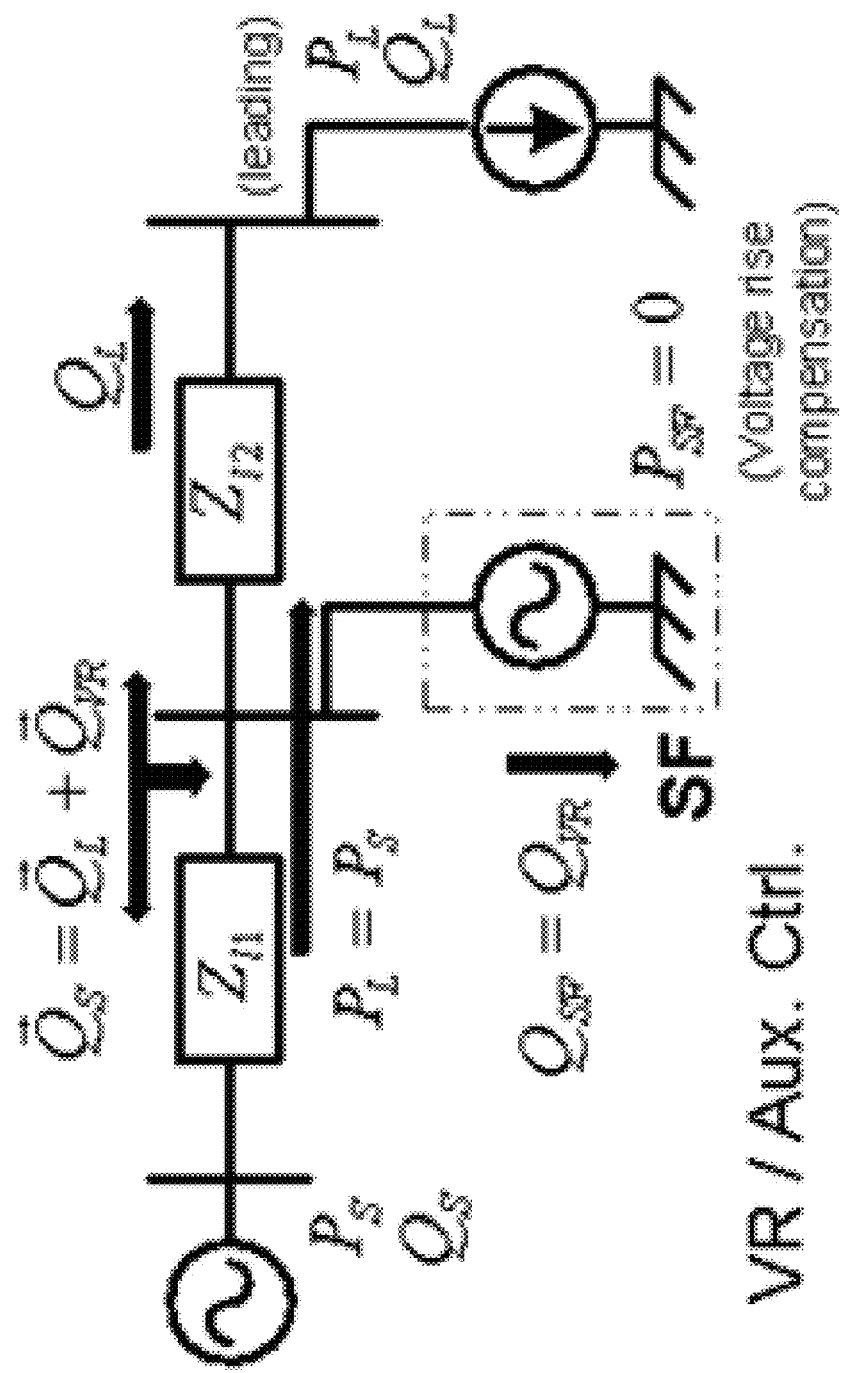
Figure 7C:
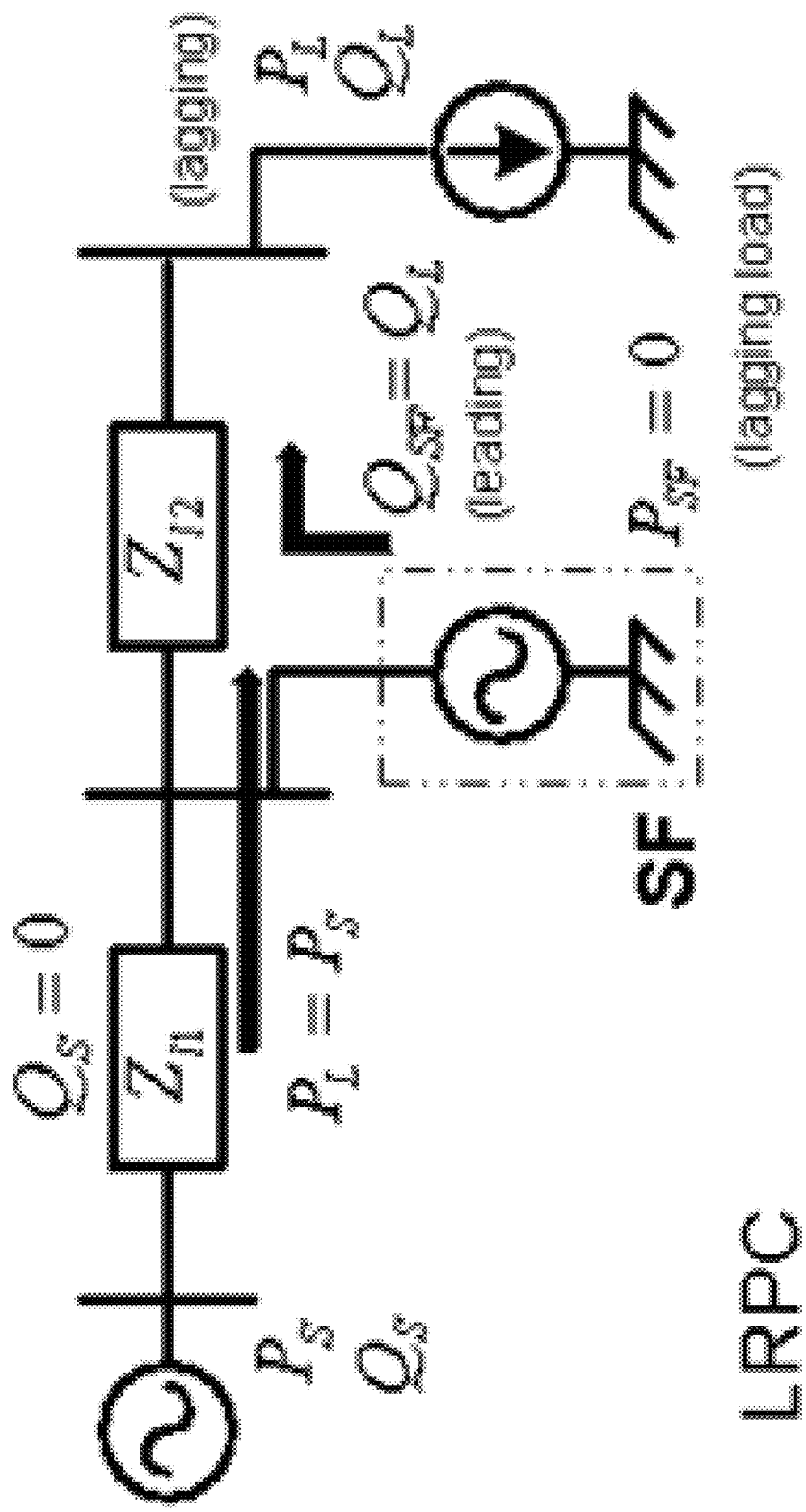
Figure 7D:
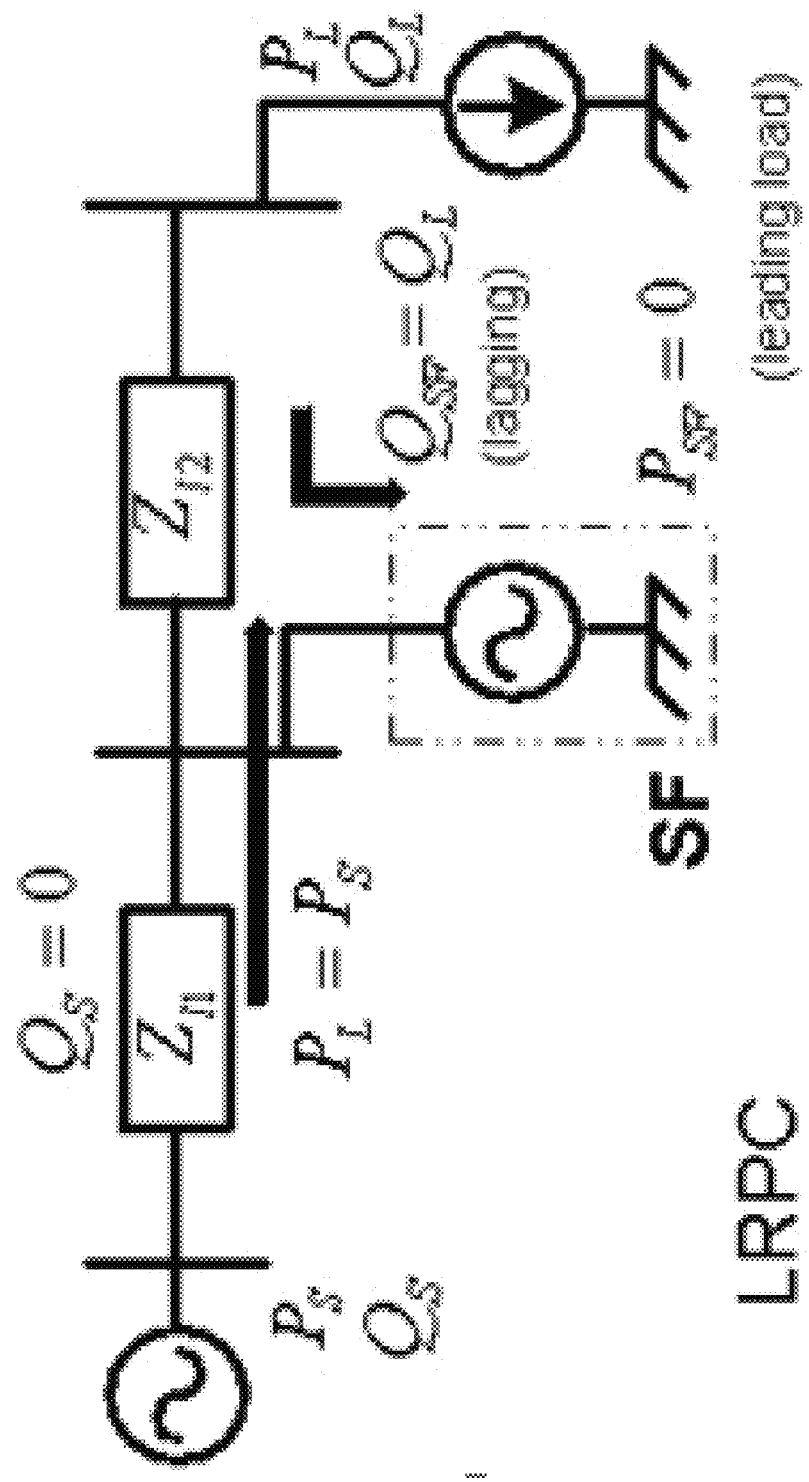
Figure 7E:
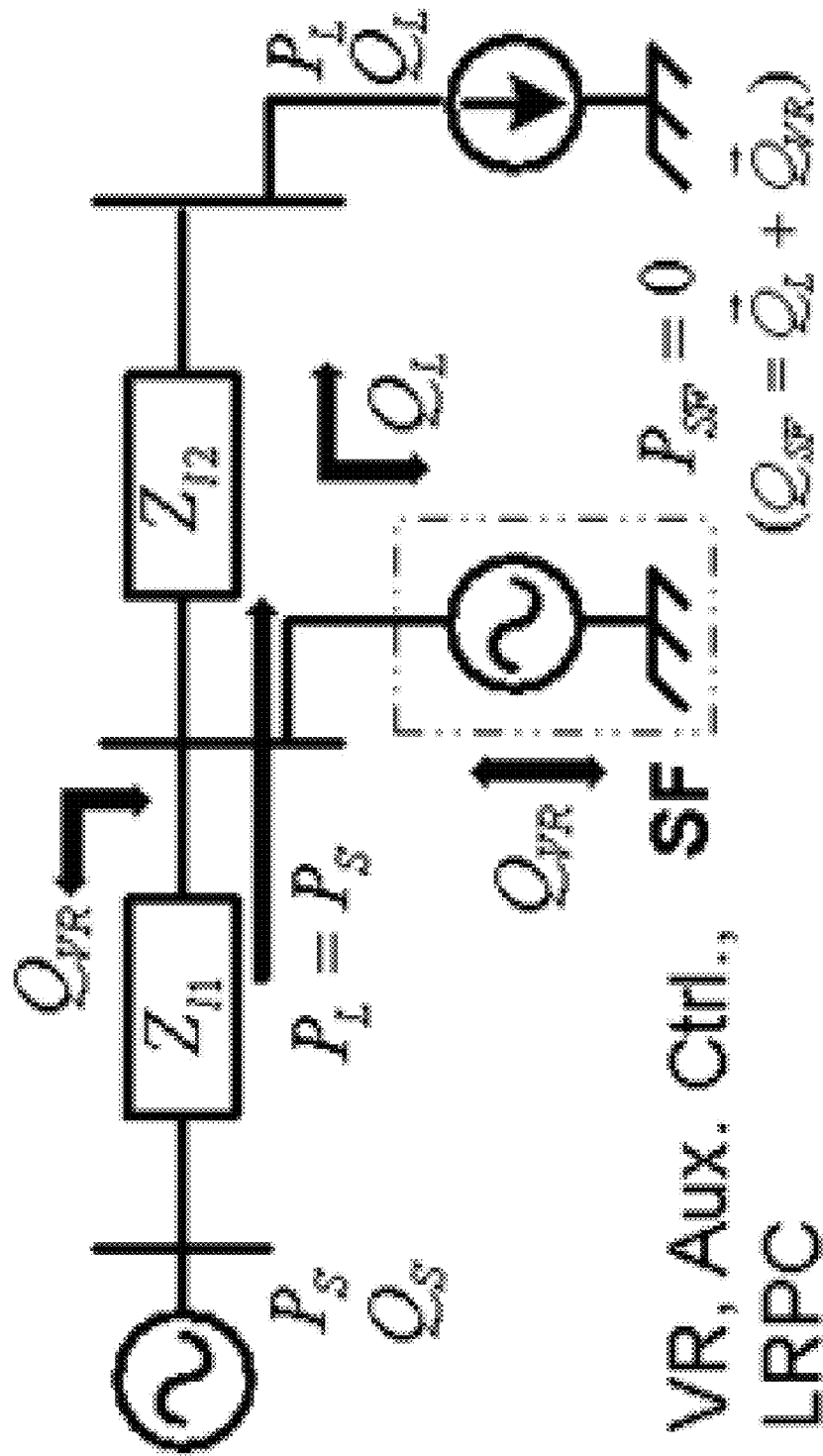
Figure 7F:
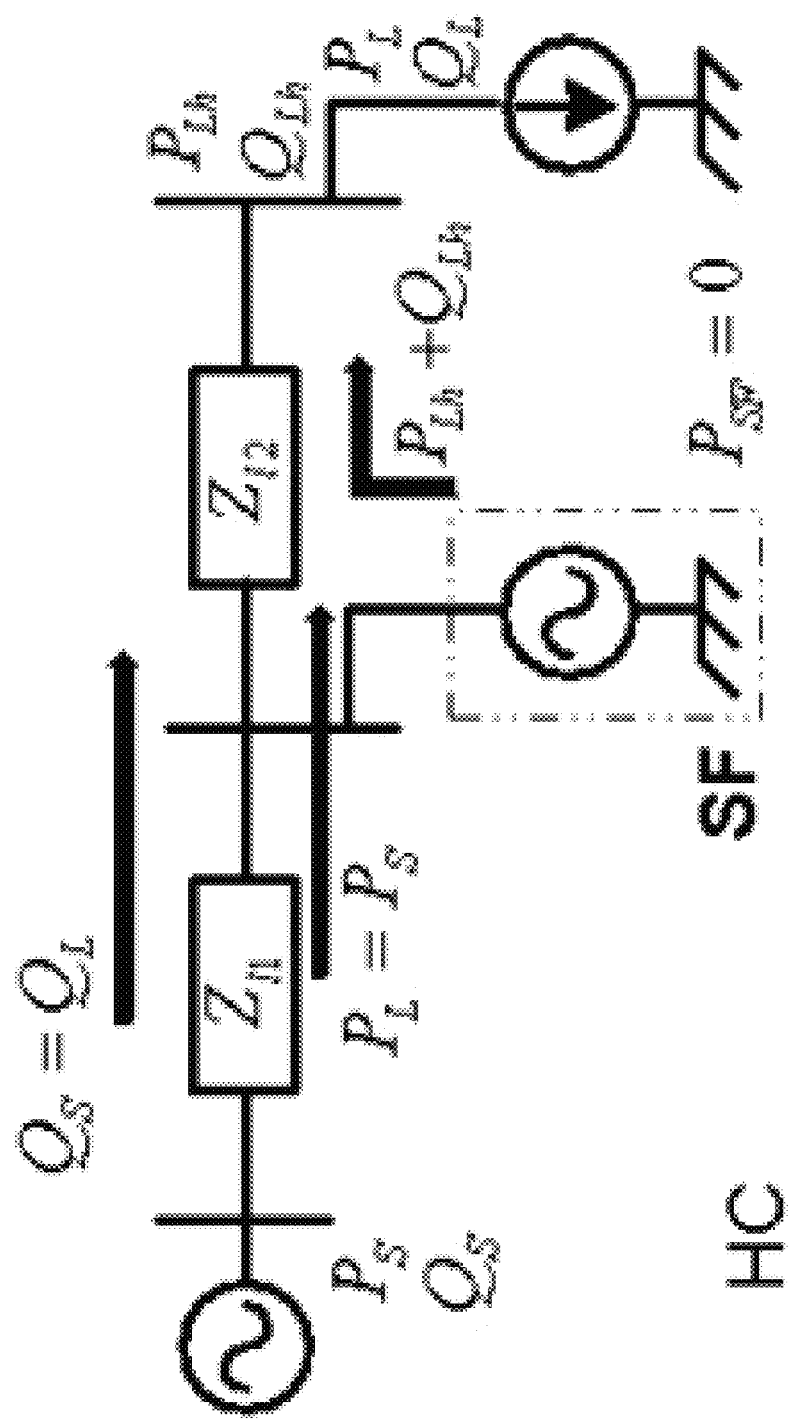
Figure 7G:
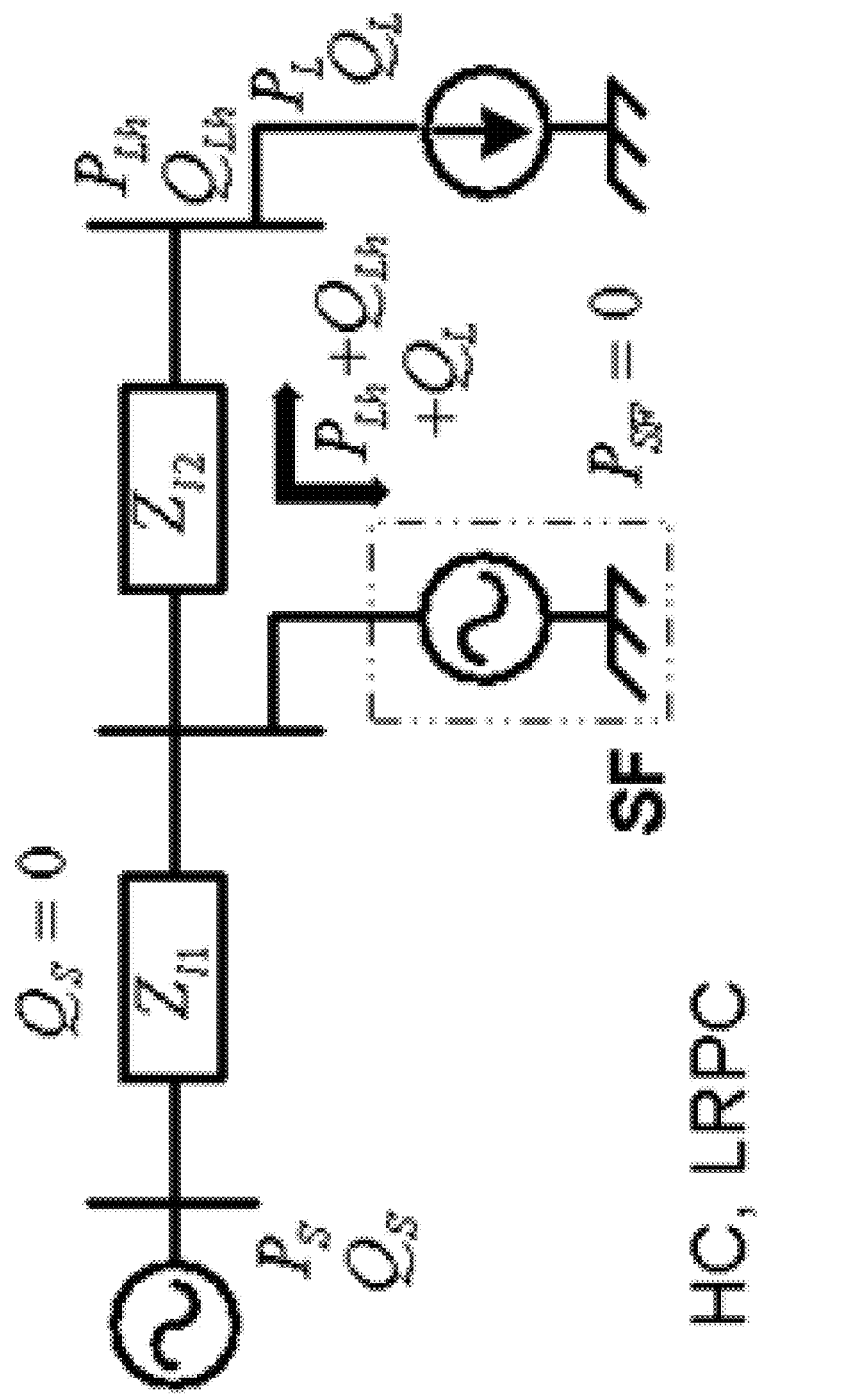
Figure 7H:
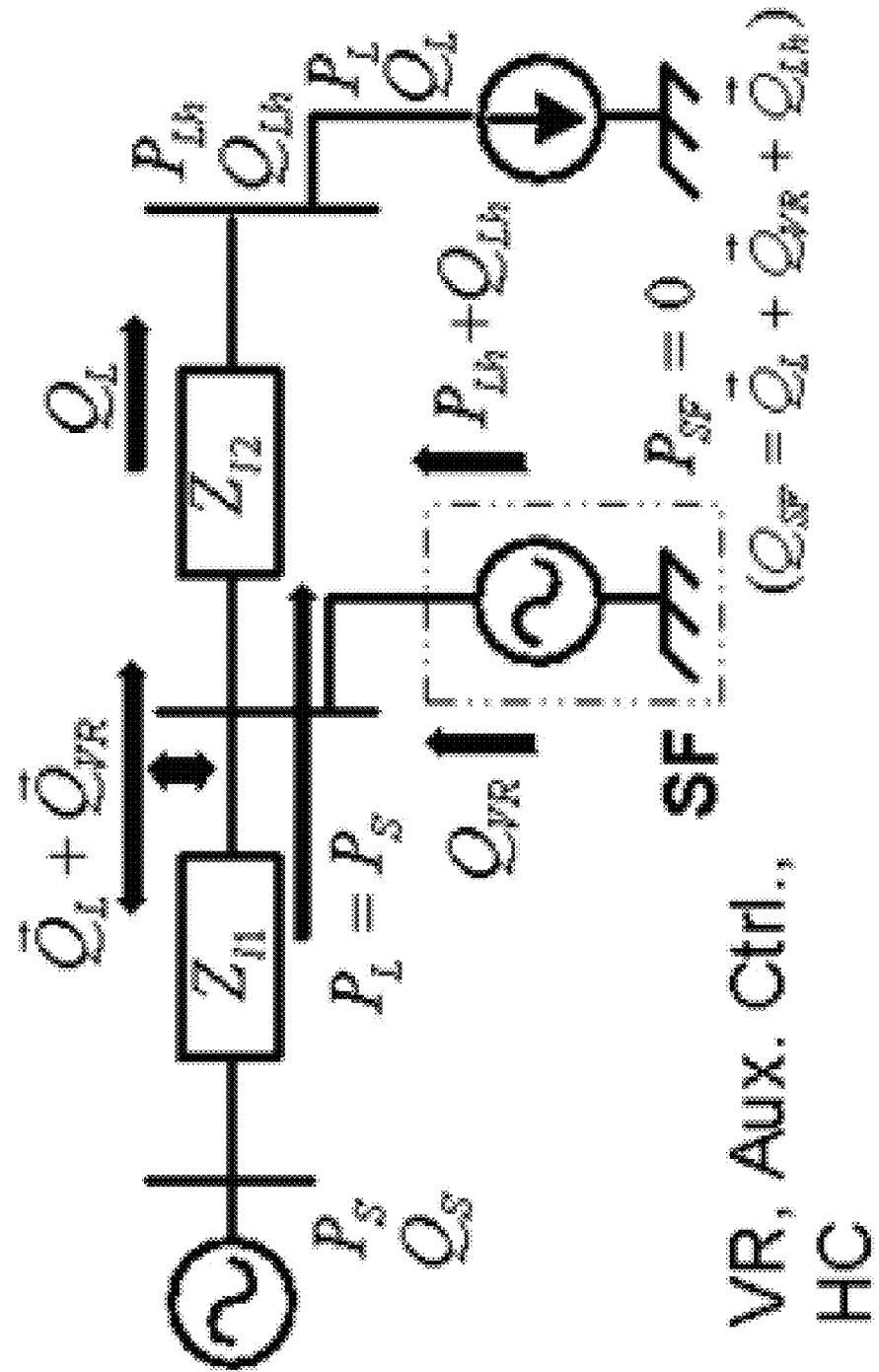
Figure 7I:
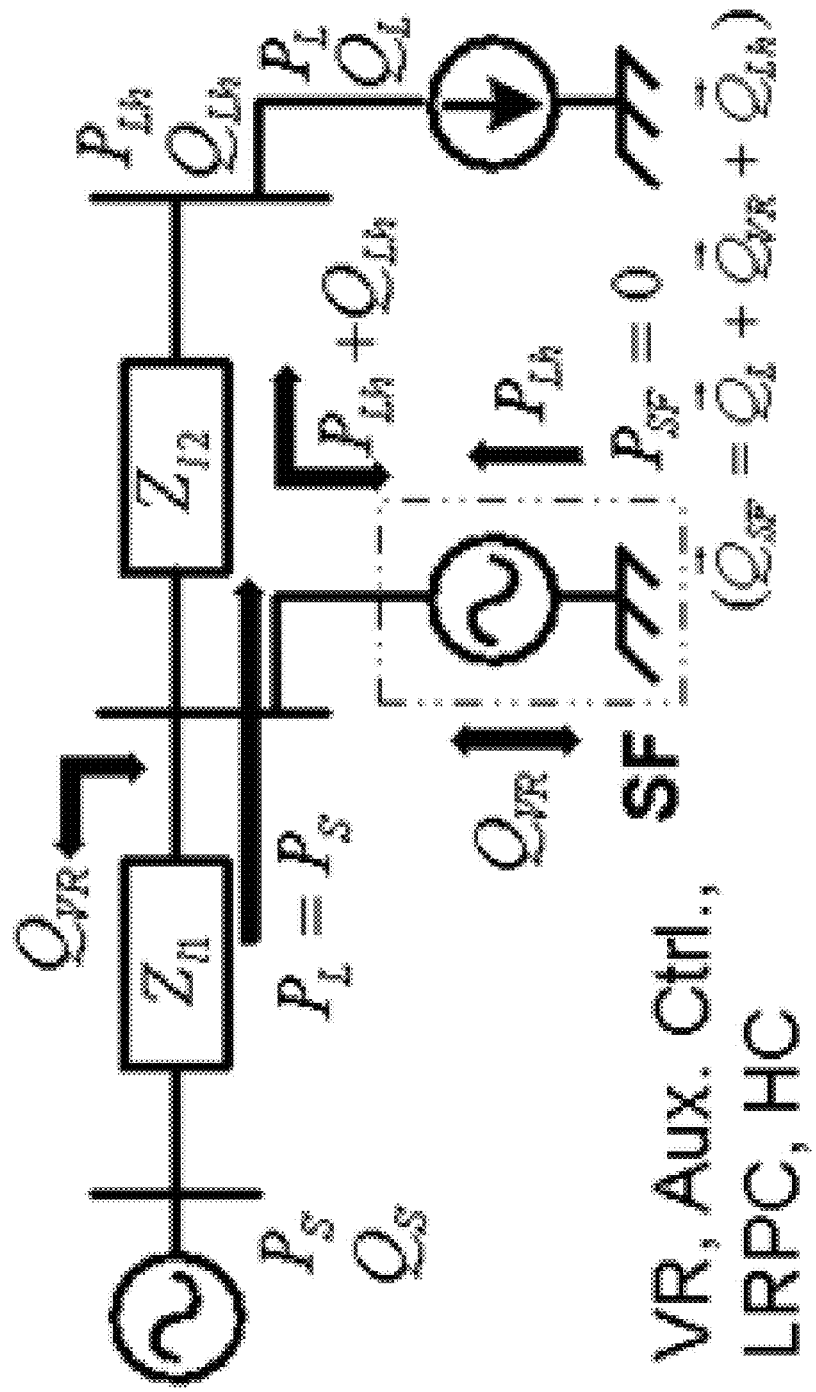
Figure 8A:
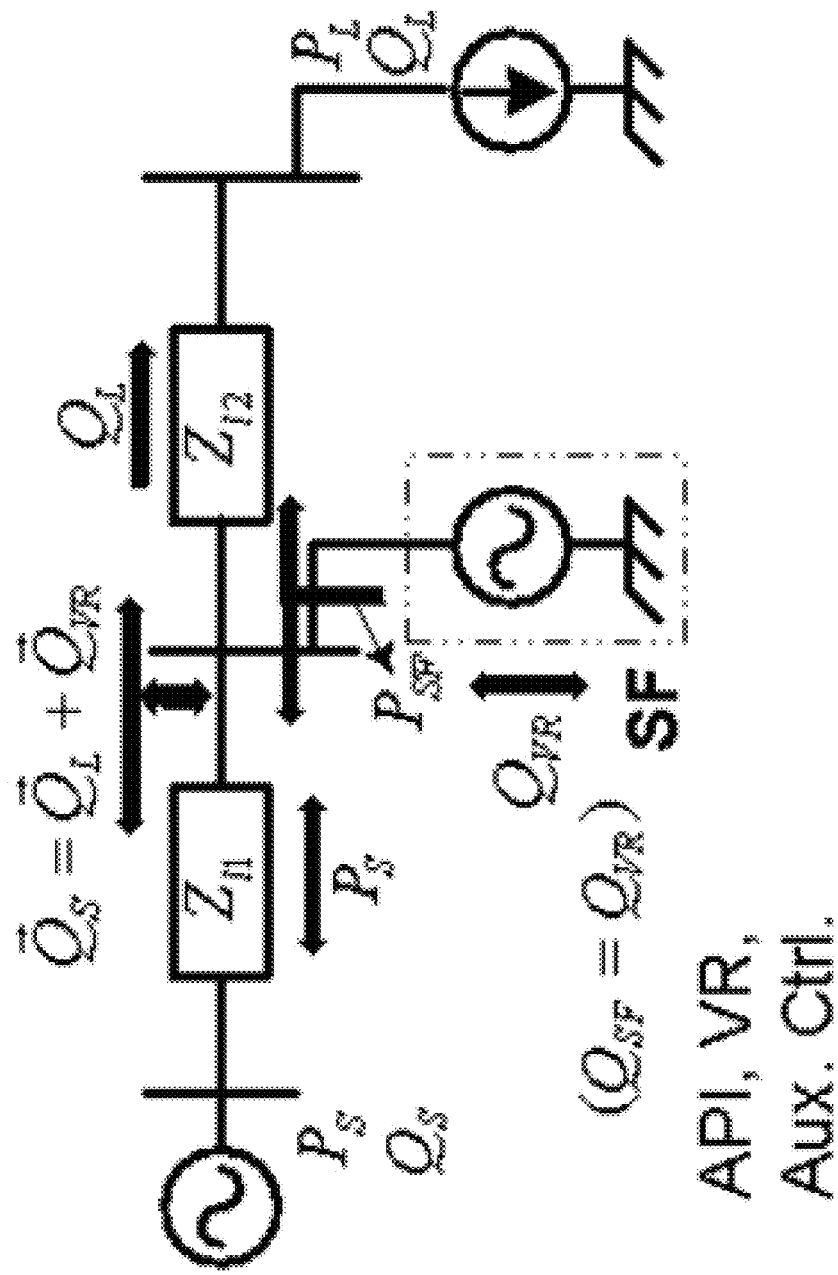
FIGS. 8A-8D show additional modes of operation of a PV solar farm during night-time—(a), (b), and (c) are block diagram representations for a number of combined features and in (d) all these various features are combined.
Figure 8B:
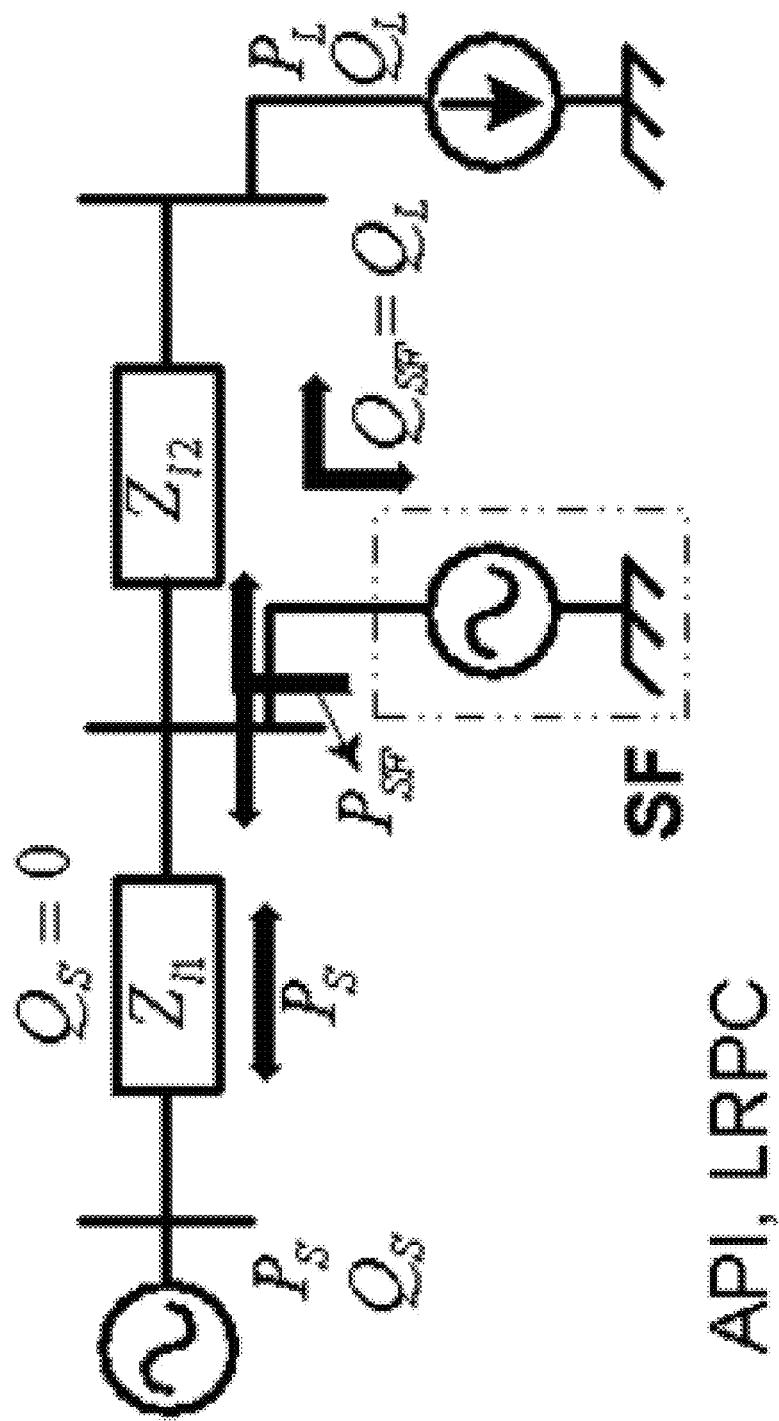
Figure 8C:
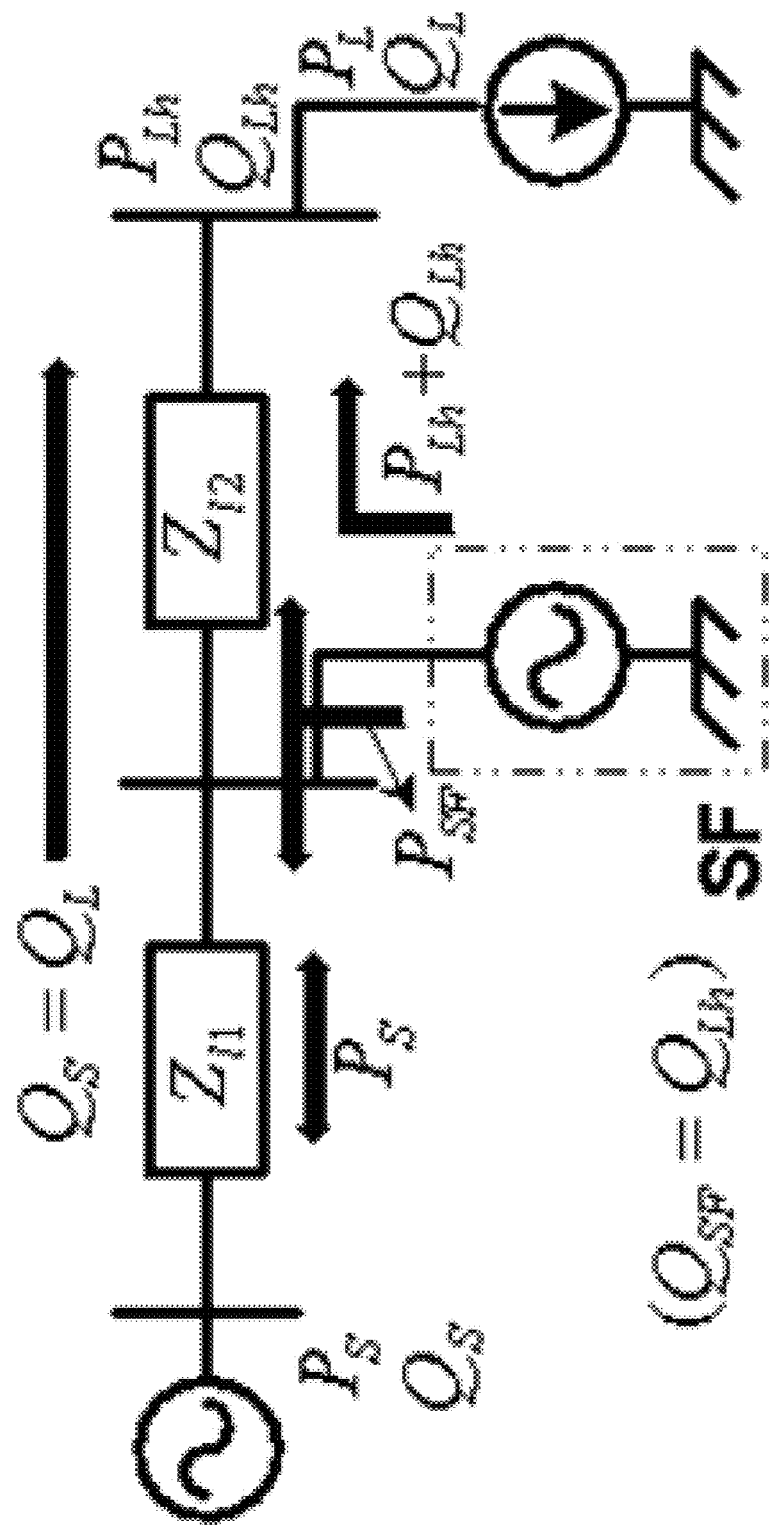
Figure 8D:
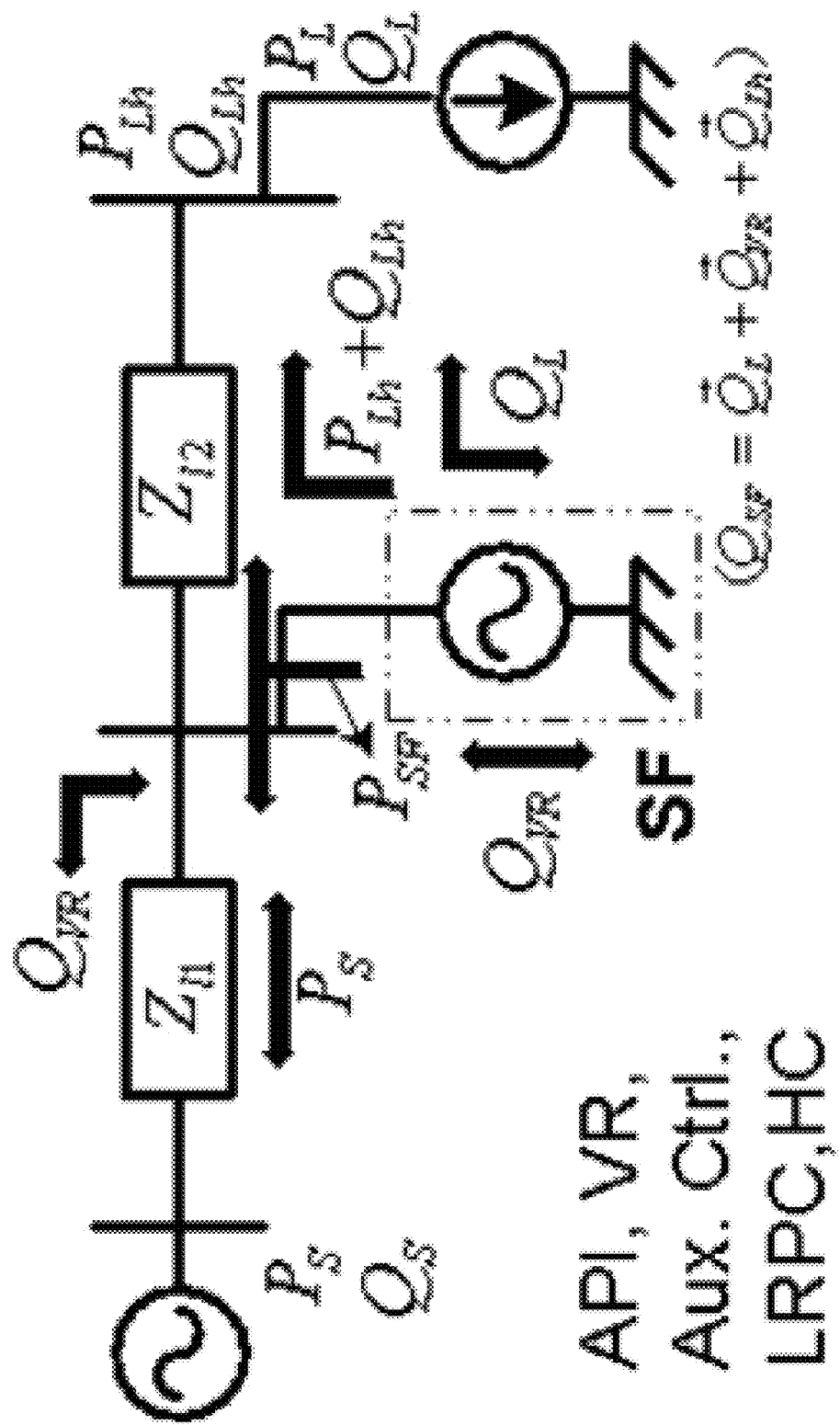

The PV solar farm inverter can also be utilized to compensate/neutralize the harmonics generated by a non-linear load and thus can help to reduce the harmonics pollution on the distribution network. This control feature is referred to as 'harmonic compensation (HC)' mode of operation. FIG. 7(f) depicts the injection of harmonic active and harmonic reactive powers by the PV solar farm inverter to compensate for the harmonics generated by the non-linear loads connected downstream of the solar farm.

In the preceding discussion, the possible control approaches for the solar farm inverter to achieve individual functions at the distribution level have been presented. However, on a typical distribution network, a combination of these functions may need to be accomplished. In an implementation of the system and method, the above discussed functions are coordinated simultaneously.

These coordinated features are depicted in FIGS. 7 (g), (h) and (i) for the combined VR/Aux. Ctrl. and HC; LRPC and HC; and VR/Aux. Ctrl. and LRPC and HC compensations, respectively. For a 3-phase 4-wire system, the solar farm inverter can also be utilized to compensate unbalanced load currents drawn by the combination of three-phase and single-phase loads. The block diagram representation for this feature is not shown in the FIG. 7.

In yet another implementation, the PV solar farm inverter is operated as a fully controlled battery charger or charger of an energy storage system in general (mechanical energy based, electrochemical energy based, electrical energy based as in ultracapacitors, or Hydrogen storage based, etc.) especially during the night-time. In this case, the PV solar farm inverter in a combined solar farm and wind farm DG system is utilized in conjunction with energy storage batteries to store the excessive power generated by the wind farm. This feature performs two functions: (i) improving the system reliability by releasing the stored battery charge during peak load condition and, (ii) the real power storage during the charging process helps to regulate the rise in feeder voltage if controlled in an appropriate manner.

The solar farm inverter during the day-time should necessarily inject active power generated by the PV solar cells. While injecting the active power to the grid, the solar farm inverter can be additionally controlled to achieve the features discussed earlier in this document. However, the available solar farm inverter rating may impose a limitation on the amount of reactive power that can be injected during the day-time.

For a comprehensive overview, four block diagram representations of a day-time operation are shown in FIG. 8. The block diagram representation for combined API & VR/Aux. Ctrl., API & LRPC and API & HC compensations are shown in FIGS. 8 (a), (b) and (c), respectively. FIG. 8 (d) shows the condition in which all of the features of API, VR/Aux. Ctrl., LPRC and HC are included. Similar to night-time operation, for a 3-phase 4-wire distribution system, the current unbalance compensation feature is achievable during the day-time too.

The above discussions disclose several control aspects of the system. The successful realization of the disclosed control aspects depend mostly on the amount of reactive power injected by the PV solar farm inverter (except for load balancing in which certain amount of active power is exchanged between load, inverter and grid). During the night-time mode of operation, a small amount of active power is drawn by the solar farm inverter to operate in self-supporting mode. The maximum reactive power that can be supported by a PV solar farm inverter is dependent on the MVA rating of that inverter. In the following section, the possibilities of reactive power support by a PV solar farm inverter are mathematically represented.

During night-time:

$$\left.\begin{array}{l} P_{SF} = 0, \text{ therefore, } Q_{SF} = Q_{SF\,max} = S_{SF,\,rated} \\ I_{SF} = I_{SFq} \\ \varphi_{SF} = 90° \end{array}\right\} \quad (4)$$

During day-time:
For rated power generation (100%)

$$\left.\begin{array}{l} P_{SF} = P_{SF\,max} = S_{SF,rated}, \text{ therefore, } Q_{SF} = 0 \\ I_{SF} = I_{SFa} \\ \varphi_{SF} = 0° \end{array}\right\} \quad (5)$$

For power generation less than the rated value (<100%)

$$\left.\begin{array}{l} S_{SF,\,rated} = P_{SF} + jQ_{SF} \\ I_{SF} = \vec{I}_{SFa} + \vec{I}_{SFq}, \\ \varphi_{SF} \ne 90° \ne 0° \end{array}\right\} \quad (6)$$

From (5), when the power generation from PV solar farm is at its rated value during day-time, the solar farm inverter cannot be used to provide the reactive power. For lesser active power generation, there is always an opportunity to provide simultaneous active and reactive power.

Figure 9:
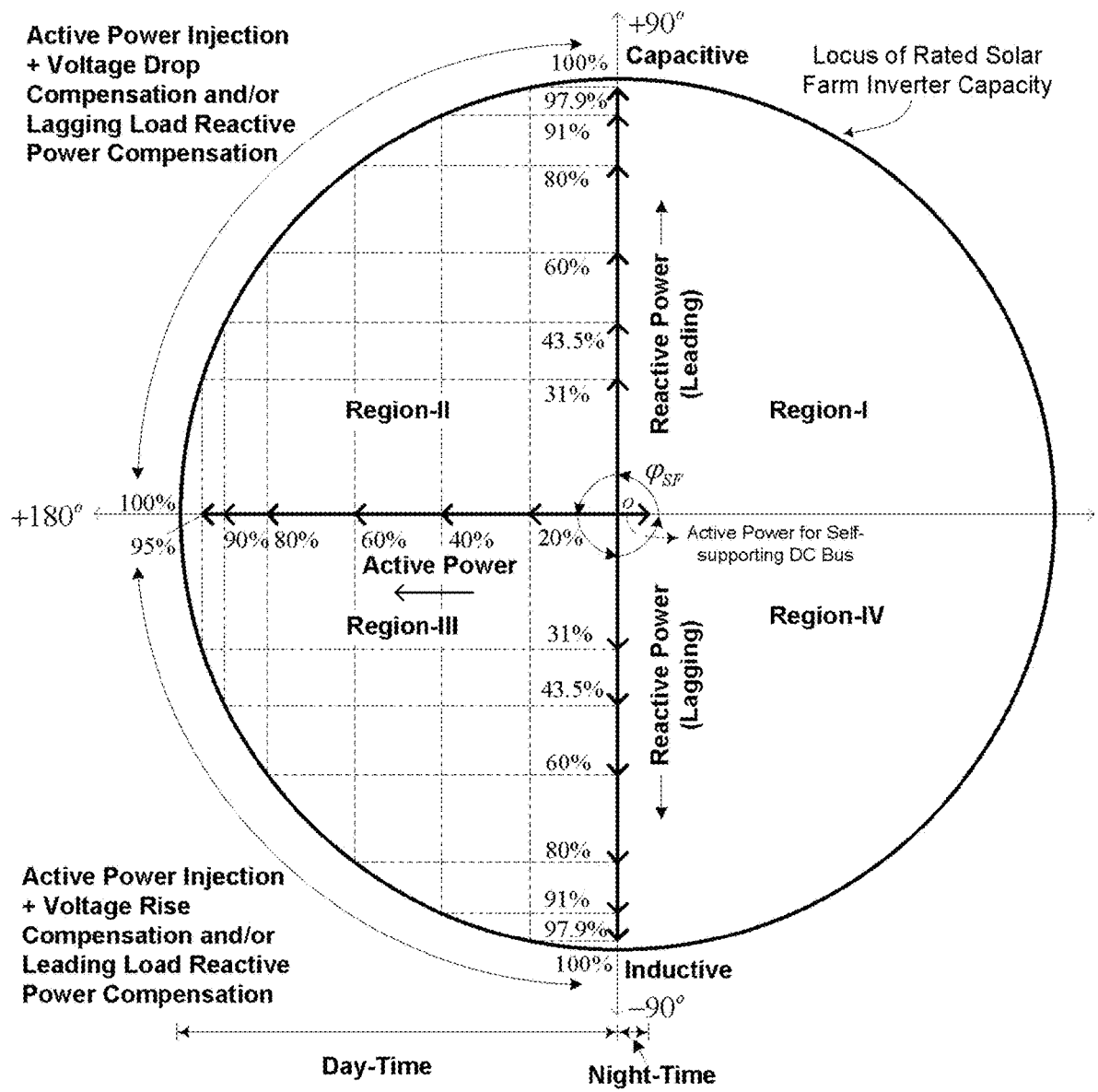
FIG. 9 shows a PV solar farm inverter active-reactive powers (P-Q) capability curve.

FIG. 9 shows an active-reactive powers (P-Q) capability curve drawn on the basis of rated PV solar farm inverter capacity. The x-axis represents the possible values of active powers and the y-axis represents the possible values of reactive powers that the PV solar farm can support without an increase in available inverter rating. The P-Q diagram is divided in four regions based on the phase angle ($\varphi_{SF}$) of net injected current $I_{SF}$ ($\varphi_{SF}$ is measured with respect to the PCC voltage), namely, Region—I, II, III and IV.

Ideally, the PV solar farm inverter should not consume any active power—there is therefore no activity in Region-I and Region-IV. However, using the present invention, especially during night-time, the PV solar farm will draw a very small amount of active power to maintain the voltage across the DC side capacitor. This active power is essential to overcome the losses associated with the inverter. When the PV solar farm does not produce any active power, the available reactive power capacity is 100%. As can be seen from FIG. 9, when the PV solar farm generates only 20% of rated power (early morning/evening hours), up to 97.9% reactive power is available for different compensations. Interestingly, 95% power generation still provides 31% of reactive power capacity that can be gainfully utilized.

In one implementation, an improved solar farm inverter is provided to support reactive power while injecting maximum rated power. To achieve reactive support while injecting maximum rated power, the solar farm inverter is provided with an increased power (MVA) rating. It should be noted that even a moderate over-sizing of the solar farm inverter provides significant benefits. In one example, if a solar farm inverter is over-sized by 5% to 10%, the available reactive power capacity left to perform other tasks would be 32% to 45.8% using 100% active power injection capacity.

The significant benefits provided by the above system can be understood in an example in which a utility company needs to install a STATCOM to regulate the PCC voltage. In this case, if utility wants to provide 100% reactive power capacity, the required STATCOM rating would also be 100%.

From the above, it can be seen that that simply over-rating the PV solar farm by 41.2% would provide the same capability as a separately installed 100% capacity STATCOM. Furthermore, one additional benefit with this over-sized (141%) inverter is that, during night-time when there is no active power generation, the reactive power capacity of inverter also would increase from 100% to 141%.

The STATCOM is rated based on its apparent power rating which is directly dependent on its semiconductor switches' voltage and current rating. The general manner of expressing the rating/capacity of electrical power related to electrical devices is by defining its MVA (Mega volt ampere; M for Mega, V for voltage, A for current in ampere).

Figure 10A:
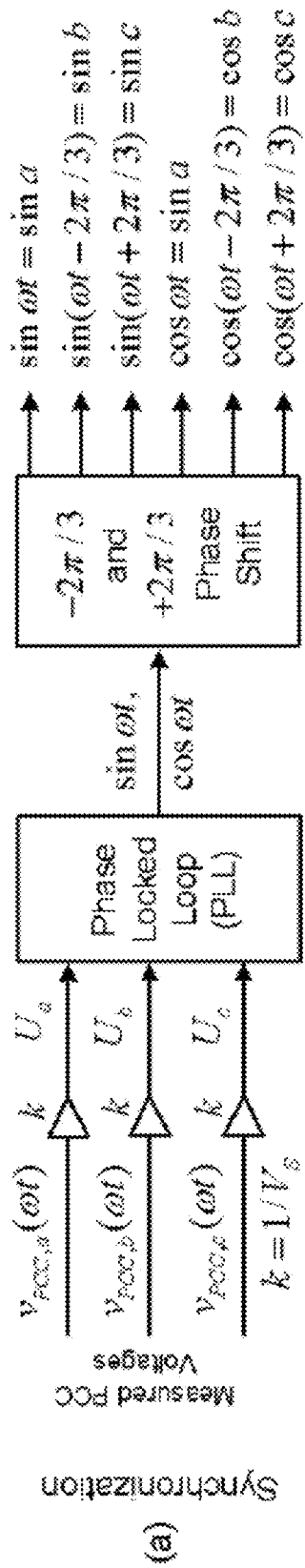
FIGS. 10A and 10B show a block diagram representation of a control scheme used to implement a system described below.
Figure 10B:
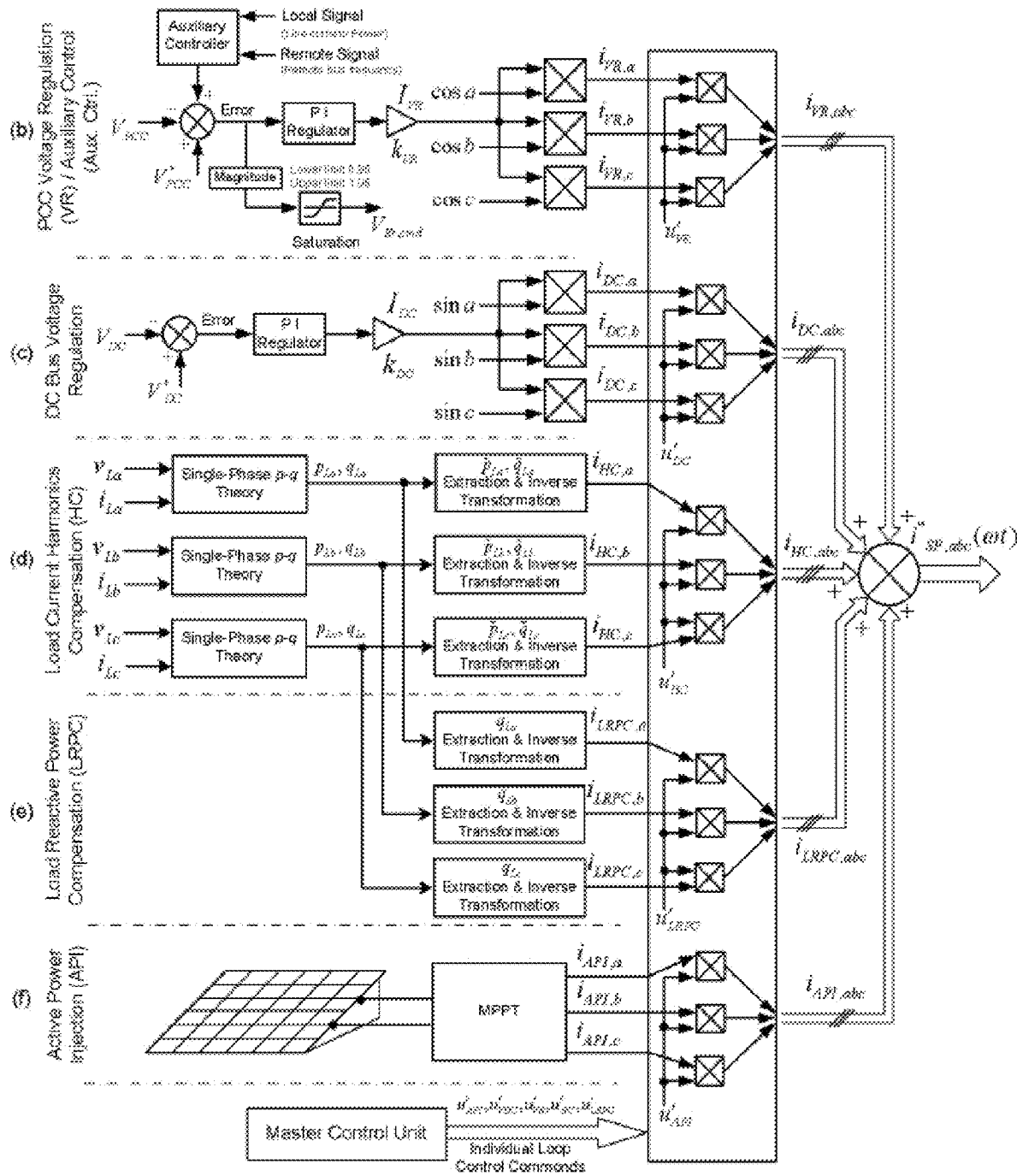

FIGS. 10A and 10B show an exemplary block diagram representation of the control scheme used to achieve the preferred control concepts in which the solar farm is adapted to perform as a STATCOM and/or shunt active power filter. The exemplary control scheme is applicable both during the night and day times. The controller has six different loops, namely (a) synchronization (in FIG. 10A), (b) PCC voltage regulation and damping control (in FIG. 10B), (c) DC bus voltage regulation (in FIG. 10B), (d) load current harmonic compensation (in FIG. 10B), (e) load reactive power compensation (in FIG. 10B) and (f) active power injection (in FIG. 10B).

A phase locked loop (PLL) is used to maintain synchronization with PCC voltage. The PLL gives output in terms of sine and cosine functions. The cosine functions are used to generate the reference quadrature components of currents to regulate PCC voltage. The sine functions are used to generate the in-phase reference current components. These components draw necessary fundamental active power to maintain the DC bus voltage at a predefined reference value. PCC and DC bus voltage control loops are composed of proportional-integral (PI) controllers.

In another implementation, an auxiliary controller is added in the PCC voltage regulation loop. This auxiliary controller can provide stabilization and damping controls for several proposed applications of the solar farm. Both the structure and operation of the auxiliary controller have already been described above.

To regulate the PCC voltage, the actual voltage at PCC is sensed and compared with a reference value $V^*_{pcc}$ of 1 pu. The output of the auxiliary controller is added to the voltage reference. The difference between the actual and reference voltages and auxiliary signal is then processed with the Proportional Integral (PI) regulator. The output of PI regulator is amplified with gain ($k_{VR}$) to generate the reference current magnitude ($I_{VR}$). The current magnitude $I_{VR}$ is then multiplied with cosine functions ('cos a', 'cos b' and 'cos c') to generate the reference quadrature components ($i_{VR,abc}$) which will regulate the PCC voltage. Similarly, the reference signals $i_{DC,abc}$ required to maintain the DC bus voltage constant are generated using sine functions, especially during night-time. The signal $V_{Er,cmd}$ in PCC voltage regulation loop is extracted for use in the master control unit. This activates/deactivates the voltage regulation loop.

Generally, in the real-time implementation, the control scheme is developed using a sophisticated digital controller (such as a microcontroller, digital signal processor [DSP], etc.). All the necessary quantities required in the control approach, (e.g. in our case, different voltages and currents) are sensed using voltage and current sensors (such as Hall-effect transducers). These sensors, regardless of whether they are used to determine voltage or current or any other parameter in real-time, provide an output which is a "scaled voltage signal". For example, to sense a 120 kV voltage, the sensor may have an output of 1 volt as a representative signal. The user has control over the setting of the sensor gain which can adjust the output value. A similar situation exists for current measurement in that the user has control over sensor gain and, as such, can adjust the output value. These scaled signals are then converted into digital signals by using an analog to digital converter. The user then multiplies the necessary gain in DSP to extract the exact value of the sensed signal. For example, a 1 volt signal can be multiplied by 120,000 to obtain the exact value of the sensed signal. These gains are constant values and do not need to change or be affected by any variation in the sensed signals. In the present invention, reference currents are being generated which will be injected through the PV solar farm inverter to achieve different control aspects. For ease of understanding, it should be noted that the signal corresponding to voltage is denoted as 'voltage' and the signal corresponding to current is denoted as 'current'. As mentioned above, all these signals in DSP are 'voltages'. Since the mathematical computations/operations in executed in DSP, the terms 'voltage'/'current'/'power' etc. do not have significant meaning as they are all representative signals.

DC bus voltage regulation mode is applied only during the night-time mode of operation to provide a self-supporting DC bus across the PV solar farm inverter. The DC bus capacitor is usually charged from the electrical output of the solar panels. During night time, since there is no solar power produced, this DC bus capacitor still needs to be kept charged to supply the reactive power expected by the STATCOM operation. The solar arrays should be isolated from the DC bus capacitor by disconnecting them through mechanical switches. This helps to ensure that the solar arrays will not be damaged due to sudden surges in voltage/current.

The DC bus voltage control loop is also comprised of a proportional-integral (PI) regulator. To regulate the DC voltage, the actual DC bus voltage is sensed and compared with an appropriately selected reference value $V^*_{dc}$. The difference between the actual and reference voltages is then processed with the PI regulator. The output of the PI regulator is amplified with a proper gain ($k_v$) to generate the reference current magnitude $I_{DC}$. The current magnitude $I_{DC}$ is then multiplied with sine functions ('sin a', 'sin b' and 'sin c') to generate the in-phase reference components ($i_{dc,abc}$). These components draw the necessary fundamental current component (active power) to maintain the DC bus voltage at the reference level. This active power is needed to overcome the losses associated with the inverter and passive elements (e.g. coupling inductance, DC bus capacitor, etc.) during STATCOM operation.

To provide the load reactive power and to compensate for current harmonics (if any), the instantaneous determination of different active and reactive powers is used—the active and reactive powers are computed using single phase p-q theory. This approach is used as it allows separate or combined load reactive and current harmonic compensations. Additionally, in case of unbalanced load condition, an easy expansion to include load balancing is possible. Using the concept of single-phase p-q theory, a three-phase system is represented as three separate single-phase systems and the single-phase p-q theory is applied to each phase independently.

Considering phase-a, the PCC voltage and the load current can be represented in $\alpha$-$\beta$ coordinates as:

$$\begin{bmatrix} v_{PCC,a\_\alpha} \\ v_{PCC,a\_\beta} \end{bmatrix} = \begin{bmatrix} v_{PCC,a}(\omega t) \\ v_{PCC,a}(\omega t + \pi/2) \end{bmatrix} \quad (7)$$

$$\begin{bmatrix} i_{L,a\_\alpha} \\ i_{L,a\_\beta} \end{bmatrix} = \begin{bmatrix} i_{L,a}(\omega t + \varphi_L) \\ i_{L,a}[(\omega t + \varphi_L) + \pi/2] \end{bmatrix} \quad (8)$$

Using the concept of single-phase p-q theory, the instantaneous active and reactive powers are determined as:

$$\begin{bmatrix} p_{La} \\ q_{La} \end{bmatrix} = \begin{bmatrix} v_{PCC,a\_\alpha} & v_{PCC,a\_\beta} \\ -v_{PCC,a\_\beta} & v_{PCC,a\_\alpha} \end{bmatrix} \cdot \begin{bmatrix} i_{L,a\_\alpha} \\ i_{L,a\_\beta} \end{bmatrix} \quad (9)$$

Total instantaneous active ($p_{La}$) and total instantaneous reactive power ($q_{La}$) can be decomposed into fundamental and harmonic powers as:

$$p_{La} = \bar{p}_{La} + \tilde{p}_{La} \quad (10)$$

$$q_{La} = \bar{q}_{La} + \tilde{q}_{La} \quad (11)$$

In (10) & (11), $\bar{p}_{La}$ and $\bar{q}_{La}$ represent the DC components, which are responsible for fundamental load active and reactive powers. $\tilde{p}_L$, and $\tilde{q}_{La}$ represent the AC components which are responsible for harmonic powers. The fundamental instantaneous load active ($\bar{p}_{La}$) component and the fundamental instantaneous load reactive ($\bar{q}_{La}$) component can be extracted easily from $p_{La}$, and $q_{La}$, respectively, by using a low pass filter (LPF). Furthermore, the instantaneous harmonics active ($\tilde{p}_{La}$) and reactive power ($\tilde{q}_{La}$) components can be separated from the total power by using a high pass filter (HPF). Thus, using the concept of single-phase p-q theory, different active and reactive powers can be calculated separately in real-time.

For load current harmonic compensation, the solar farm inverter should supply the harmonic part of the load current. That is, the reference current signal generation should be based on terms $\tilde{p}_{La}$, and $\tilde{q}_{La}$.

Therefore for phase-a, $$\begin{bmatrix} i_{HC\_\alpha} \\ i_{HC\_\beta} \end{bmatrix} = \frac{1}{A_{xa}} \cdot \begin{bmatrix} v_{PCC,a\_\alpha} & v_{PCC,a\_\beta} \\ v_{PCC,a\_\beta} & -v_{PCC,a\_\alpha} \end{bmatrix} \cdot \begin{bmatrix} \tilde{p}_{La} \\ \tilde{q}_{La} \end{bmatrix} \quad (12)$$

$$\text{where, } A_{xa} = v^2_{PCC,a\_\alpha} + v^2_{PCC,a\_\beta} \quad (13)$$

Since α-axis quantities represent the original system, the reference current for load current harmonic compensation can be given as:

$$i_{HC,a}(\omega t) = \frac{1}{A_{xa}} \cdot [v_{PCC,a\_\alpha}(\omega t) \cdot \tilde{p}_{La}(\omega t) + v_{PCC,a\_\beta}(\omega t) \cdot \tilde{q}_{La}(\omega t)] \quad (14)$$

Similarly, the reference current for load current harmonic compensation for phase-b and phase-c are also estimated.

For fundamental load reactive power compensation, the reference current should be based on only the term $\bar{q}_{La}$.

Therefore for phase-a, $$\begin{bmatrix} i_{LRPC\_\alpha} \\ i_{LRPC\_\beta} \end{bmatrix} = \frac{1}{A_{xa}} \cdot \begin{bmatrix} v_{PCC,a\_\alpha} & v_{PCC,a\_\beta} \\ v_{PCC,a\_\beta} & -v_{PCC,a\_\alpha} \end{bmatrix} \cdot \begin{bmatrix} 0 \\ \bar{q}_{La} \end{bmatrix} \quad (15)$$

The reference current for load reactive power compensation can be given as:

$$i_{LRPC,a}(\omega t) = \frac{1}{A_{xa}} \cdot [v_{PCC,\beta}(\omega t) \cdot \bar{q}_{La}(\omega t)] \quad (16)$$

Similarly, the reference current for load reactive power compensation for phase-b and phase-c are also estimated.

The active power generated from the PV solar plant is transferred to the main grid through a proper controller, for example, in the maximum power point tracking (MPPT) mode. Finally, all the control loop current components are added together to generate the overall reference current signals ($i^*_{SF,abc}$) for the solar farm inverter. These reference signals are then compared with actual sensed solar farm inverter output currents ($i_{SF,abc}$) and processed using a hysteresis current controller to perform switching of inverter semiconductor devices.

Figure 11:
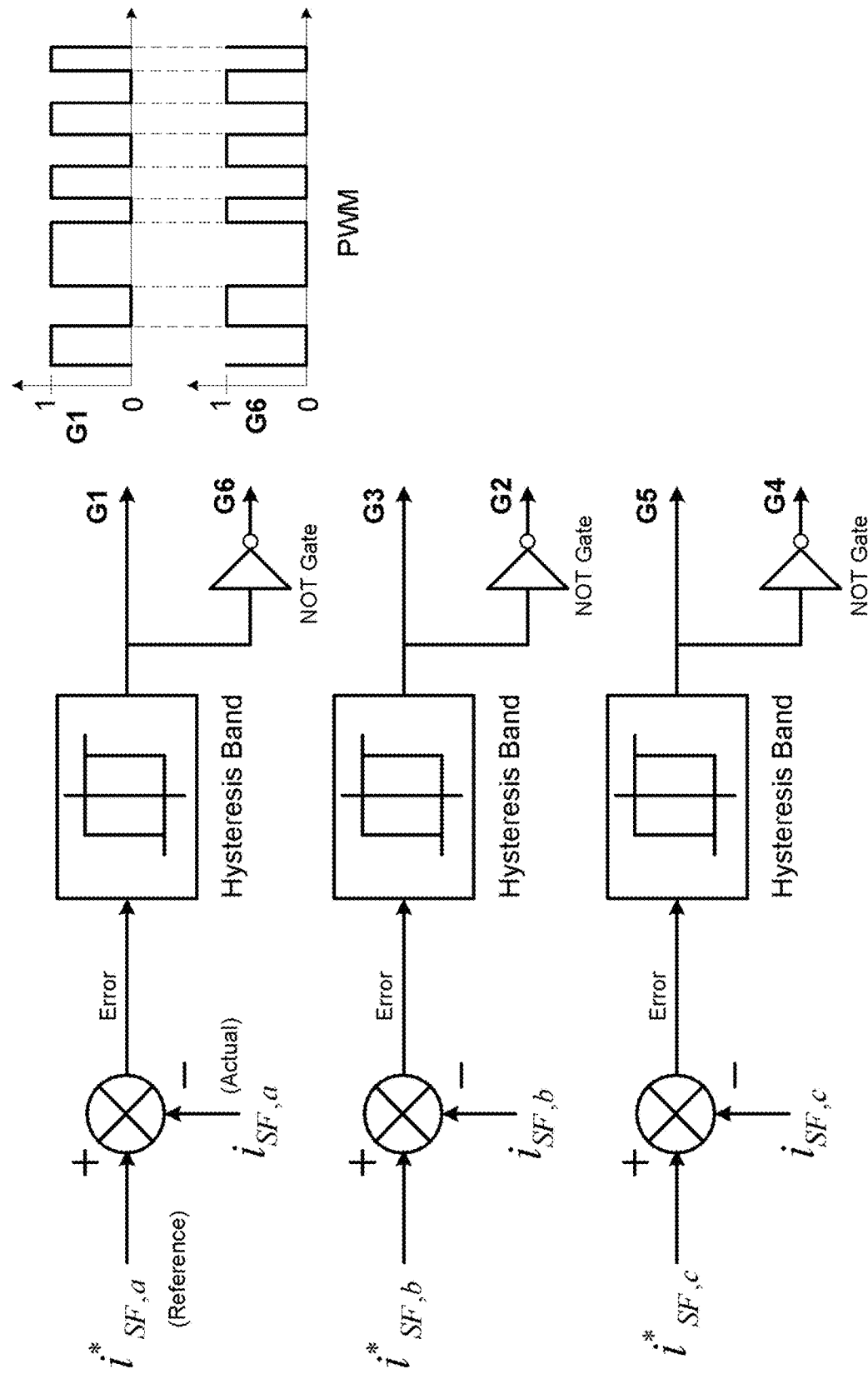
FIG. 11 shows a block diagram representation for hysteresis current control operation.

FIG. 11 depicts the block diagram of a Hysteresis current controller. A Hysteresis controller gives a switching instant (for example, G1) whenever the error exceeds a fixed magnitude limit i.e. a hysteresis band. In order to avoid a short circuit, an opposite signal is applied to switch S6. A "NOT" gate is used to generate the desired S6 pulse. By using three hysteresis controllers, one for each phase, the gating signal pattern (G1 to G6, see FIG. 2) for the PC solar farm inverter is generated.

All the reference signals for different functionalities are generated on a continuous basis and the master control unit is used to activate/deactivate different loops based on priorities and control requirements. For example, the voltage regulation mode is activated only if the PCC voltage rises/drops below the set reference value of ±1% (1.01 pu or 0.99 pu). The current harmonic compensation loop is activated if the THD in load current is noticed to be more than 5%.

Figure 12:
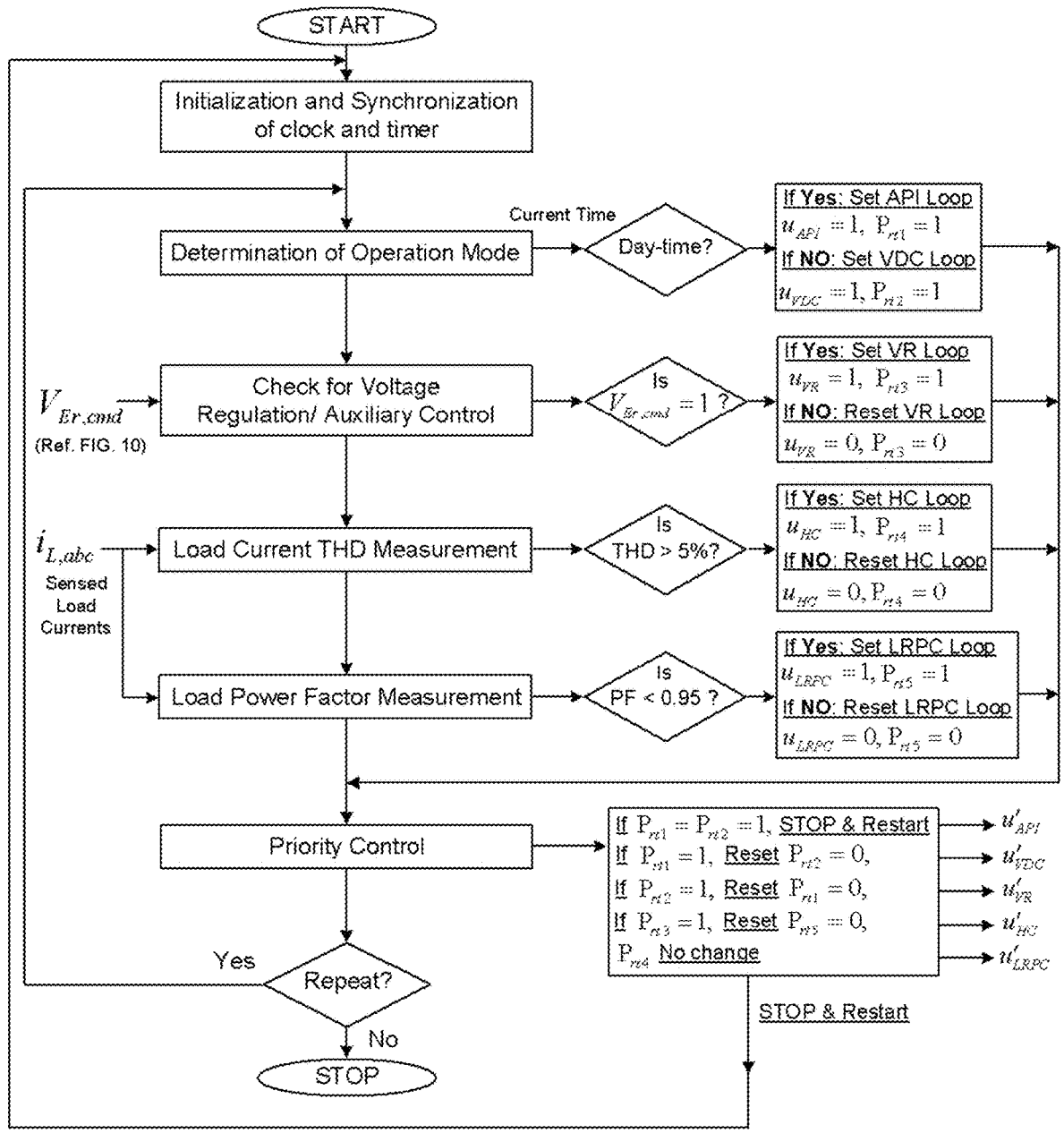
FIG. 12 shows a flow chart to activate particular mode of operation.

An exemplary flow chart for the master control unit is given in FIG. 12. A priority is assigned to each of the tasks. The primary use of solar farm inverter is for injecting the available PV solar power to the grid during the day-time. Therefore, the active power injection loop has been given the highest priority. Since it is important to have a self-supporting DC bus so as to achieve different tasks during night-time, this task has been given the second highest priority. It should be noted that care must be taken not to activate both the loops simultaneously. Similarly, other loops have been assigned hierarchical priorities. The master control unit generates five priority based control commands, namely, u'$_{APP}$, u'$_{VDC}$, u'$_{VR}$, u'$_{HC}$ and u'$_{LRPC}$. These control commands can have "0" or "1" value and are multiplied with respective control loop reference current components to active or deactivate it.

The inverter controller, shown schematically in FIG. 11, may be implemented using several different types of semiconductor device switches such as GTOs, IGBTs, IGCTs, etc. For example, those skilled in the art would readily appreciate that the system and method are equally applicable for single-phase and three-phase four wire systems. The system and method are also applicable to a three-phase three-wire system.

The above described system and method are typically more beneficial for a large-scale DG system. To regulate the feeder voltage when the system voltage is high (e.g. 12.7 kV, 27.6 kV, etc.), the PV solar farm capacity should be high enough (i.e. in the order of megawatts) to give satisfactory results. It should be noted that the system and method are equally applicable to smaller size DG systems with the caveat that such implementations would have reduced network compensation capability.

The system and method described above are also applicable for small capacity PV solar farms. However, as mentioned earlier, the compensation capability is dependent on the sum of individual PV solar farm inverter ratings. If there are many small PV solar farms in close vicinity, using a more complex control approach, all the small PV solar farms can be seen as one large unit. By dividing the control objective into parts, the same performance as that of using a single high rated PV solar farm can be achieved. For example, if a 1 MW solar farm can control the PCC voltage as a STATCOM by injecting 1 MVAR reactive power, then, 10 PV solar farms, each of 100 kW capacity (connected close to each other), can perform the same operation by supporting 100 kVAR reactive power from each of 10 PV solar farm inverter.

All the proposed embodiments and capabilities of the system and methods described above can be achieved for any type of distribution network, be it of radial type or meshed type.

While the description above provided a system and method for adding additional wind farms to a DG network by adapting a solar farm inverter to operate as a STATCOM, these systems and method are not limited to wind farms as existing or additional DG systems. Any other inverter based DG system that is inactive at any point of time (day or night) for any reason, can also be utilized as a STATCOM as described above. Such a DG system could be a large inverter based wind farm or a Fuel Cell based DG. The description above also provides for the utilization of an inactive inverter which may come from any DG at any time.

It is important to note that the system shown in FIG. 10 is merely an example of the components required to achieve the operation of a solar farm as a STATCOM and shunt active power filter, and those skilled in the art will readily understand that the description given further contemplates other related methods and systems. For example, the inverter may be switched with switching means other than a hysteresis current controller, such as other power semiconductor switching devices known in the art that include, but are not limited to, GTOs, IGBTs, IGCTs, etc.

Furthermore, while the processing elements shown in FIG. 11 are shown as discrete elements, they may be provided in a single device, such as a computer processor, an ASIC, an FPGA, or a DSP card.

In a further embodiment, the system and method noted above provide for a voltage control and a damping control with a grid connected inverter based solar DG, or an inverter based wind DG, to improve the transient stability of the system whenever there is an availability of reactive power capacity in the DGs. This aspect has been studied and performed for two variants of a Single Machine Infinite Bus (SMIB) system. One SMIB system uses only a single solar DG connected at the midpoint whereas the other system uses a solar DG and a converter based wind DG. Three phase fault studies are conducted using the electromagnetic transient software EMTDC/PSCAD, and improvements in stable power transmission limit are investigated for different combinations of controllers on the solar and wind DGs, both during night and day.

Figure 13A:
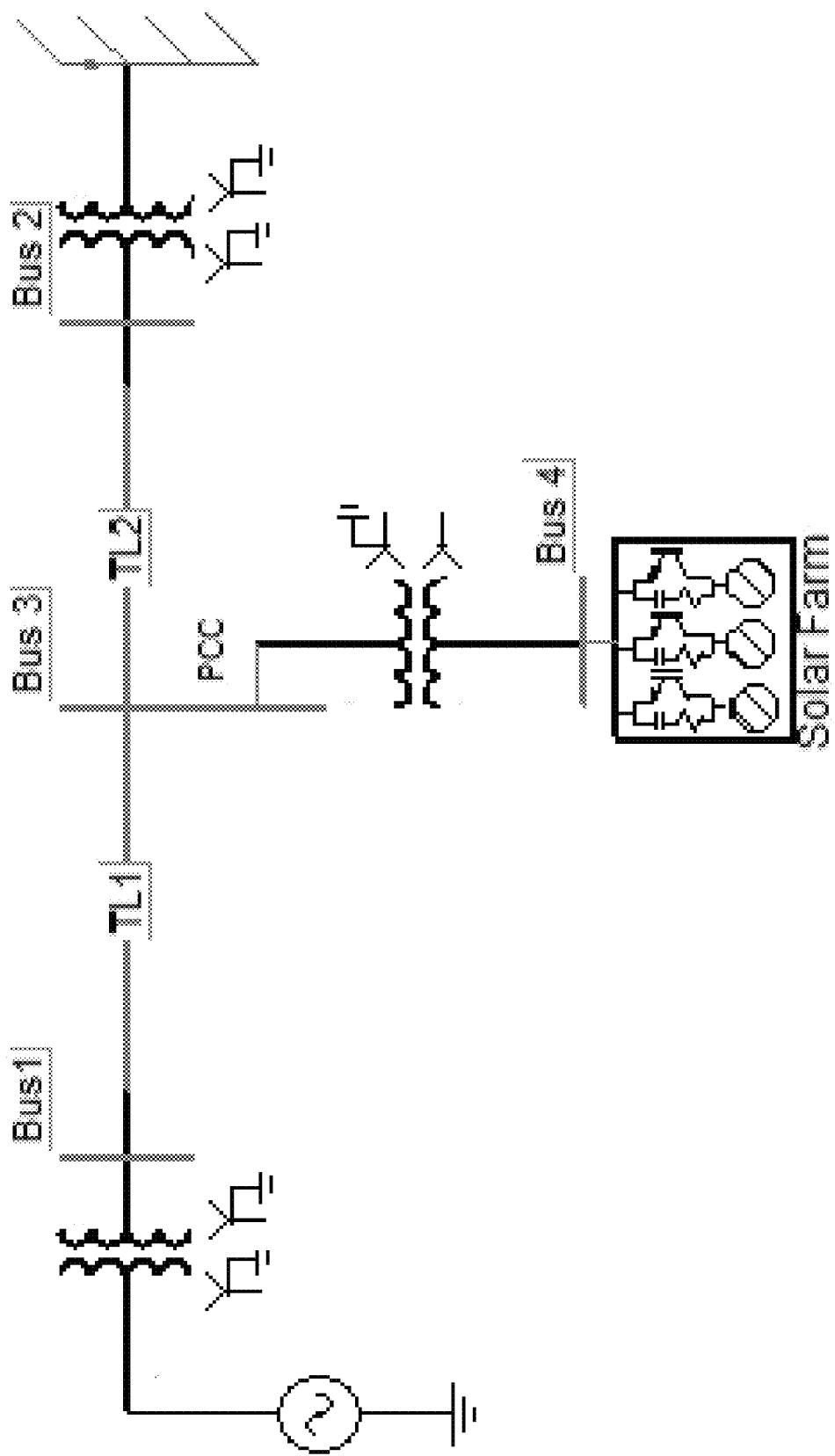
FIGS. 13A-13B show line diagrams of (a) study system I with single solar farm and (b) study System II with a solar and a wind farm.
Figure 13B:
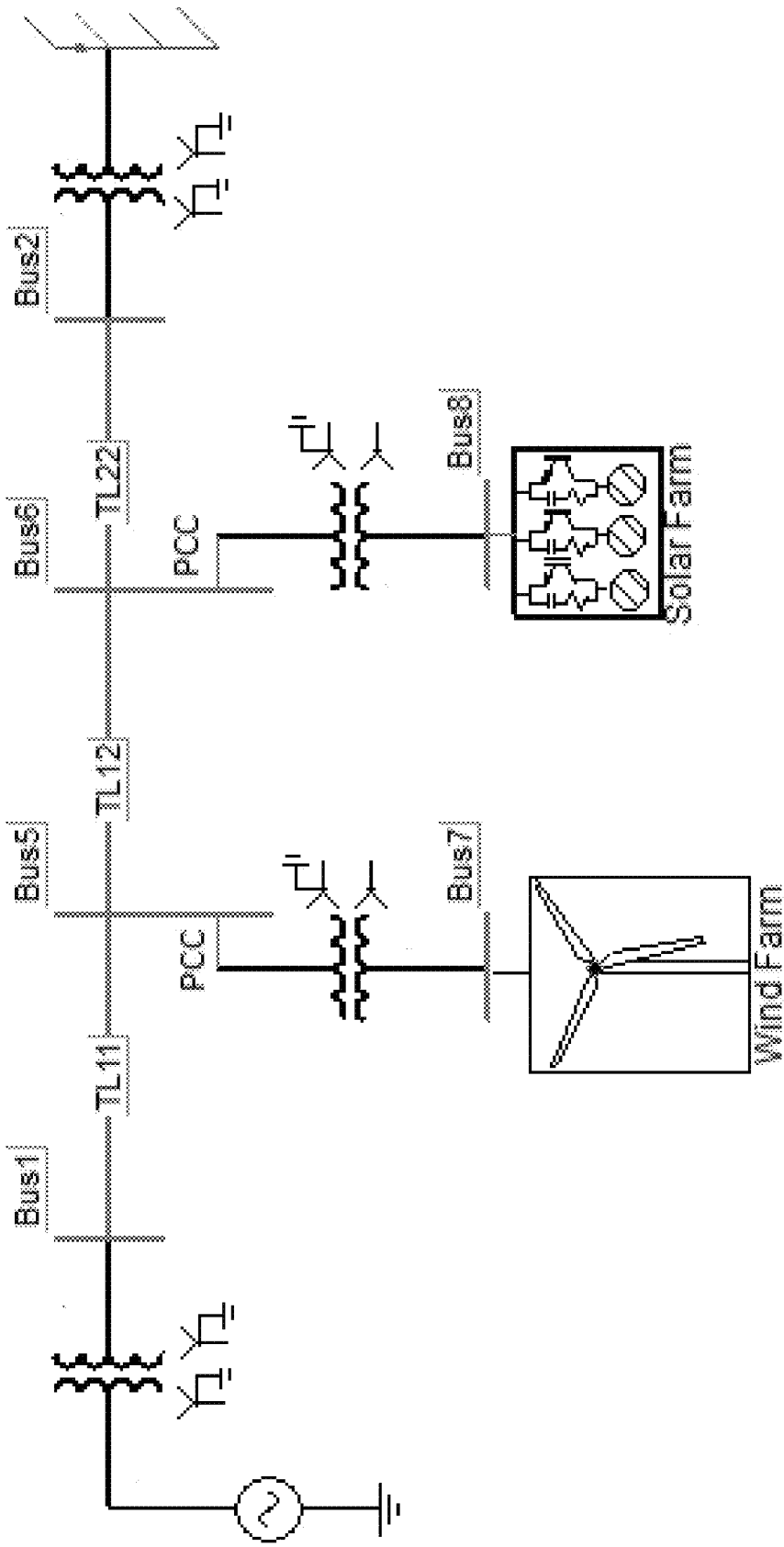

The single line diagrams of two study systems—Study System 1 and Study System 2 are depicted in FIG. 13 (a) and FIG. 13(b), respectively. Both systems are Single Machine Infinite Bus (SMIB) systems in which a large synchronous generator (1110 MVA) supplies power over a 200 km, 400 kV transmission line to the infinite bus.

In Study System 1, a single inverter based Distributed Generator (a solar farm in this case) is connected at the midpoint of the transmission line. In Study System 2, two inverter based DGs are connected at ⅓rd and ⅔rd line length from the synchronous generator. The DG connected at ⅓rd distance is considered to be a wind farm utilizing Permanent Magnet Synchronous Generators (PMSG) with ac-dc-ac converters, whereas the DG connected at ⅔rd distance is considered to be a solar farm. It is understood that both the solar farm and wind farm will have several inverters in each of them. However, for this analysis, each DG is represented by a single equivalent inverter having a total rating of either the solar farm or wind farm. Both the wind farm and solar farm are considered to be of the same rating, and therefore can be interchanged in terms of location depending upon the studies being performed. FIG. 14 illustrates the block diagrams of the various subsystems in the two equivalent DGs.

The synchronous generator is represented in detail by a sixth order model and a DC1A type exciter. The different transmission line segments TL1, TL2, TL11, TL12, TL22, shown in FIG. 13 are represented by corresponding lumped pi-circuits. Saturation is neglected in both the sending end and receiving end transformers.

Figure 14A:
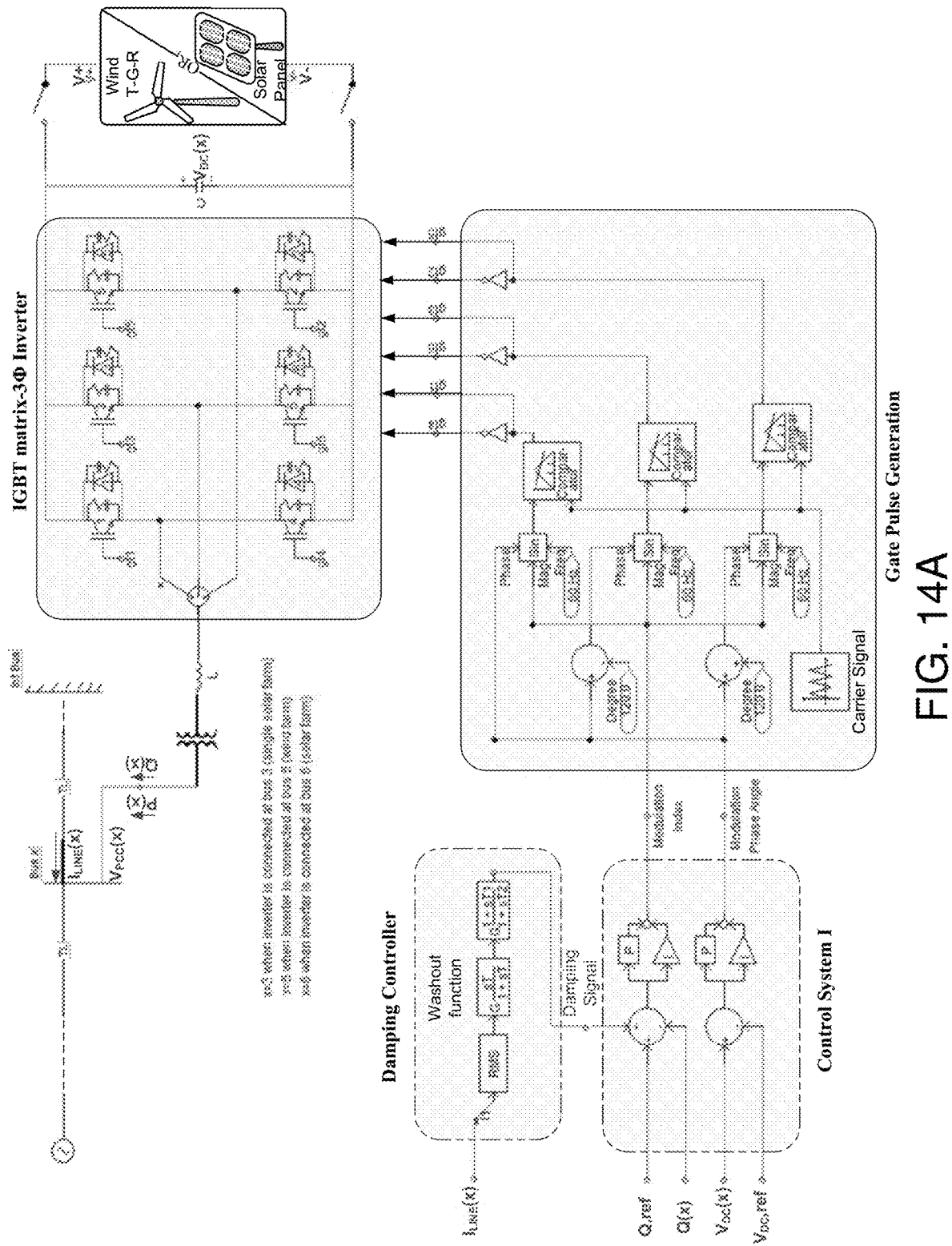
FIGS. 14A-14C show block diagrams of the various subsystems in two equivalent DGs.
Figure 14C:
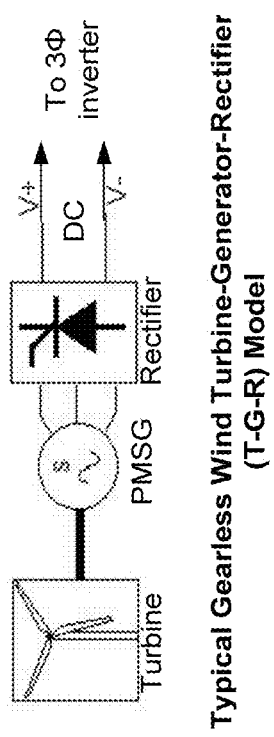
Figure 14B:
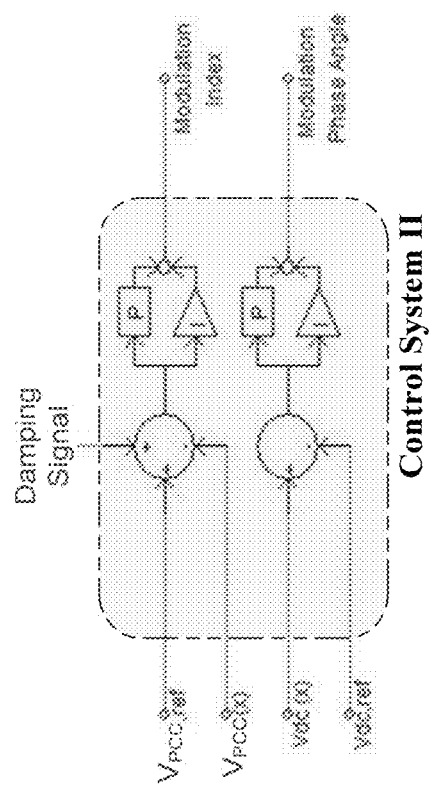

The solar farm and wind farm, as depicted in FIG. 14, are each modeled as equivalent voltage sourced inverters along with pure DC sources. In the solar farm, the DC source is provided by the solar panels output, whereas in the wind farm, the PMSG wind turbines rectifier output generates the DC voltage source. The DC power output of each DG is fed to the DC bus of the corresponding inverter to inject real power to the grid, as illustrated in FIG. 14(a). The magnitude of real power injection from the DGs to the grid depends upon the magnitude of DC input voltage. The voltage source inverter in each DG is composed of six IGBTs in a matrix with snubber circuits as shown by 'IGBT matrix' block in FIG. 14(a). A large size DC capacitor is used to reduce the DC side ripple. Each phase has a pair of IGBT devices which convert DC voltage into a series of variable width pulsating voltages according to the switching signal to the matrix utilizing the sinusoidal pulse width modulation (SPWM) technique. Switching signals are generated from the amplitude comparison of variable magnitude sinusoidal signal known as 'modulating signal' with high frequency fixed-magnitude triangular signal known as 'carrier signal' as shown in the 'gate pulse generation' block in FIG. 14. The variable magnitude and the phase angle of sinusoidal modulating signals are controlled by either one of the external controllers—'control system I' block in FIG. 14(a) or 'control system II' block in FIG. 14(b), which modifies the switching signal width duration. The modulating signals used for three phases are equally spaced and thereby shifted by 120° whereas the same carrier wave is used for all three phases. Some filter equipment may be needed at the AC side to eliminate harmonics. In this model the carrier signal amplitude is normalized to unity, hence the magnitude of modulating signal is alternately designated as modulation index (MI).

In the PWM switching technique, the magnitude of voltages and the angle of voltages at the inverter output are directly dependent on the modulation index (MI) and on the modulation phase angle, respectively. To control the modulation index and the modulation phase angle, two separate PI control loops are simultaneously integrated with the inverter. The different DG control systems utilized are described below.

i) Control System 1: This contains two Proportional Integral (PI) controllers, as depicted in FIG. 14(a). The lower PI controller is used to maintain the voltage, VDC, across the DC link capacitor, whereas the upper PI controller, known as the reactive power controller, is utilized to directly control the flow of reactive power from the DG to the PCC through the control of the modulation index. The measured reactive power flow from the DG is therefore used as controller input and compared with Qref. Normally, the DGs are required to operate at almost unity power factor and therefore in the conventional reactive power control of the DGs, the Qref is set to zero.

ii) Control System II: This control system also comprises two PI controllers as shown in FIG. 14(b). The upper PI controller, known as voltage controller is mainly used to regulate the PCC voltage to a predefined set point. This controller regulates the PCC voltage through the control of modulation index and thereby uses the PCC voltage as controller input. As the amount of reactive power flow from the DG inverter depends upon the difference in magnitudes of voltages at PCC and inverter terminal, the DG reactive power flow can also be controlled indirectly with this control system. In this control system also, the lower PI controller is used to maintain the voltage, VDC, across the DC link capacitor.

iii) Damping controller: A novel auxiliary 'damping controller' shown in FIG. 14(a) is utilized to damp the rotor mode (low frequency) oscillations of the synchronous generator and to thereby improve the system transient stability.

This damping controller is appended to both Control System 1 and Control System 2. In this controller, the line current magnitude signal is utilized as the control signal which senses the rotor mode oscillations of the generator. The magnitude of line current signal is passed through a washout function in series with a first order lead lag compensator.

The damping controller can be used as a supplementary controller together with either the voltage controller or reactive power controller. The parameters of the reactive controller, the voltage controller and auxiliary controller are tuned by a systematic hit and trial method, in order to give the fastest step response, least settling time and a maximum overshoot of 5%.

In summary, the system and methods described above provide numerous novel embodiments involving the use of a solar farm as a STATCOM in a distributed power generation network and additional functions through controlled reactive power injection, and in particular:

- The Solar farm can be utilized as a STATCOM for grid voltage control allowing the integration of an increased number of wind turbine generators and other renewable/non-renewable distributed generators in the transmission/distribution line.
- The solar farm can be operated as a STATCOM to increase the power transmission capacity of transmission lines to which they are connected. Increasing transmission capacity is a great challenge faced by electric power utilities around the globe. PV Solar farms can play that role both during nights as well as during the days.
- The solar farm can be operated as a STATCOM to improve the system stability thereby helping prevent blackout scenarios.
- The solar farm can be operated as a STATCOM to enhance the damping of low frequency (0.2-2 Hz) power oscillations thus helping increase the power flows in transmission systems. This problem exists in several countries around the world.
- Synchronous generators that are connected to series compensated transmission lines to increase the power transmission capacity, but are subjected to the problem of sub-synchronous resonance (SSR) that if uncontrolled, can result in enormously expensive generator shaft failures/breakages. If a solar farm is located close to synchronous generator, it can be operated as a STATCOM to mitigate sub-synchronous resonance.
- Alleviation of voltage instability: systems having large reactive power consuming loads such as induction motor loads, steel rolling mills, etc, are subject to the problem of voltage instability (sudden reduction/collapse of the bus voltage) under line outages, or faults. Solar farms in the vicinity of such loads can be operated as a STATCOM to provide very rapid voltage support to mitigate this problem of voltage collapse.
- Limiting short circuit currents: transmission and distribution networks are facing a huge problem of high short circuit currents as new renewable/non-renewable energy sources are being connected to the grid, as each source contributes to current in the faulted network. The solar farms inverter can be operated in an entirely novel manner to operate as a rectifier during the short circuits to thereby suck the fault current back from the fault and charging its own capacitor. In this manner the PV solar farms will allow more connections of new generating sources in the grid.
- Improvement of High Voltage Direct Current (HVDC) converter terminal performance: solar farms near HVDC lines can provide dynamic voltage support to successfully operate the HVDC converters even under very stringent (weak) network conditions
- Solar farms as STATCOMs can provide the low voltage ride through (LVRT) capability for successfully integrating wind farms. During faults the line voltage reduces to very low values causing the nearby wind farms to get disconnected. Solar farms can provide voltage support during these situations to allow the wind farms to remain connected and continue to supply power to the grid.
- The PV solar farm can act as an Active Power Filter to perform power factor correction, balancing of unsymmetrical loads and line current harmonic compensation, all in coordination with the abovementioned functions of FACTS.
- All of the above objectives can be achieved during the day-time also by solar farms.
- If the PV solar farms are provided with energy storage capability in the form of storage batteries, the solar farm can be utilized as a battery charger during night-times when there is excess power production by neighbouring wind farms and the loads are much less. This stored power can be sold to the grid during day-time when needed by the grid at very attractive prices.
- Such energy storage will also help shave the peak power demand in electrical networks. During peak hours, instead of the grid importing power at high rates, it can buy stored power from solar farms to meet the peak demands. This application will be in limited situations when the solar farm is not producing its peak/rated power, but still be very valuable.

In addition to the above, there are many other advantages to utilizing a voltage control and a damping control on an inverter-based DG (both PV solar and wind) for improving the transient stability and, consequently, the power transmission limit in transmission systems. A number of these reasons are:

- The solar DG, which is presently not at all utilized at night times, can now be utilized with the proposed voltage and damping control to increase the power transmission limit significantly at night-times. Even during day-time when the solar DG produces a large magnitude of real power, the controllers can help increase the stable transmission limit to a substantial degree. The choice of the voltage reference in the voltage controller must be made judiciously to get the maximum improvement in power transfer. For the study system I, a 100 MW solar farm can increase transmission limit by about 200 MW in the night and by 97 MW during the daytime.
- When both solar and wind DGs, of 100 MW each, are connected to the system operating with the damping control, the transmission capacity is seen to increase by 240 MW if no DGs are producing real power output, and by 141 MW if both are producing a high level of real power of 94 MW.
- When both solar and wind DGs are connected to the system, operating with the damping control, and only one DG is producing real power, the power transfer limit increases even further by at least 356 MW.
- The DG FACTS devices described above improve the transient stability and, consequently, the power transfer limit of the grid. These can also be used to provide other functionalities of the FACTS devices.
- The systems and methods above are fully extendable to other inverter-based DGs, such as Doubly Fed Induction Generator (DFIG) based wind turbine generators, Full-Converter based wind turbine generators, etc.

The solar farm DG can generate further revenue for its operators by being operated as a STATCOM. As noted above, the STATCOM-operated solar farm can increase the transmission capacity of power transmission systems. By charging a suitable fee to the operators of wind farm DGs coupled to the transmission system or to the operators of utility companies for increases in the transmission capacity of the transmission system, operators of the solar farm DG can share in the financial benefits of the increased transmission capacity. This method would entail operating the solar farm DG as a STATCOM at night or whenever the solar farm inverter is not being fully utilized in real power generation and charging utilities or the other energy farm operators for the benefit of increased transmission capacity. Of course, the charges could be based on a percentage of increase in the transmission capacity, on the amount of time the solar farm DG is being used to the benefit of the other energy farm DGs, or any other combination of factors.

It should be noted that the method outlined above regarding the use of a solar energy farm to increase the transmission capacity of transmission lines may also be used on wind energy farms.

Further revenue can be generated by solar energy farms by charging utility companies or other interested parties for using the solar energy farms for transmission and distribution grid voltage control. As noted above, inverter equipped solar energy farms, when operated as STATCOM, provides voltage control for the power transmission grid and allows for more wind farms to be coupled to the same grid to which the solar farms are coupled. By providing for more wind energy farms to be connected to the transmission grid without having to invest in dedicated voltage regulating equipment, wind energy farm operators as well as power utility companies save on capital expenditures. As such, solar farm energy operators can charge either on-going fees to the wind farm operators/utilities or a flat rate fee for the benefit provided by their inverters used as STATCOMs.

The present invention also includes a multivariable modulator that operates to control a power generation facility to assist in maintaining or improving a power transmission system's stability. The multivariable modulator allows the power generation facility to:

i) increase system stability, including transient stability, small signal stability, voltage stability and voltage regulation ii) regulate system frequency, and iii) improve power transmission capacity in both transmission and distribution lines.

Figure 15:
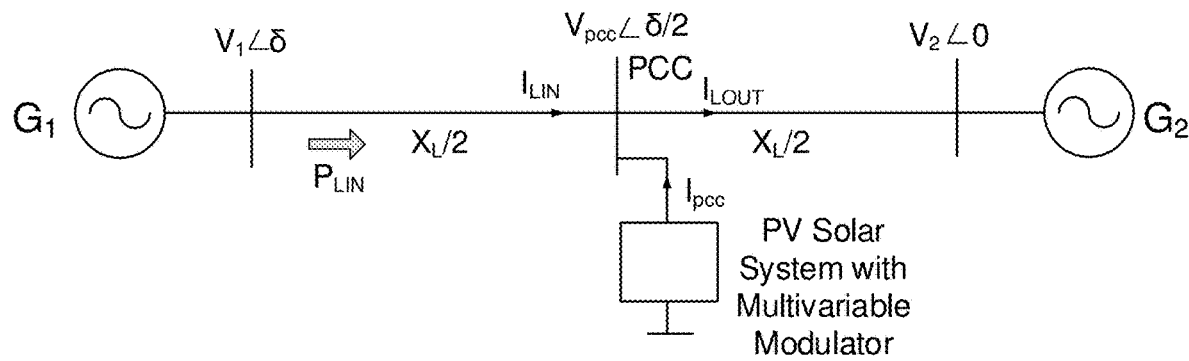
FIG. 15 is a block diagram of a dual area power system including a PV solar farm equipped with a multivariable modulator controller according to one aspect of the invention.

FIG. 15 illustrates a two area power system connected through a transmission line. Each area has both generators and loads. Area 1 is represented by an equivalent generator $G_1$ and a terminal voltage of $V_1 < \delta$. Area 2 is modeled by an equivalent generator $G_2$ and a terminal voltage $V_2 < 0$. A PV solar farm with a multivariable modulator is connected at the middle of the line, at the point of common coupling (PCC) where the terminal voltage is $V_{pcc} < (\delta/2)$. The line has a total reactance $X_L$. In fact, the PV solar farm with the multivariable modulator may be connected at any point on the line.

In terms of contributing to increase system stability, the multivariable modulator operates by modulating the real and/or reactive power from the power generation facility.

A power system may become unstable due to angle instability on the occurrence of large system disturbances, such as, faults, line or equipment switchings/outages, etc. System instability may result due to the growing oscillations of any or a combination of the following modes given below with their projected oscillation frequencies:

a) Local Generator Rotor Modes, associated with the rotor oscillations of synchronous generators in a plant: in the range of 1-3 Hz b) Inter-area modes associated with the oscillations of a set of generators in an area against another set of generators in a different area: in the range of 0.1-1 Hz c) Controller Modes related to controllers of generating units, and other dynamic equipment such as Static Var Compensators (SVC), Static Synchronous Compensators (STATCOM), High Voltage Direct Current (HVDC) converters: in the range of 2-15 Hz d) Subsynchronous Torsional Interaction Modes and Subsynchronous Control Interaction modes associated with the turbine generator shaft systems of synchronous generators, wind turbine generators owing to their interaction with excitation controls, series compensated lines, and HVDC controls, etc.: in the range of 10-50/60 Hz The oscillations noted above are reflected in various system quantities, such as generator angular frequency, line power flow, line current, bus frequency, etc. The multivariable modulator controller can derive the oscillatory behavior of the oscillatory modes utilizing signals obtained or derived from the power system, termed as auxiliary signals. These auxiliary signals include locally obtainable quantities such as line current, line power flow, bus frequency, or remotely acquired/communicated quantities such as remote generator speed, remote voltage angles, etc. These signals and quantities can be transmitted to the PV solar farm location through various communication channels, e.g. fibre optic cables, Wide Area Measurement Systems (WAMS), etc.

Once the oscillations are detected, the reactive power and real power of the solar farm are then modulated by the multivariable modulator to counteract the oscillations of these modes. A simple explanation of the control concept is provided below.

From FIG. 15 and the description given above, it can be seen that the real power $P_{LIN}$ transmitted from Area 1 to the PCC is given by, $$P_{LIN} = \frac{V_1 V_{pcc}}{X_L/2} \sin \delta/2 \qquad (1)$$

Thus the real power flow $P_{LIN}$ can be controlled by varying $V_{pcc}$.

Figure 16:
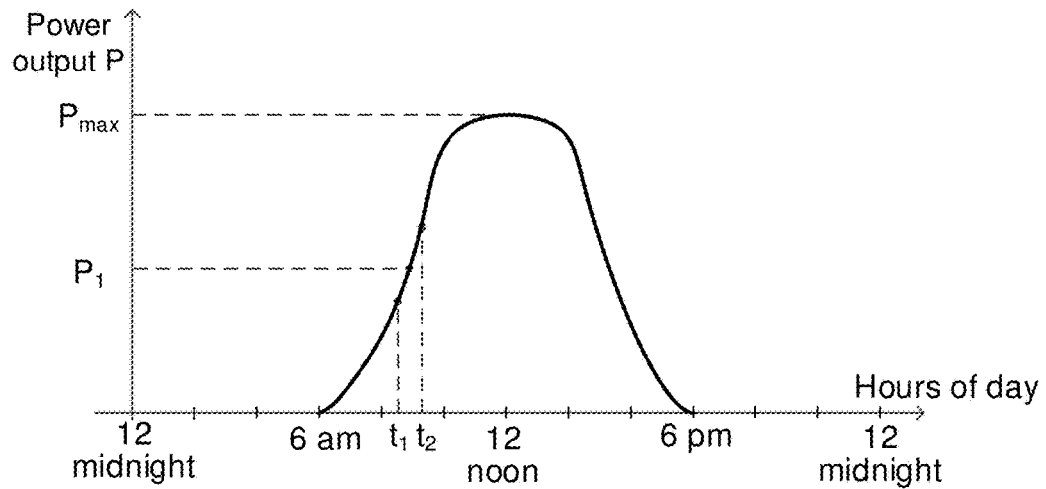
FIG. 16 is a diagram illustrating a typical daily real power output of a PV solar farm.

The typical real power output over a twenty-four hour period from a PV solar farm is depicted in FIG. 16. $P_{max}$ denotes the maximum power output from a solar farm which occurs around noon time on a fully sunny day. $P_{max}$ is also the rated inverter capacity $S_{max}$ of the PV solar farm. Let $P_1$ be the power output of the solar farm at time $t_1$, when the solar farm observes power system oscillations (in line power or system frequency) caused by some disturbance in the power system.

The multivariable modulator can then perform any of the following three control functions:

i) Modulation of reactive power output of PV solar system ii) Modulation of real power output of PV solar system iii) Modulation of both reactive and real power outputs of PV solar system simultaneously in a decoupled (independent) manner The above modulations are performed from the time instant $t_1$ to time instant $t_2$ when the power system oscillations decay to within acceptable levels. The time period $t_2-t_1$ is defined as the "period of modulation" and is expected to be small, typically a few minutes. It is therefore assumed that the solar isolation and consequently the solar power availability $P_1$ will remain constant over this time period.

The effects of both reactive power modulation and real power modulation, as well as how to implement such modulation schemes, are described below.

Reactive power modulation is performed relative to what is occurring in the power system generator. Local or remote signals that indicate the status of the generator are thus transmitted to the multivariable modulator. Depending on the status of the generator, the multivariable modulator control can modulate the reactive power generated by the power generation facility to compensate for the electromechanical oscillations of the generator.

If $d(\Delta\delta)/dt$ or $\Delta f$ is positive (where "f" is the generator frequency), i.e., generator rotor $G_1$ is accelerating due to built up kinetic energy (mechanical power input is more than electrical power output), the multivariable modulator operates to inject reactive power from the PV solar system. This increases the bus voltage $V_{pcc}$, thereby leading to the increase of generator electrical power output per equation (1) above, thus opposing the generator acceleration.

If $d(\Delta\delta)/dt$ or $\Delta f$ is negative, i.e., generator rotor $G_1$ is decelerating due to loss of kinetic energy (mechanical power input is less than electrical power output), the multivariable modulator operates to absorb reactive power into the PV solar system. This decreases the bus voltage $V_{pcc}$, which leads to the decrease of generator electrical power output per equation (1) above, thus opposing the generator deceleration.

The reactive power output from the PV solar system is thus modulated by the multivariable modulator control in response to generator modal oscillations (or power system oscillations) that are sensed through auxiliary signals. The reactive power modulation control essentially modulates the bus voltage around its reference value.

To implement the reactive power modulation control described above, two schemes are contemplated, especially for PV solar farms. Since the operating requirements are different for night time versus day time for PV solar farms, these schemes take into account the unique requirements of PV solar farms. These schemes essentially control how much of the power generation facility's inverter capacity is to be used for damping the power transmission system's oscillations.

For a night time implementation, the multivariable modulator control provides dynamic modulation of reactive power in the night utilizing the full inverter capacity of the power generation facility to damp the power system oscillations.

For a day time implementation, let the solar farm be producing real power $P_1$ at any time instant during the day. If power system oscillations are observed, which can be detrimental to the power system stability, the multivariable modulator controller can modulate the reactive power in either of the following ways:
  i) the entire inverter capacity for the PV power generation facility is used for reactive power modulation. In this case the solar panels are totally disconnected during the period of modulation. Alternatively, the voltage across the PV panels is controlled to their open circuit voltage thereby reducing their power output to zero.
  ii) the inverter capacity remaining after real power generation $\sqrt{(S_{max}^2-P_1^2)}$ is used for reactive power modulation. In this case the real power output of the PV solar farm is not affected.
  iii) the inverter capacity needed is more than the remaining inverter capacity described in ii), but not the entire inverter capacity as described in i). In this case the solar panels are partially disconnected, or real power output is partially reduced by PV panel voltage control, during the period of modulation.

It should be noted that technique i) and iii) above are superior to, and are therefore preferable over, technique ii).

For techniques i) and iii), as soon as the power system oscillations settle down to less than the values specified by utility standards of stability, the multivariable modulator will cause the PV solar system to restore its real power output to its pre-disturbance real power output level with all solar panels producing real power based on solar radiation availability. The multivariable modulator is kept active during the power restoration process so that any tendency of re-initiation of power oscillations can be obviated.

The decision to commence reactive power modulation and the period of modulation is determined autonomously by the multivariable modulator itself, based on the magnitude and duration of oscillations of power system quantities.

Alternatively, the decision to commence reactive power modulation and the period of modulation may also be communicated by the system operator to the multivariable modulator, based on the magnitude and duration of oscillations of power system quantities.

As an alternative and/or an addition to the above noted reactive power modulation, real power produced by the power generation facility can also be modulated by the multivariable modulator controller. Again, this modulation is based on signals and quantities sensed and/or remotely received from the oscillating generator.

If $d(\Delta\delta)/dt$ or $\Delta f$ is positive, i.e., the generator rotor is accelerating due to built up kinetic energy, the multivariable modulator controller operates to decrease real power output from the PV solar system to below a predetermined setpoint. This effectively opposes generator acceleration.

Figure 20:
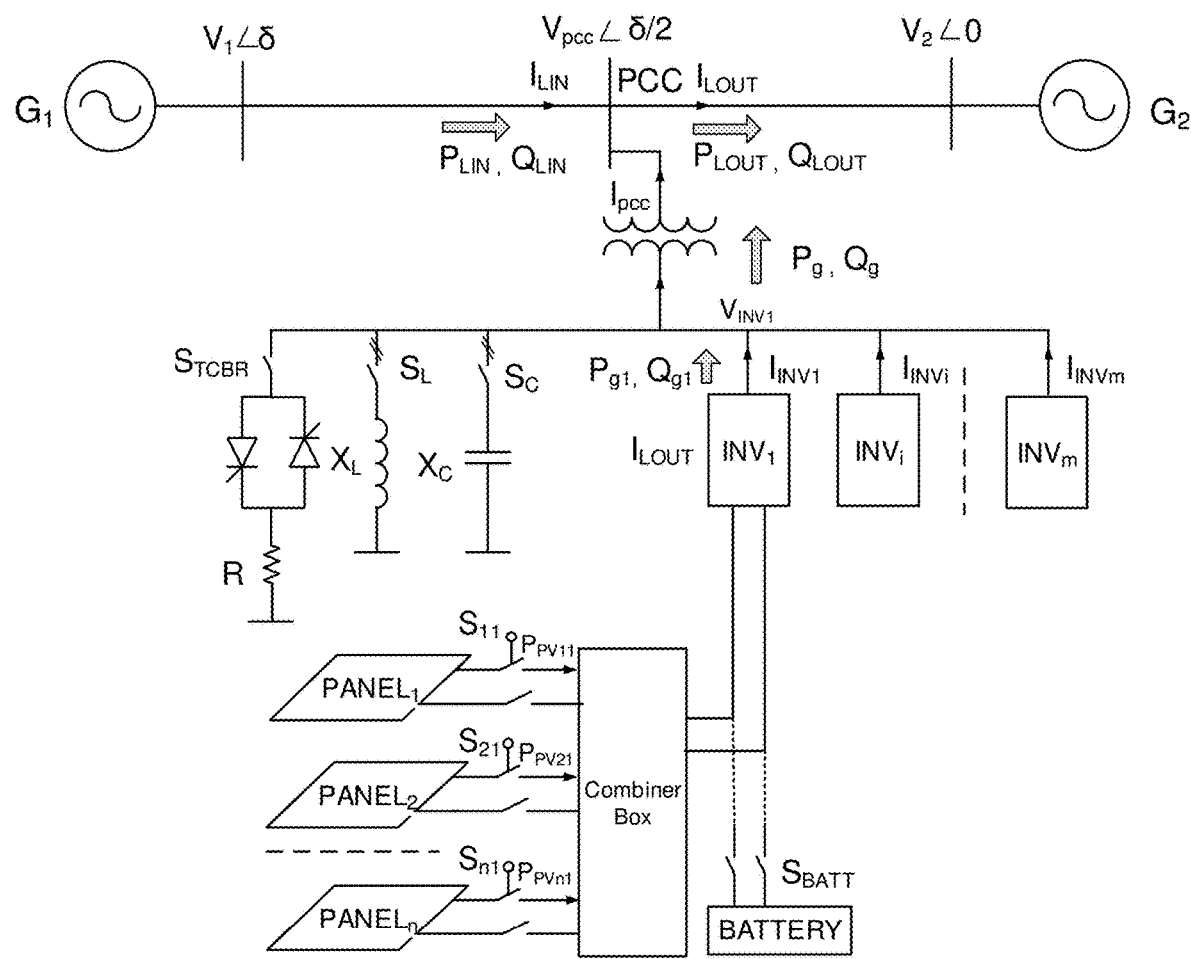
FIG. 20 is a diagram illustrating a PV solar farm with a multivariable modulator controller connected to a power transmission system.

To increase the effectiveness in such a situation, real power can be absorbed by a Thyristor Controlled Braking Resistor (TCBR) or by any general Energy Storage System (ESS) provided in the PV solar system. A battery energy system, as an example of ESS is depicted in FIG. 20. The Energy Storage System can be mechanical energy based such as Pumped Hydroelectric Storage (PHS), Compressed Air Energy Storage (CAES), Flywheel Energy Storage (FES), etc. The Energy Storage System can be electrochemical energy based storage e.g., Battery Energy Storage. The Energy Storage System can also be electrical energy based storage e.g., super/ultra capacitor storage system, or superconducting magnetic energy storage system (SMES), etc. The Energy Storage System can also be hydrogen or other gas based storage e.g., fuel cells, etc. These are supplementary and optional controls.

On the other hand, if $d(\Delta\delta)/dt$ or $\Delta f$ is negative, i.e., the generator rotor is decelerating due to loss of kinetic energy, the multivariable modulator operates to increase real power output above the same predetermined setpoint. This effectively opposes generator deceleration.

Figure 17:
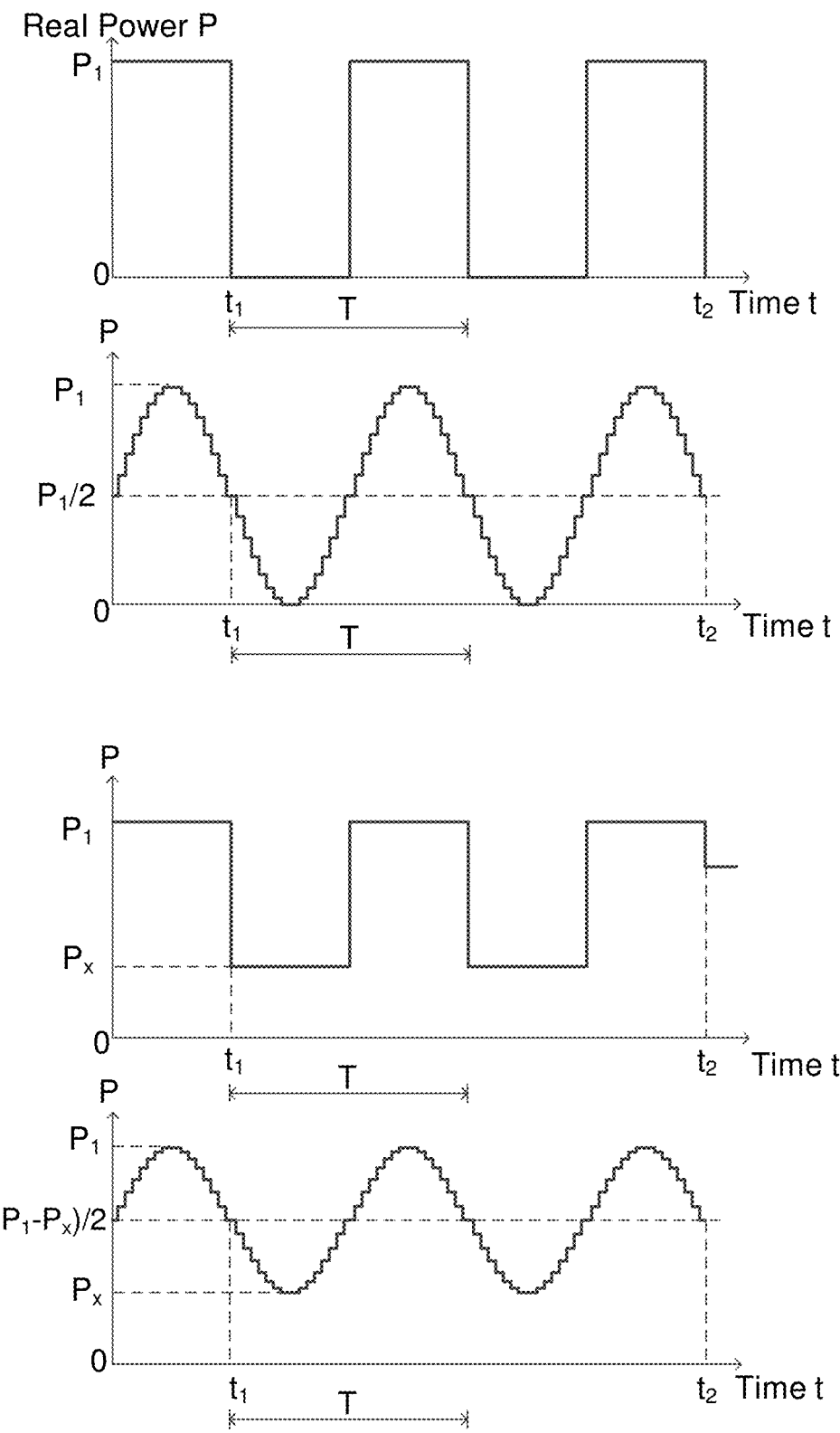
FIG. 17 illustrates typical modulated real power output waveforms for a PV solar farm as implemented by a multivariable modulator controller as illustrated in FIG. 1.

The real power output from the PV solar system is thus modulated around a predetermined setpoint in response to power system modal oscillations. Some possible cases of real power modulation are illustrated in FIG. 17. The setpoint can typically be $P_1/2$, i.e., half of the real power output corresponding to solar radiation at that time instant. The waveforms for a $P_1/2$ setpoint are presented as the top two waveforms in FIG. 17. The setpoint can also be $(P_1-P_x)/2$, where $P_x$ is a value of power output less than the maximum available during the period of modulation. The waveforms for this setpoint are presented as the bottom two waveforms in FIG. 17. While the magnitude of the modulations in real power is illustrated to be constant in FIG. 17, the magnitude of modulations can decrease with time, depending upon the system need.

While the above discusses modulating only reactive power or real power, both of these can be modulated simultaneously in a decoupled (independent) manner. Such a control approach provides flexibility to the multivariable modulator controller's response to detected oscillations.

In this hybrid method, real power P is modulated as described above. The variable remaining inverter capacity $\sqrt{(S_{max}^2-P^2)}$ is then utilized for reactive power modulation by the multivariable modulator controller.

This combination of real and reactive power modulation in a decoupled manner is the preferred method for stabilization of the power transmission system.

To implement real power modulation, especially in PV solar farms or solar-based power generation facilities, solar panels may be switched in and out of power production. As well, the power generation system may be configured to produce less than optimum power.

Figure 18:
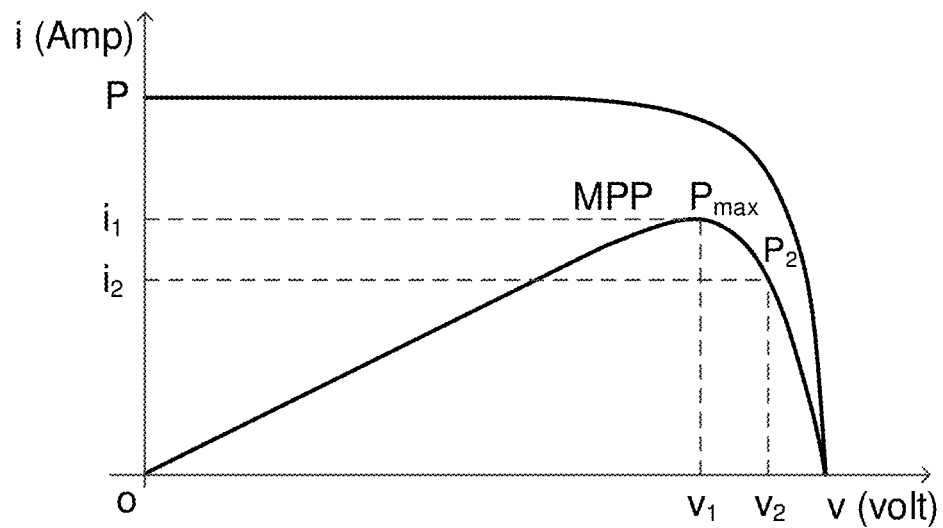
FIG. 18 is a graph of a power output characteristic of a solar panel.

The typical DC current (i) versus DC voltage (v) characteristic and the DC power (P) versus DC voltage (v) characteristic of a solar cell/panel are depicted in FIG. 18. $P_{max}$ denotes the power output at the Maximum Power Point (MPP) of the solar panel corresponding to operating voltage $v_1$ and current $i_1$. Various Maximum Power Point Tracking (MPPT) techniques are described in literature (see, for example, IEEE Task Force on Modeling and Analysis of Electronically-Coupled Distributed Resources, "Modeling Guidelines and a Benchmark for Power System Simulation Studies of Three-Phase Single-Stage Photovoltaic System", *IEEE Transactions on Power Delivery*, Vol. 26. No. 2, April 2011, pp. 1247-1264, the contents are of which are hereby incorporated by reference and which will be hereinafter referred to as IEEE Task Force Reference). Solar panels are always operated at MPP for maximum power generation.

The solar panel may also be operated at a non-maximum power point. $P_2$ denotes one such operating point when the power output from the solar panel is lower than the maximum possible amount for that given solar radiation. The corresponding operating voltage is $v_2$ and current is $i_2$. Solar panels will typically not be operated at such a non-MPP on a continual basis, as this will lead to lower power generation.

In one aspect of the invention, the real power output of the solar farm is rapidly modulated or varied either by switching in or out solar panels from power production or by operating solar panels at variable non-optimum or non-maximum power points (non-MPP).

In the first technique, the solar panels are switched in or out through a matrix of fast solid-state switches, with the connected solar panels being operated at maximum power point (MPP).

In this first technique, each solar panel or sets of solar panels are connected to the inverter through a very fast operating solid-state switch that can open or close within a few milliseconds. Several sets of panels are thus connected to the inverter through a matrix of switches. Since the power system oscillations that need to be controlled through the power modulation have time periods ranging from typically 30 ms (subsynchronous, torsional oscillations, etc.) to few seconds (inter-area oscillations), the operating time of these switches will not affect the effectiveness of the multivariable modulator controller.

Such a control is easily implemented in a single stage PV solar system (as described in the IEEE Task Force Reference above), in which the solar panels are directly connected to the PV inverter.

An alternative for switching the PV solar panels in and out is described as follows. In several PV panel implementations (such as in microinverters), individual solar panel or a set of PV panels has its own associated power electronic DC-DC converter that produces appropriate controllable DC voltages on either side. Thus in a solar farm, there are several DC-DC converters, each corresponding to an individual set of solar panels. The DC outputs of each of these DC-DC converters are combined to produce the net DC power at the appropriate DC voltage that is fed to the solar farm inverter(s). The DC-DC converters are based on very fast acting semiconductor switches. Thus the "switching in" and "switching out" of PV panels can be achieved rapidly by "turning on" or "turning off" the firing pulses to the semiconductor switches inside the DC-DC converter.

Another technique is where the solar panels are not switched in or out, but some or all are operated at non-maximum power point (non-MPP). According to this technique, the operating points of the solar panels are rapidly modulated in the non-maximum power operating range. The multivariable modulator controller varies the voltage across the solar panels to obtain the desired variation in real power output during the period of modulation.

Such a control scheme may be implemented on a single stage PV solar system. However, it is more suitable in a two-stage PV solar system, in which the solar panels are connected to the PV inverter through a common DC-DC converter for the entire set of PV solar panels. The DC-DC converter ensures a constant voltage at the input of the inverter, even though the output voltage of the solar panels is varying.

It is emphasized that the control technique of switching in or out of the solar panels is faster than the technique of operating solar panels at variable non-optimum or non-maximum power points (non-MPP).

For a PV solar farm implementation of the two real power modulation schemes noted above, again, day time and night time implementations are required.

For a night time implementation, the multivariable modulator controller would provide dynamic modulation of reactive power by utilizing the full inverter capacity of the PV solar farm to damp power system oscillations.

For a day time implementation, if detrimental power system oscillations are observed, the multivariable modulator controller would discontinue the normal real power generation operation of the PV solar system, partly or fully. Once this is done, the controller then starts to modulate the real power P in response to the power system oscillations, as described above.

Simultaneously, reactive power modulation is also commenced in response to the power system oscillations in a decoupled control mode. The bus voltage is correspondingly modulated around its reference value. The inverter capacity that remains after real power modulation $\sqrt{(S_{max}^2-P^2)}$ is utilized for reactive power modulation.

It is noted that the reactive power modulation control also mitigates any system voltage fluctuations arising out of switching of solar panels or by real power modulation.

As soon as the power system oscillations settle down to less than the values specified by utility standards of stability, the multivariable modulator controller will return the PV solar farm to its normal real power production with all PV panels connected, and based on solar radiation availability.

It should be noted that the multivariable modulator controller may also modulate the frequency of the real power output of the solar farm.

However, the magnitude of power modulations will be determined by the amount of solar radiation available at that time instant.

The full inverter capacity of the PV solar farm is utilized for the combination of real power modulation and reactive power modulation in a decoupled manner.

The proposed invention of modulation of both real and reactive power in a decoupled manner also improves the transient stability of the power system as well as improves the power transfer capacity of transmission lines.

It should be noted that the decision to commence real power modulation and reactive power modulation, as well as the period of modulation, is autonomously determined by the multivariable modulator based on the magnitude and duration of power system oscillations detected.

The decision to commence real power modulation and reactive power modulation, as well as the period of modulation, may also be communicated by the system operator to the multivariable modulator, based on the magnitude and duration of power system oscillations.

Power generation facilities, and especially PV solar farms, can also contribute to the stability of the system frequency.

Photovoltaic solar farms do not have any rotating parts, such as those used in synchronous generators, and hence do not have any inertia. A large number of microgrids around the globe, which have PV solar farms installed, face the problem of frequency regulation since the solar farms lack inertia. This inertia is much needed during power system disturbances to regulate frequency and to thereby ensure system stability.

In this aspect of the invention, a PV solar farm is controlled so as to emulate inertia much like a synchronous generator and can thereby contribute to frequency regulation. During situations leading to an imbalance between generation and load in the power system, such as when generators or loads are switched, or during a disturbance, a synchronous generator produces power oscillations with a magnitude and frequency depending upon the value of the inertia of its rotating mass. This effect can be approximated in a PV solar farm by modulating both the magnitude and the frequency of the real power output of the solar farm.

For this concept, the multivariable modulator controller varies the power output of the solar system in a controlled manner. This control will result in a variable real power output that is similar to that produced by a synchronous generator under similar circumstances, thereby presenting usable inertia to the power system. As noted above, this variable real power output will be with the objective of reducing the imbalance between the generation and the load in the interconnected power system.

System frequency increases when the power generation exceeds the load in the power system. When this occurs, the multivariable modulator controller will decrease the power output from the PV solar system.

System frequency decreases when the power generation becomes lower than the load in the power system. When this occurs, the multivariable modulator controller will increase the power output from the PV solar system.

To implement this frequency stability enhancing control scheme, it should be noted that it can only be implemented during day time for PV solar farms. It should be quite clear that PV solar farms do not produce real power at night and, as such, real power production cannot be increased or decreased at night. This may however be done by PV solar farms in conjunction with energy storage systems.

For a day time implementation, the multivariable modulator controller modulates the power production about a specific setpoint. If the system data collected by the modulator controller indicates that the PV solar farm is required to perform frequency stabilization, the modulator controller will discontinue the normal real power generation operation of the PV solar system partly or fully. The controller will start to modulate the real power output of the PV solar system around a setpoint that can be, for example, half of the real power output corresponding to solar radiation at that time instant, as described above.

It should be noted that the multivariable modulator controller may also modulate the frequency of the real power output of the solar farm, thereby artificially emulating inertia of a synchronous generator.

It should be clear that the magnitude of the power modulations is dependent on the amount of solar radiation available at that time instant.

The multivariable modulator controller can also perform reactive power modulation simultaneously with the remaining inverter capacity in a decoupled manner. This is mainly for two reasons. Reactive power modulation can mitigate any voltage fluctuations arising from real power modulation. Also, reactive power modulation can control the PCC bus voltage which will in turn control the real power consumption of the power system loads. This control indirectly reduces the imbalance between generation and loads in the power system, thereby reducing frequency oscillations.

It has been proposed in literature that if PV solar farms are involved in frequency regulation, they should continuously operate at levels that are substantially lower than the optimal operating point known as Maximum Power Point (MPP), i.e., with a large margin below the MPP. With the technique proposed in the present invention of combined real and reactive power modulation in a decoupled manner, PV solar inverters will either not be required to continuously operate at non optimal, i.e., non MPP level, or will need to continuously operate at levels that are only slightly lower than the MPP, i.e., with a much lower margin below the MPP.

Once the system frequency oscillations settle down to less than the values specified by utility standards of stability or to an acceptable predetermined level, the modulator controller will return the PV solar farm to its normal real power production with all solar panels connected.

As was the case with the previously described techniques, the decision to commence real power modulation, as well as the period of modulation, is autonomously determined by the modulator controller based on the magnitude and duration of the unacceptable frequency oscillations is the power system.

The decision to commence real power modulation, as well as the period of modulation, may also be communicated by the system operator to the multivariable modulator, based on the magnitude and duration of frequency oscillations.

It is emphasized that this above technique of real power modulation in response to system frequency oscillations may be distinguished over the conventionally utilized slow ramping of real power production of PV solar farms during system frequency variations.

The real power modulation is accomplished with only the available solar power from the PV panels. This may be enhanced by adding an energy storage system and then charging/discharging it to produce variable real power.

In another aspect of the invention, the multivariable modulator controller creates more room in the power transmission/distribution lines for carrying real power, especially during conditions when the lines are operating at or close to their thermal limits. Using this technique, the PV solar farm can also create additional capacity in the lines to carry power generated by other generating sources in the network. The multivariable modulator controller will thus allow more Distributed Generators and conventional generators to be connected in networks. Previously, these generators could not be connected since lines were already operating close to their thermal limits.

The multivariable modulator controller increases the transmission capacity of power distribution lines by improving the power factor of the distribution line at the point of interconnection. This power factor improvement is for both balanced and unbalanced operation of the distribution lines. This control of line power factor is different than the control of power factor at the terminals of the PV inverter.

This control technique increases the flow of real power over distribution lines while maintaining the magnitude of line current constant at or less than the utility prescribed thermal limit. Using this aspect of the invention, PV solar farm inverters can dynamically exchange (inject/absorb) reactive power with the power distribution lines in order to minimize the net flow of reactive power flow over the line. The PV solar farm can act alone or in coordination with passive devices such as switched capacitors or switched inductors (reactors), as shown in FIG. 20.

Figure 19:
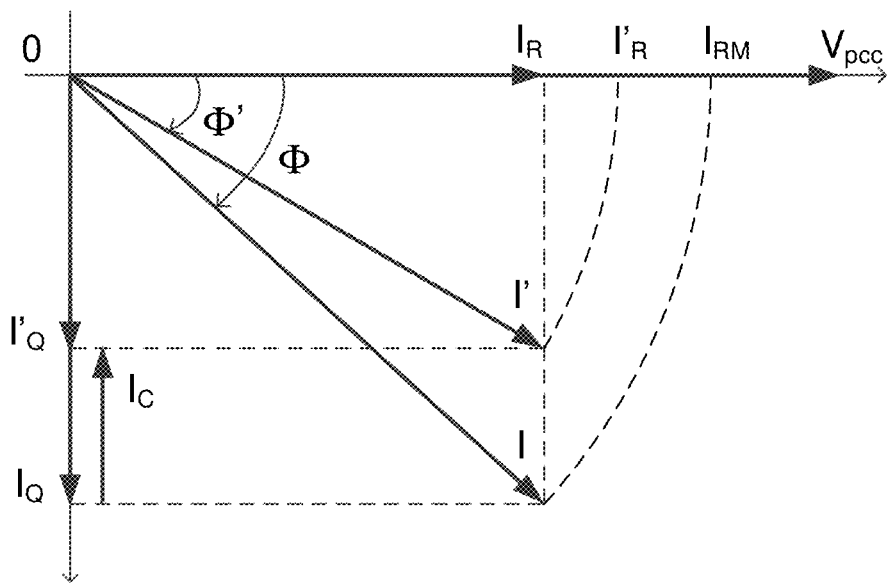
FIG. 19 is a phasor diagram for line power factor correction.

This aspect of the invention will be explained with reference to FIG. 19. Let $V_{pcc}$ be the voltage at the point of common coupling (PCC) of the PV solar system. Utilities typically specify the line thermal limit by a maximum magnitude of current flow I, corresponding to the maximum acceptable heating line loss $I^2R$. With respect to FIG. 5, the current I corresponds to the thermal limit of the current $I_{LOUT}$ which flows between the PCC of the solar farm and the Area 2 towards the right of the figure. Utilities also specify an operating power factor Φ for the flow of current I in the transmission line. This is typically 0.9.

Returning to FIG. 19, this figure depicts the phasor diagram in which $I_R$ and $I_Q$ represent the real and reactive components of the line current at thermal limit I. It should be noted that the magnitude of $I_R$ is less than the magnitude of I. The multivariable modulator controller in the PV solar farm dynamically injects capacitive current $I_C$, thereby reducing the reactive component of the line current to $I'_Q$, and the power factor angle to Φ'. The magnitude of the resulting line current is I', which is less than the thermal limit I. The line can therefore carry an additional real current, which is the difference between the magnitudes of I and I'. The magnitude of this additional current is $I_{RM}-I_R'$. In other words, an additional Distributed Generator (DG) with a rating $I_{RM}-I_R'$ can be connected in the line between the PCC and the Area 2. Such a Distributed Generator could not be connected earlier due to thermal constraints of the transmission line. In the ideal case, if the entire reactive component $I_Q$ can be compensated for by the multivariable modulator controller, an additional capacity of $I_{RM}-I_R$ can be created in the line i.e., in the direction of line current flow.

To implement the above described scheme in a PV solar farm, again night time and day time implementations will need to be used.

For the night time implementation for a PV solar farm, the multivariable modulator controller uses the full inverter capacity to provide dynamic modulation of reactive power to control the line power factor to as close to unity as possible.

For a day time implementation, the multivariable modulator controller uses the inverter capacity available after real power generation for dynamic modulation of reactive power. This is implemented in conjunction with switchable capacitors and reactors to control the line power factor to as close to unity as possible.

It should be noted that the real power generation function of the solar farm will not be curtailed. This real power generation function will be reduced or stopped for a brief period only if during that period, both in steady state or during disturbances, the power from the new DG to be added is more important/critical than the real power generation from the solar farm.

In another aspect of the invention, the multivariable modulator controller can also help improve voltage stability for the power transmission system. Voltage instability is potentially caused by a lack of dynamic reactive power support in power systems. A system undergoing voltage instability is characterized by an uncontrolled decline or collapse in voltage, subsequent to a system disturbance, such as a fault or a line outage.

The multivariable modulator controller can provide voltage regulation and mitigation of voltage disturbances such as voltage swells, voltage sags and Temporary Over Voltages (TOVs) during faults, etc. This is done with the objective to control the power transmission system's bus voltage to within specified limits. This may involve both symmetric and unsymmetric control of the three phases by the multivariable modulator controller For a night time implementation of the above noted control scheme, the multivariable modulator controller uses the full inverter capacity of the PV solar farm. Since real power is not produced by the PV solar farm at night, all of the solar farm's inverter capacity can be used to dynamically modulate reactive power from the solar farm. As noted above, this reactive power can be used to control the bus voltage to within specified limits. This capability may be enhanced by installing an energy storage system with the PV solar farm.

For a day time implementation of the above noted control scheme, it should be noted that the voltage instability problem becomes more severe during daytime due to increased system loading. If the bus voltage declines by such a large amount that the decline cannot be corrected by reactive power modulation using the inverter capacity remaining after real power generation, the multivariable modulator controller can disconnect some or all of the PV solar panels. By doing this, an increased amount of inverter capacity over the inverter capacity remaining after real power generation becomes available for reactive power exchange. However, when all the PV solar panels are disconnected the solar farm's entire inverter capacity can be made available to exchange reactive power with the grid and thereby regulate the bus voltage. As soon as the bus voltage returns to values within utility specified limits or to within predetermined acceptable limits, the solar panels can be reconnected, or their voltage controlled appropriately as described earlier, to resume normal solar power generation.

One of the problems faced by power systems is Temporary Overvoltages during unsymmetrical faults (such as line to ground fault, etc.). If the bus voltage increases by such a large amount that the voltage rise cannot be corrected by reactive power modulation using the inverter capacity remaining after real power generation, the multivariable modulator controller can disconnect some or all of the PV solar panels. By doing this, an increased amount of inverter capacity over the inverter capacity remaining after real power generation becomes available for reactive power exchange. However, when all the PV solar panels are disconnected the solar farm's entire inverter capacity can be made available to exchange reactive power with the grid and thereby regulate the bus voltage. As soon as the bus voltage returns to values within utility specified limits or to within predetermined acceptable limits, the solar panels can be reconnected or their voltage controlled appropriately as described earlier, to resume normal solar power generation.

During the period when the bus voltage exceeds acceptable limits, real power modulation as described previously, can also be implemented together with reactive power modulation in a decoupled manner, to further augment the capability for voltage regulation.

The decision to curtail real power production to provide both reactive and real power modulation in a decoupled manner, and the duration of this modulation are autonomously determined by the multivariable modulator controller based on the voltage magnitude sensed at PCC and the duration of the disturbance.

The decision to curtail real power production to provide both reactive and real power modulation in a decoupled manner, and the duration of this modulation, may also be communicated by the system operator to the multivariable modulator, based on the magnitude of bus voltages and the duration of the disturbance.

It should be clear that the primary function of PV solar farms is the generation of real power at unity power factor during daytime. In conventional operation, solar farms are not used at night. Because of this, solar farms can utilize their entire inverter capacity at night to earn new revenues by providing some key power system benefits. However, these benefits are generally of limited value as they cannot be provided by the solar farm during the day.

While the above may be true, if the solar farms are adequately compensated, they can temporarily cease their normal power production function and provide much needed system support. As noted above, this system support may help ensure system stability and also to further increase it. As this period of halting solar power production is anticipated to be for a few minutes at most, this will not cause much financial loss to the solar farm owner or operator. However, the critical services provided by the solar farm during this time period may ultimately earn higher revenues for the solar farm owner.

It should be noted that the answer to the question of which function is to take precedence for a specific solar farm is one which must previously be agreed upon by the solar farm owner/operator, the interconnecting utility company and the power system operator. As noted above, the solar farm can contribute to the stability of the power transmission system. The utility company may decide to compensate the solar farm operator for the enhanced stability provided by the solar farm. If the compensation is greater than what the solar farm operator would normally receive for power generated by the solar farm, the utility company can therefore render it worthwhile for the solar farm operator to cease real power production function, for a given period, and dedicate the full inverter capacity towards enhancing system stability. Given that the system's stability can be enhanced in multiple ways (as noted above), the question of which function takes precedence for enhancing the system stability can be prearranged and can also be preprogrammed into the multivariable modulator controller's operating software.

Regarding the implementation of the multivariable modulator, reference is made to FIG. 20. FIG. 20 illustrates a typical two area power system connected through a transmission line. Area 1 comprises a generation and load complex represented by an equivalent generator $G_1$. Area 2 consists also of a generation and load complex modelled by an equivalent generator $G_2$. A PV solar power generation system is connected at an intermediate location called the point of common coupling (PCC) in the transmission line. The voltage at the PCC is denoted by $V_{pcc}$. The total current injected by the PV solar power generation system into the PCC is given by $I_{pcc}$. $P_{LIN}$ and $P_{LOUT}$ denote the incoming and outgoing real powers at the PCC, respectively. $Q_{LIN}$ and $Q_{LOUT}$ describe the incoming and outgoing reactive powers at the PCC, respectively. $I_{LIN}$ and $I_{LOUT}$ indicate the incoming and outgoing line currents at the PCC, respectively. The symbols $f_{Gen1}$ and $f_{Gen2}$ represent the frequencies of Generator 1 and Generator 2, respectively.

The PV solar power generation system consists of a set of m inverters $INV_1$–$INV_m$ each connected to the PCC through transformers (not shown). As an example, Inverter 1 generates a current $I_{inv1}$ and has a terminal voltage $V_{inv1}$. Further, it produces real power $P_{g1}$ and reactive power $Q_{g1}$. The total real power injected by the PV solar power generation system is given by $P_g$ and reactive power expressed by $Q_g$. Each inverter is typically fed through a set of n solar panels. These solar panels are connected to a combiner box through a set of n power electronic switches. For instance, the switches for $INV_1$ are named $S_{11}, S_{21}, \ldots S_{n1}$. Similar switches are provided for panels for other inverters. As explained before, in an alternate implementation of the same switching functionality, the switches $S_{11}, S_{21}, \ldots S_{n1}$ may be construed to be the switches to "turn on" or "turn off" the firing pulses to semiconductor devices in DC-DC converters (not shown) installed between the panels and the combiner box. A bus inductor $X_L$ and a bus capacitor $X_C$ are connected to the PCC through breakers $S_L$, and Sc. The bus inductor $X_L$ could be a set of inductors. Likewise, the bus capacitor $X_C$ could be a set of bus capacitors.

It should be noted that, as an option, a Thyristor Controller Braking Resistor (TCBR) (see N. G. Hingorani and L. Gyugyi, *Understanding FACTS*, IEEE Press, New York, USA, 1999, the contents of which are hereby incorporated in its entirety by reference) at the PCC through a breaker $S_{TCBR}$ to very rapidly absorb variable amounts of real power from the grid to stabilize power oscillations. In addition to the TCBR, one may also connect a Battery Energy Storage System (again noted in the above reference) at the DC terminals of each inverter through a breaker $S_{BATT}$ to allow for the very rapid exchange (absorption or injection) of variable amounts of real power with the grid to stabilize power oscillations in conjunction with the operation of the multivariable modulator.

It should further be noted that, as an option, a Static Var Compensator (SVC) or STATCOM (see N. G. Hingorani and L. Gyugyi, *Understanding FACTS*, IEEE Press, New York, USA, 1999, the contents of which are hereby incorporated in its entirety by reference) at the PCC through the breaker $S_{TCBR}$ to very rapidly exchange (absorb/inject) variable amounts of reactive power from the grid to stabilize power oscillations in conjunction with the operation of the multivariable modulator.

The basic PV solar farm control system is described in a paper referenced above as IEEE Task Force. The multivariable modulator controller can be added to this basic solar farm control system to provide the solar farm with the capabilities explained and enumerated above. A block diagram of the various parts of one implementation of the multivariable modulator controller is presented in FIG. 21. The outputs from the multivariable modulator controller in FIG. 21 correspond to the basic solar farm controllers given in the IEEE Task Force reference.

Figure 21:
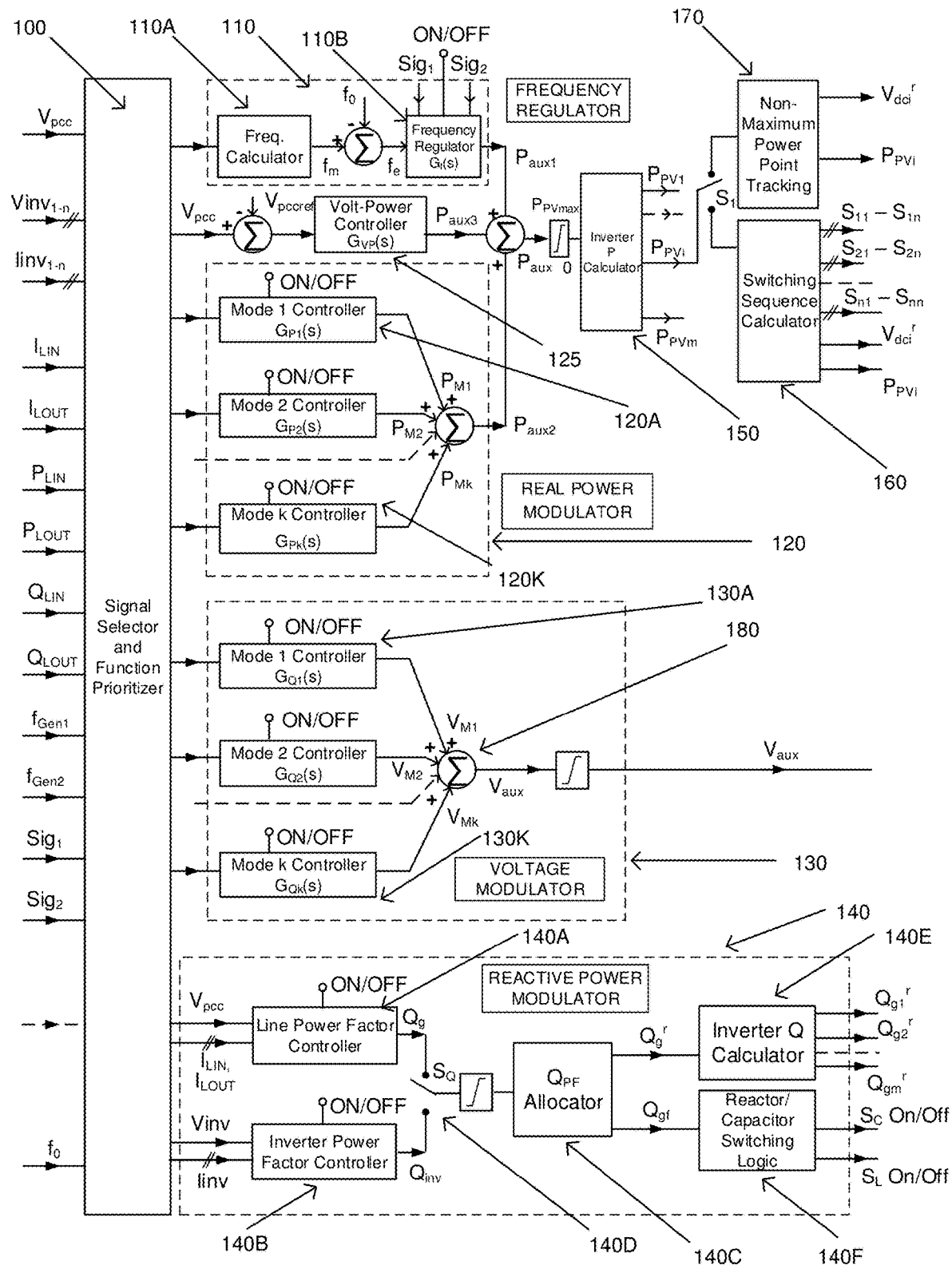
FIG. 21 is a block diagram of a multivariable modulator controller according to one implementation of one aspect of the invention.

FIG. 21 illustrates the components of multivariable modulator controller for a PV solar system according to one aspect of the invention. Different control signals from the grid and the inverter terminals are fed into a Signal Selector and Function Prioritizer block 100. This block 100 selects the specific signal (or set of signals) that will be transmitted as input or inputs to each of the different regulator/modulator control subsystems. There are four control subsystems, a Frequency Regulator block 110, a Real Power Modulator block 120, a Voltage Modulator block 130, and a Reactive Power Modulator block 140. Based on previously executed agreements between the solar farm owner and the electric power utility, specific subsystems will be active and, as such, the solar farm will provide specific types of stability enhancement to the power transmission system. As an example, the utility company may request that the solar farm provide only voltage modulation and frequency regulation to the power transmission system. Thus, in this example, only the frequency regulator block 110 and the voltage regulator block 130 can be activated. Or, conversely, the utility company may require that all four blocks be active to provide stability enhancement and extra power line capacity. For this example, the utility company may request the solar farm owner to configure the multivariable modulator controller to prioritize one stability enhancement function over another. As such, an agreed upon priority sequence can be preprogrammed into the multivariable modulator controller such that, when stability enhancement is required, there is a sequence as to which stability enhancements are to be implemented. This will determine the priority sequence for the different control functions. Based on this priority sequence the Signal Selector and Function Prioritizer block 100 will issue ON/OFF signals for each sub-controller within the different blocks. The Frequency Regulator block 110, the Real Power Modulator block 120, the Voltage Modulator block 130, and the Reactive Power Modulator block 140 are described below.

For the Frequency Regulator block 110, it should be noted that this Frequency Regulator block 110 may or may not be utilized depending on the ON/OFF command issued by the Signal Selector and Function Prioritizer block 100. As noted above, whether this Frequency Regulator block is operational or not and where it sits in a priority sequence is to be predetermined and agreed upon between the utility company and the solar farm owner.

For the Frequency Regulator block 110, an appropriate set of signals from the total set of inputs will be sent to a Frequency Calculator block 110A within the Frequency Regulator block 110. These signals could be, for example, $V_{pcc}$ and $I_{LIN}$. This block 110A computes the measured system frequency $f_m$ using standard techniques, and compares it with the reference frequency $f_0$. The frequency error $f_e$ is fed to a frequency regulator 110B. A very simple model of the frequency regulator 110B (see reference, Prabha Kundur, "Power System Stability and Control" McGraw Hill, 1994, pp 589, the full contents of which are incorporated herein by reference} is given by the transfer function $$G_f(s) = -1/[R(1+sT_G)]$$

here, R is the speed regulation constant or droop, K is a gain, and time constant $T_G = 1/(KR)$.

The output of the Frequency Regulator block 110 is given by $P_{aux1}$ in FIG. 21.

This block 110 increases the power output of the PV solar system when the system frequency is decaying and decreases the power output when the system frequency is increasing. The power output $P_{aux1}$ is thus modulated to maintain the system frequency at a constant value.

In a more complex model of the frequency regulator 110B, additional parameters $Sig_1$ and $Sig_2$ may be provided as inputs in an Automatic Generation Control scheme of power systems as described in the reference, Prabha Kundur, "Power System Stability and Control" McGraw Hill, 1994, at pp 617.

It should be noted the Frequency Regulator block 110 is typically slow acting when operating as a controller for the solar farm.

For the Real Power Modulator block 120, it should be noted that this oscillation damping block 120 may or may not be utilized depending on the ON/OFF command issued by the Signal Selector and Function Prioritizer block 100. As noted above, whether this damping block is operational or not and where it sits in a priority sequence is to be predetermined and agreed upon between the utility company and the solar farm owner.

Within this block 120 are k sub-controllers 120A . . . 120k, each of which is responsible for stabilizing one of the k modes of oscillations, as described above. Each sub-controller is governed by a specific transfer function which operates to address a specific oscillation mode.

As one example, the sub-controller 120A operates to address Mode 1 oscillations. The sub-controller 120A is governed by the general transfer function $$G_{P1}(s) = K_{P1} \cdot \left(\frac{sT_{wP1}}{1+sT_{wP1}}\right) \cdot \left(\frac{1+sT_{P11}}{1+sT_{P12}}\right)^p \frac{1}{1+sT_{FP11}} \frac{1}{1+sT_{FP12}}$$

The transfer function comprises a gain $K_{P1}$, a washout stage with time constant $T_{wP1}$, and a $p^{th}$ order lead-lag compensator block, and low pass filters with time constants $T_{FP11}$ and $T_{FP12}$. The filters isolate the Mode 1 oscillations. The washout block ensures that the damping controller generates an output $P_{M1}$ only when Mode 1 oscillations are occurring. The controller block 120 provides zero output (i.e. is deactivated) when the oscillations are damped out or reduced to a level acceptable to the utility organization operating the power transmission system.

Within the block 120, the outputs $P_{M1}, P_{M2}, \ldots P_{Mk}$ of the k sub-controllers 120A . . . 120k are added in a summing junction to provide a composite power modulation signal $P_{aux2}$. It may be noted that when all the oscillatory modes are stabilized, the signal $P_{aux2}$ becomes zero.

Further, within the block 120, the PCC voltage $V_{pcc}$ is compared with the reference value of PCC voltage $V_{pccref}$ and the error signal is passed through a voltage-power controller $G_{vp}(s)$ denoted by block 125. This controller produces a power modulation signal $P_{aux3}$. It may be noted that when the PCC voltage stabilizes to within acceptable values, the signal $P_{aux3}$ becomes zero. One example implementation of the controller $G_{vp}(s)$ is given below:

$$G_{VP}(s) = \left(KP_{VP} + \frac{KI_{VP}}{s}\right)$$

where $KP_{VP}$ and $KI_{VP}$ are the proportional and integral gains of a PI controller.

The real power output signals $P_{aux1}$, $P_{aux2}$ and $P_{aux3}$ are added and the resulting power signal $P_{aux}$ is fed to the Inverter P Calculator 150 after passing through an appropriate limiter. The Inverter P Calculator 150 divides $P_{aux}$ amongst the n inverters and generates the real power reference $P_{PVi}$ (=$P_{aux}$/m) for the $i^{th}$ inverter.

There are two techniques of generating the actual power $P_{PVi}$ from the $i^{th}$ inverter and each will be described below in turn.

The first method for generating actual power from the inverter is by switching PV panels rapidly through a matrix of fast acting solid-state switches.

In this method, the signal $P_{PVi}$ is fed to a switching sequence calculator 160 and this calculator generates the status (ON/OFF) of switches of the n solar panels corresponding to each of the m inverters, as shown in FIG. 20. As an example, for the $i^{th}$ inverter, these switches are $S_{i1}$, $S_{i2}$, ..., $S_{in}$. These fast acting solid state switches operate in few milliseconds. Such an operating time is very fast compared to the slower oscillations of the power signals corresponding to 0.1 Hz (period=10 sec) or corresponding to 30 Hz (33 msec).

In an alternate solar farm configuration where the n solar panels (linked to the $i^{th}$ inverter) have their own associated DC-DC converters (not shown), the switches $S_{i1}$, $S_{i2}$, ..., $S_{in}$ are used to implement the "panel on" or "panel off" function by "turning on" or "turning off" the firing pulses to the dc-dc converters of the individual n solar panels.

These switches cause the appropriate number of panels to be connected, each operating at maximum power point (MPP), to result in a total power output of $P_{PVi}$ for the $i^{th}$ inverter. The Maximum Power Point Tracking (MPPT) algorithm implemented in each conventional PV inverter determines the DC voltage reference $V_{dci}{}^{r}$ for each $i^{th}$ inverter. This signal $v_{dci}{}^{r}$ is fed to the input of the DC voltage control loop shown in FIG. 22.

Figure 22:
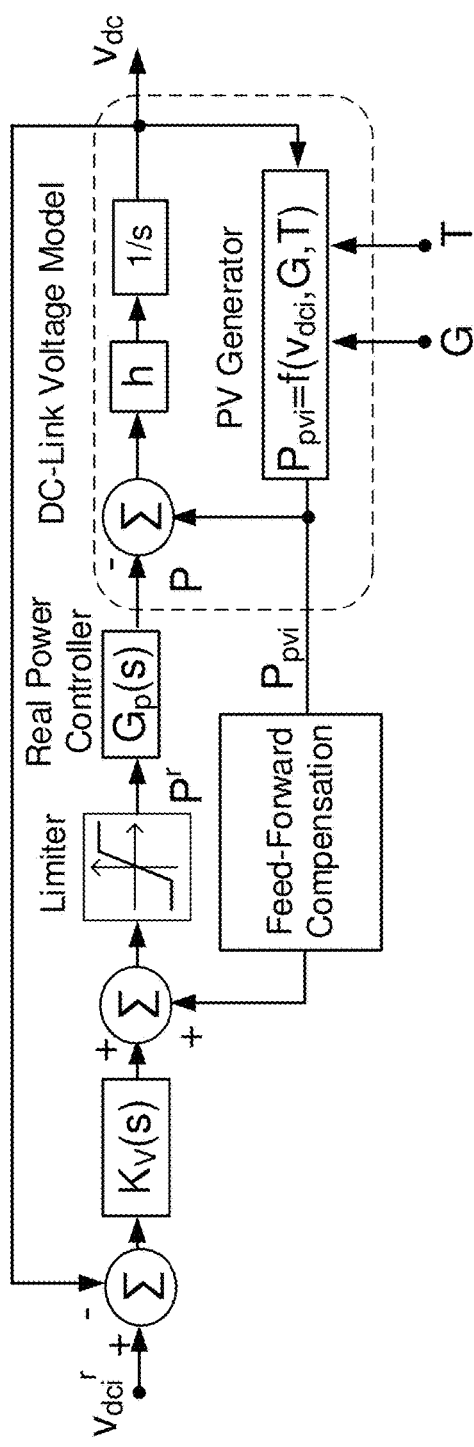
FIG. 22 is a block diagram of a dc-link voltage control loop which may be used with the invention.

Referring to FIG. 22, it should be noted that the circuit and description below have been adapted from the IEEE Task Force reference noted above. In FIG. 22, the dc-link voltage control loop processes the difference between $v_{dci}{}^{r}$ and $v_{dc}$ by a compensator and issues the real-power reference command for the real-power control scheme. In turn, the real-power control scheme responds to the command based on a closed-loop transfer function, say, $G_p(s)$. Thus, the real power that leaves the VSC ac-side terminals, P, is controlled. Ignoring the VSC power loss, P is approximately equal to the power that is drawn from the VSC dc-side terminals. The difference between this power and the incoming power, $P_{pvi}$, is integrated by the dc-link capacitor and results in a voltage rise or fall. In a steady state, $v_{dc}$ settles at $v_{dci}{}^{r}$, due to the integral term of $K_v(s)$, and P is equal to $P_{pvi}$ (i.e., the power delivered to the grid is equal to the power generated by the PV generator).

It should be noted that problems may arise during proper tuning of $K_v(s)$. One of these issues is the dependence of $P_{pvi}$ on $v_{dc}$. It can be seen from FIG. 22 that this dependence corresponds to an additional inherent feedback loop within the control plant designated by the dashed box. To mitigate this issue of dependence, the output of $K_v(s)$ may be supplemented with a feedforward compensation that is a version of $P_{pvi}$. This feedforward effectively opens the internal feedback loop and transforms the control plant to an integrator.

In steady state, the DC link voltage will settle to $v_{dci}{}^{r}$, and the real power output of the PV panel become equal to $P_{PVi}$.

The second method for generating actual real power from the inverter is by operating the solar panels at Non-Maximum Power Point (Non-MPP) to result in variable power.

In this second method, the desired power output signal $P_{PVi}$ is fed to a Non-Maximum PPT (Non-MPP) controller block 170, which determines a non-optimal operating point $v_{dci}{}^{r}$ of each PV panel to result in actual PV power output $P_{PVi}$. This is based on the i-v characteristic and P-v characteristic of the specific solar panels utilized in the PV solar system, as shown in the graphs in FIG. 18. It should be noted that, at this operating point, the PV panels do not produce the maximum power (MPP) corresponding to the available solar radiation G and Temperature T. This signal $v_{dci}{}^{r}$ is fed to the input of the DC voltage control loop depicted in FIG. 22.

The variable (oscillatory) nature of $P_{PVi}$ will result in a variable $v_{dci}{}^{r}$.

It should further be noted that the Real Power Modulator 120 is a fast acting controller.

Referring to the voltage modulator block 130, this block is responsible for damping oscillations in the power transmission system.

Similar to the Real Power Modulator block 120, the voltage modulator block 130 may or may not be utilized depending on the ON/OFF command issued by the Signal Selector and Function Prioritizer block 100. As noted above, whether this damping block is operational or not and where it sits in a priority sequence is to be predetermined and agreed upon between the utility company and the solar farm owner.

The voltage modulator block 130 has, similar to block 120, has k sub-controllers 130A ... 130k, each of which is responsible for stabilizing one of the k modes of oscillations as described above.

As one example of a sub-controller, each of which is defined by a transfer function, the Mode 1 damping sub-controller 130A is defined by the general transfer function $$G_{Q1}(s) = K_{Q1} \cdot \left(\frac{sT_{wQ1}}{1+sT_{wQ1}}\right) \cdot \left(\frac{1+sT_{Q11}}{1+sT_{Q12}}\right)^p \frac{1}{1+sT_{FQ11}} \frac{1}{1+sT_{FQ12}}.$$

The transfer function has a gain $K_{Q1}$, a washout stage with time constant $T_{wQ1}$, and a $p^{th}$ order lead-lag compensator block, and low pass filters with time constants $T_{FQ11}$ and $T_{FQ12}$.

The filters isolate the Mode 1 oscillations. The washout block ensures that the damping controller generates an output $V_{M1}$ only when Mode 1 oscillations are indeed occurring. The controller provides zero output (i.e. is deactivated) when the oscillations are damped out or when the oscillations reach a predetermined acceptable level.

The outputs of the k sub-controllers, $V_{M1}$, $V_{M1}$, ... $V_{Mk}$ are added in a summing junction 135 to provide a composite power modulation signal $V_{aux}$. It may be noted that when all the oscillatory modes are stabilized, the signal $V_{aux}$ becomes zero.

Figure 23:
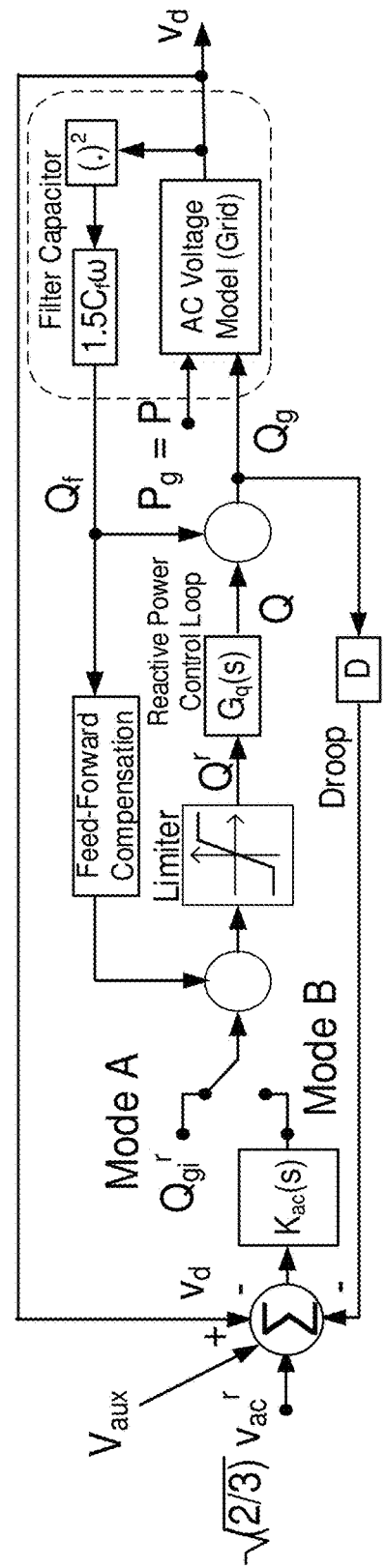
FIG. 23 is a block diagram of a VAr/ac voltage regulator which may be used with the invention.

This signal $V_{aux}$ is fed to the summing junction for Mode B operation of the VAr/ac voltage regulation scheme of the PV inverter as depicted in FIG. 23.

FIG. 23 illustrates a block diagram of a potential VAr/ac-voltage regulation scheme which may be used with the invention. From FIG. 23, the regulation scheme may operate either in the VAr control mode (i.e. Mode A) or in the ac-voltage control mode (i.e. Mode B).

FIG. 23 shows that in Mode A the desired reactive-power to be delivered to the grid, $Q^r_{gi}$, determines $Q^r$. This means that the reference command for the reactive-power control scheme above, based on most prevalent standards, $Q^r_g$ must be set to zero, to ensure that the PV system exhibits unity power factor to the grid. To compensate for the reactive power that the shunt filter capacitors deliver, a feedforward signal that is a negative of a measure of the capacitor reactive power has been added to the reference command. The capacitor reactive power can be readily estimated by as $Q_f=1.5 C_f \omega_0 v_d^2$, where $\omega_0$ is the grid nominal frequency, and can either be approximated by the nominal value of the grid line-to-neutral voltage or dynamically obtained from a synchronization scheme.

In Mode B, however, the PCC voltage $V_{pcc}$ is regulated at a reference value which is expressed in terms of the line-to-line rms voltage and denoted by $v_{ac}^r$. Thus, the compensator processes the error and issues a control signal for the reactive-power control scheme. Since a discrepancy between $v_{ac}^r$ and the grid natural voltage may require a prohibitively large reactive-power injection/absorption by the PV system, a measure of $Q_g$ should be included in the loop, through a droop mechanism, to adjust the reference voltage command. Hence, the voltage regulation degree will depend on the droop coefficient, D. The droop mechanism is also important in PV systems with multiple paralleled units, in terms of reactive-power sharing, in case more than one unit operates in Mode B. As FIG. 23 shows, in both modes, Mode A and Mode B, $Q^r$ is constrained by a saturation block whose limits are, in general, functions of the VSC real-power output. This ensures that the VSC capacity is reserved for real-power transfer, which is the prime function of the PV system.

It should be noted that FIG. 23 and its description are modified from the IEEE Task Force reference noted above.

It should be noted that this Voltage Modulator block 130 is a fast acting controller.

The final controller block in FIG. 21 is the Reactive Power Modulator block 140. This modulator 140 can control the line power factor or the inverter power factor by way of either the Line Power Factor Control sub-block 140A or the Inverter Power Factor Control sub-block 140B.

The Power Modulator block 140 has a Line Power Factor Controller sub-block 140A. The sub-block 140A utilizes transmission line parameters, such as, $V_{pcc}$, $I_{LIN}$ and $I_{LOUT}$ to compute the line power factor, either on the incoming or outgoing side of the PCC, as per the requirements. The sub-block 140A then determines the total reactive power that needs to be exchanged (injected/absorbed) by the PV solar system with the grid either symmetrically or asymmetrically, $Q_g$ to implement this power factor. The $Q_{PF}$ Allocator sub-block 140C obtains this $Q_g$ through the switch $S_Q$ 140D and splits it into a fixed part $Q_{gf}$ and a variable part $Q_g^r$. The Inverter Q Calculator sub-block 140E further divides $Q_g^r$ amongst the m inverters and generates the reactive power reference $Q_{gi}^r$ ($=Q_g^r/m$) for the $i^{th}$ inverter. This signal is fed to the Mode A input of the VAr/ac voltage regulation scheme of the PV inverter as depicted in FIG. 23.

The fixed part $Q_{gf}$ is received by the Reactor/Capacitor Switching Logic sub-block 140F to generate ON/OFF commands to switch the bus reactor (s) $X_L$ or bus capacitor (s) $X_C$, as appropriate.

In steady state, the reactive power output of each inverter will become to $Q_{gi}^r$.

The other main sub-block of the Reactive Power Modulator block 140 is the Inverter Power Factor Controller sub-block 140B. This sub-block 140B controller utilizes Inverter voltages $V_{inv}$ and inverter currents, $I_{INV1}$-$I_{INVm}$ to compute the inverter power factor of the different inverters. Ideally, all the inverters should operate at unity power factor. If a different inverter power factor is desired, the Inverter PF Controller sub-block 140B computes the total reactive power $Q_{inv}$ that needs to be injected by the inverters to implement this power factor. The $Q_{PF}$ Allocator 140C obtains this $Q_{inv}$ through the switch $S_Q$ and transfers it as $Q_g^r$ ($=Q_{inv}$) to the Inverter Q Calculator sub-block 140E. This further divides $Q_g^r$ amongst the m inverters and generates the reactive power reference $Q_{gi}^r$ ($=Q_g^r/m$) for the $i^{th}$ inverter. This signal is fed to the Mode A input of the VAr/ac voltage regulation scheme of the PV inverter as depicted in FIG. 23. No fixed reactor/capacitor is needed in this portion of the system.

In steady state, the reactive power output of each inverter will become to $Q_{gi}^r$.

This Reactive Power Modulator block 140 is a relatively slow acting controller, as the variations in power factor are not fast.

Regarding limits in the multivariable modulator controller scheme, the Q limits on the Limiter in the VAr/ac voltage regulation scheme depicted in FIG. 23 for the different functions performed by the multivariable modulator controller are shown in the table below. Reference may also be made to FIG. 22 to identify some variables mentioned in the table below.

| No. | Multivariable Modulator Function | Night | Day |
|---|---|---|---|
| 1. | Frequency Regulation | Set $P_{PV}=0$; $Q_{rLIM}=\sqrt{(S_{max}^2-P_r^2)}$ | $Q_{rLIM}=\sqrt{(S_{max}^2-P_r^2)}$ |
| 2. | Real Power Modulation | Set $P_{PV}=0$; $Q_{rLIM}=\sqrt{(S_{max}^2-P_r^2)}$ | $Q_{rLIM}=\sqrt{(S_{max}^2-P_r^2)}$ |
| 3. | Modal Oscillation Damping with only Reactive Power Modulation | Set $P_{PV}=0$; $Q_{rLIM}=\sqrt{(S_{max}^2-P_r^2)}$ | i) If $Q_r<\sqrt{(S_{max}^2-P_{PV}^2)}$, $Q_{rLIM}=\sqrt{(S_{max}^2-P_{PV}^2)}$ ii) If $Q_r>\sqrt{(S_{max}^2-P_{PV}^2)}$, Disconnect appropriate number of PV panels, or all PV panels. Set $P_{PV}=$ power output of remaining connected panels, or $P_{PV}=0$, respectively; $Q_{rLIM}=\sqrt{(S_{max}^2-P_r^2)}$ |
| 4. | Modal Oscillation Damping with both Reactive and Real Power Modulation | Set $P_{PV}=0$; $Q_{rLIM}=\sqrt{(S_{max}^2-P_r^2)}$ | $Q_{rLIM}=\sqrt{(S_{max}^2-P_r^2)}$ |
| 5. | Voltage Stabilization with remaining inverter capacity using Reactive Power Modulation | Set $P_{PV}=0$; $Q_{rLIM}=\sqrt{(S_{max}^2-P_r^2)}$ | $Q_{rLIM}=\sqrt{(S_{max}^2-P_{PV}^2)}$ |

| No. | Multivariable Modulator Function | Night | Day |
|---|---|---|---|
| 6. | Voltage Stabilization with partial or full inverter capacity using both Reactive and Real Power Modulation | Set $P_{PV} = 0$; $Q_{rLIM} = \sqrt{(S_{max}^2 - P_r^2)}$ | i) If $Q_r < \sqrt{(S_{max}^2 - P_{PV}^2)}$, $Q_{rLIM} = \sqrt{(S_{max}^2 - P_r^2)}$ ii) If $Q_r > \sqrt{(S_{max}^2 - P_{PV}^2)}$, Disconnect appropriate number of PV panels, or all PV panels. Set $P_{PV}$ = power output of remaining connected panels, or $P_{PV} = 0$, respectively; $Q_{rLIM} = \sqrt{(S_{max}^2 - P_r^2)}$ |

In all the above described comparators where a quantity is compared with its reference value, suitable hysteresis and time delays may be incorporated to avoid hunting or oscillations around the reference value.

From the above description, it should be clear that the multivariable modulator controller initially detects a need for enhanced system stability based on input from the power transmission system or from the generators attached to the power transmission system. The controller then, based on the controller configuration as agreed upon by the solar farm operator and the utility company, initiates measures which would increase system stability. This can be done by modulating real power production, modulating reactive power, modulating both real and reactive power in a decoupled manner, injecting and varying real power, injecting or absorbing reactive power, or by changing the parameters of the solar farm's energy production. As these measures are being implemented, the multivariable modulator controller continually reads and detects the parameters governing the power transmission system. Once the need for enhanced system stability has passed, the multivariable modulator controller can cease the system stability enhancement measures and can then return the power generation facility to its regular operating mode.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

The reactive power modulation capability of the PV solar farm may be augmented and coordinated with locally installed switched reactive power devices, such as a bus capacitor or a bus inductor.

The reactive power modulation capability of the PV solar farm may be further augmented and coordinated with a locally installed Flexible AC Transmission System (FACTS) device, such as a Static Var Compensator (SVC) or a STATCOM (see N. G. Hingorani and L. Gyugyi, *Understanding FACTS*, IEEE Press, New York, USA, 1999, the contents of which are hereby incorporated in its entirety by reference).

The real power modulation capability of the PV solar farm may be further augmented and coordinated with a locally installed energy storage system. The energy storage system may be mechanical energy based storage, such as a Pumped Hydroelectric Storage (PHS), a Compressed Air Energy Storage (CAES), a Flywheel Energy Storage (FES), etc. The Energy Storage System may be electrochemical energy based storage, such as a battery energy storage. The energy storage system may also be electrical energy based storage, such as a super/ultra capacitor storage system, a superconducting magnetic energy storage system (SMES), etc. The energy storage system may also be hydrogen or other gas based storage, such as fuel cells, etc.

The PV solar system with the multivariable real and reactive power controllers may further be coordinated with other dynamic controllers in the power system such as tap changing transformers, voltage regulating transformers, bus capacitors, bus reactors, Static Var Compensators, STATCOM, power system stabilizers of synchronous generators, HVDC converters, wind farm controllers, Automatic Generation Controllers, etc.

The PV solar system with the multivariable real and reactive power controllers may be coordinated with other PV solar systems with multivariable real and reactive power controllers installed in the power system.

A person understanding this invention may now conceive of alternative structures and embodiments or variations of the above all of which are intended to fall within the scope of the invention as defined in the claims that follow.

What is claimed is:

1. A method for implementing a mode of operation at a power generation facility, said mode of operation being based on at least one benefit, the method comprising:
   determining said at least one benefit;
   determining a specific mode of operation that is intended to realize said at least one benefit; and
   implementing said specific mode of operation;
   wherein said power generation facility is coupled to a power grid system;
   wherein implementing said specific mode of operation comprises at least one of:
   modulating real power;
   modulating reactive power; and
   simultaneously modulating both said real power and said reactive power in a decoupled manner;
   wherein said power generation facility comprises distributed generators; and
   wherein implementing said specific mode of operation comprises disabling and selectively re-enabling real power production from said distributed generators to perform real power modulation; and using inverter capacity of said power generation facility to exchange reactive power with said power grid system.

2. The method according to claim 1, wherein implementing said specific mode of operation comprises adjusting at least one inverter of said power generation facility.

3. The method according to claim 2, further comprising adjusting said at least one inverter of said power generation facility to thereby use at least a portion of said at least one inverter's capacity to provide at least one of modulated real power, modulated reactive power, and a combination of said modulated real power and said modulated reactive power.

4. The method according to claim 1, wherein said at least one benefit comprises at least one of:
   a specific benefit related to said power grid system;
   another specific benefit related to a time of day wherein said day is a 24-hour period; and
   a specific financial benefit.

5. The method according to claim 3, wherein said specific benefit related to said power grid system comprises at least one of:
   damping system oscillations;
   increasing transient stability;
   regulating power system frequency;
   improving voltage stability;
   improving voltage regulation;
   increasing power transmission capacity in transmission lines; and
   increasing power transmission capacity in distribution lines.

6. The method according to claim 1, wherein said at least one specific mode of operation is determined by at least one of:
   a control system coupled to said power generation facility and to said power grid system; and
   a power system operator in communication with said control system.

7. The method according to claim 1, wherein said power generation facility comprises solar panels.

8. The method according to claim 7, wherein implementing said specific mode of operation comprises disabling and selectively re-enabling real power production from said solar panels to perform real power modulation; and using inverter capacity of said power generation facility to exchange reactive power with said power grid system.

9. The method according to claim 7, wherein implementing said specific mode of operation comprises operating at least one solar panel at less than a maximum capacity.

10. The method according to claim 7, wherein implementing said specific mode of operation comprises varying real power production of said power generation facility within an available range of solar power for said power generation facility.

11. The method according to claim 8, wherein said real power production from said solar panels is disabled and re-enabled using at least one of: a control system and high-speed switching mechanisms.

12. The method according to claim 8, wherein implementing said specific mode of operation is coordinated with at least one of: locally installed dynamic reactive power compensators; locally installed energy storage systems; other dynamic controllers installed in the power grid system; and multivariable real and reactive power controllers of at least one photovoltaic based solar farm installed in the power grid system.

13. The method according to claim 1, wherein said real power production from said distributed generators is disabled and re-enabled using at least one of: a control system and high-speed switching mechanisms.

14. The method according to claim 1, wherein said power generation facility is operated such that any remaining inverter capacity in said power generation facility after real power production is used for reactive power exchange.

15. The method according to claim 1, wherein said at least one benefit is autonomously determined.

16. The method according to claim 1, wherein said at least one benefit is determined by a power system operator.

17. The method according to claim 1, wherein said at least one benefit has an associated time duration, and wherein after said associated time duration has elapsed, said specific mode of operation is terminated and a second specific mode of operation, based on a second at least one benefit, is implemented.

18. The method according to claim 1, wherein said power generation facility is a PV solar farm that operates as a STATCOM for providing the at least one benefit during daytime, at a time of system need.

19. The method according to claim 1, wherein said power generation facility is a PV solar farm that operates as a STATCOM for providing the at least one benefit during nighttime.

20. The method according to claim 18, wherein said PV solar farm operates without energy storage systems being coupled to said PV solar farm.

21. The method according to claim 19, wherein said PV solar farm operates without energy storage systems being coupled to said PV solar farm.

22. The method according to claim 18, wherein said PV solar farm operates with energy storage systems being coupled to said PV solar farm.

23. The method according to claim 19, wherein said PV solar farm operates with energy storage systems being coupled to said PV solar farm.

24. The method according to claim 1, wherein the power generation facility is a PV solar farm coupled with energy storage systems so as to operate as a synchronous generator providing independent voltage and frequency reference for said power grid system.

25. The method according to claim 1, wherein the power generation facility is a PV solar farm providing said at least one benefit when said PV solar farm is connected to said power grid system or a microgrid.

* * * * *